United States Patent [19]
Kikuchi et al.

[11] Patent Number: 5,584,019
[45] Date of Patent: Dec. 10, 1996

[54] APPARATUS AND METHOD FOR PREDICTING THE OPERATION OF A SYSTEM IN WHICH A PLURALITY OF INDIVIDUAL PROCESSING ELEMENTS ARE OPERATED IN PARALLEL

[75] Inventors: Kazushige Kikuchi, Yokohama; Yoichi Iwabuchi, Urayasu; Hiroyasu Watanabe, Hoya, all of Japan

[73] Assignee: Canon Kabushiki Kaisha, Tokyo, Japan

[21] Appl. No.: 193,645

[22] Filed: Feb. 7, 1994

Related U.S. Application Data

[63] Continuation of Ser. No. 392,274, Aug. 9, 1989, abandoned.

[30] Foreign Application Priority Data

| Aug. 12, 1988 | [JP] | Japan | 63-200161 |
| Aug. 12, 1988 | [JP] | Japan | 63-200162 |
| Aug. 12, 1988 | [JP] | Japan | 63-200163 |
| Aug. 12, 1988 | [JP] | Japan | 63-200164 |
| Aug. 12, 1988 | [JP] | Japan | 63-200165 |
| Aug. 12, 1988 | [JP] | Japan | 63-200166 |
| Aug. 12, 1988 | [JP] | Japan | 63-200167 |

[51] Int. Cl.⁶ ..................................... G06F 15/00
[52] U.S. Cl. .................. 395/500; 364/188; 364/DIG. 1
[58] Field of Search ....................... 395/345, 500, 395/162; 364/188

[56] References Cited

U.S. PATENT DOCUMENTS 4,914,567  3/1990  Lipkis et al. .............................. 364/188

FOREIGN PATENT DOCUMENTS

| 60-178795 | 9/1985 | Japan . |
| 61-49236  | 3/1986 | Japan . |
| 62-208171 | 9/1987 | Japan . |
| 63-167932 | 7/1988 | Japan . |

OTHER PUBLICATIONS

Miller; "Savoir: The Object is Cell Control" *Managing Automation* Apr. 1988.
The Flexis™ Toolset™, Savoir Sep. 1988.
Thomas et al. "Using Grafcet to design generic controllers", May 1988.

Primary Examiner—Larry D. Donaghue
Attorney, Agent, or Firm—Fitzpatrick, Cella, Harper & Scinto

[57] ABSTRACT

A disclosure is made on an apparatus which is capable of predicting and controlling the operation of a system which can realize its operation by controlling in parallel a plurality of individual processing elements. Information about the specifications for the system is input in a graphic language, and a state of control and a control sequence for each of the processing elements forming the system are originated and stored on the basis of the graphic language so that operation state diagram such as a tree structure chart for control information about the system can be processed on the above state of control and the control sequence. A transition to a state can be displayed and outputted by assigning a specific state of control, and a state in which the system can be brought to a deadlock can be detected. Furthermore, each of the processing elements can be controlled by determining starting conditions and completed conditions for the operation on the basis of the state of control, the control sequence, and the graphic language stored.

22 Claims, 79 Drawing Sheets

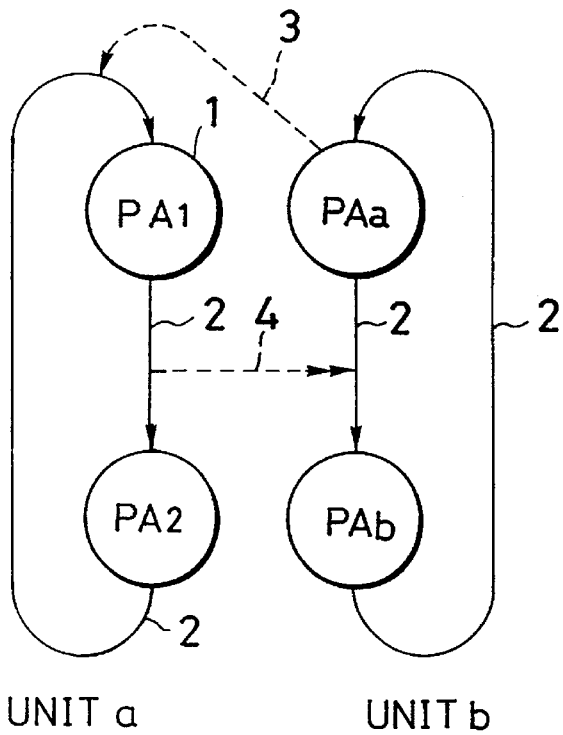
Fig. 2
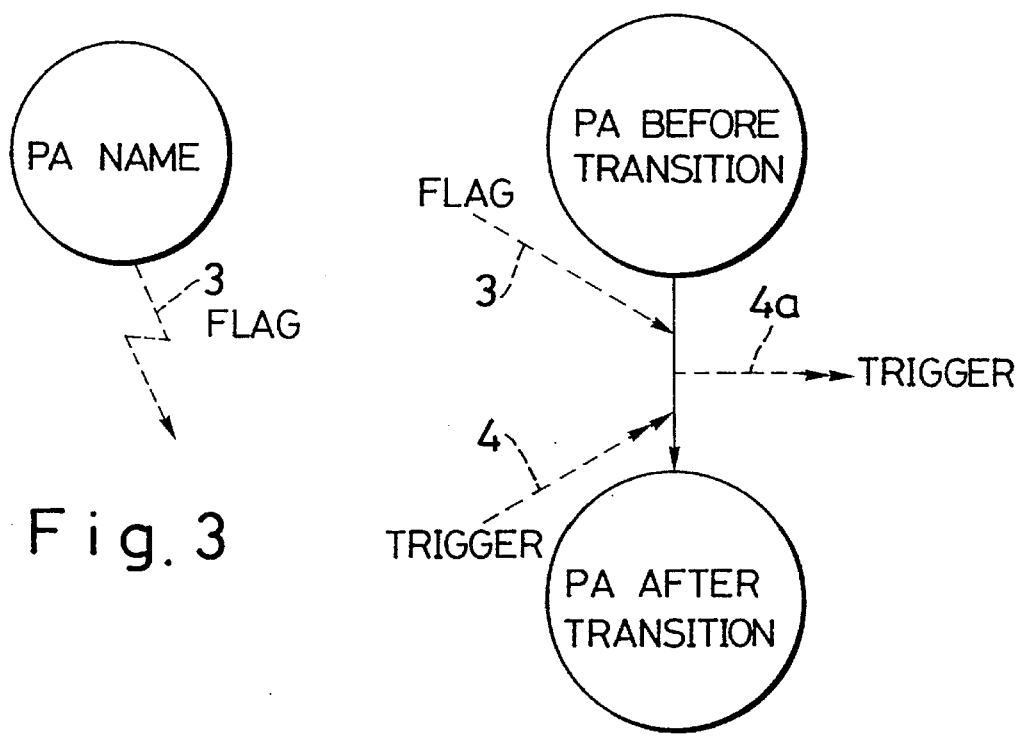
Fig. 3
Fig. 4

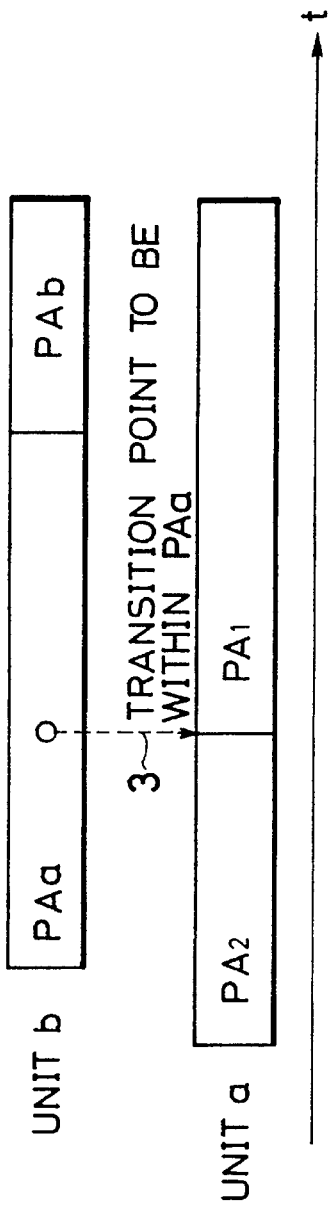

| STATE OF PA IMMEDIATELY BEFORE TRANSITION | | STATE OF FLAG | |
|---|---|---|---|
| | | OFF | ON |
| DURING CONTROL | | NO TRANSITION | IMMEDIATELY TRANSITION IS PERFORMED |
| AFTER CONTROL | | NO TRANSITION | IMMEDIATELY TRANSITION IS PERFORMED |

| STATES | ABBREVIATION |
|---|---|
| WAITING FOR UPPER-LIMIT TEMP | S 1 |
| WAITING FOR LOWER LIMIT TEMP | S 2 |
| COOLER ON | C 1 |
| COOLER OFF | C 2 |
| COUNTING STOPPAGE STATE | T 1 |
| COUNTING OPERATING STATE | T 2 |

Fig.14B

| PRECEDING CONTROL STATE | NEXT CONTROL STATE |
|---|---|
| S 1 | S 2 |
| S 2 | S 1 |
| C 1 | C 2 |
| C 2 | C 1 |
| T 1 | T 2 |
| T 2 | T 1 |

UST

Fig 15A

| TRANSITION | | RESTRAINT CONDITION | | |
|---|---|---|---|---|
| PRECEDING CONTROL STATE | NEXT CONTROL STATE | PRECEDING CONTROL STATE | NEXT CONTROL STATE | |
| C 1 | C 2 | S 2 | S 2 | } 50 |
| | | T 1 | T 2 | |
| C 2 | C 1 | S 2 | S 1 | ~51 |
| C 2 | C 1 | T 2 | T 1 | ~52 |

SRT

Fig 15B

| INITIAL SYSTEM STATE | S1 . C1 . T1 |
|---|---|

IST

Fig 15C

| PRECEDING SYSTEM STATE | NEXT SYSTEM STATE |
|---|---|
| ENTRY | S1 , C1 , T1 |
| S1 , C1 , T1 | S1 , C1 , T2 |
| S1 , C1 , T1 | S2 , C1 , T1 |
| S1 , C1 , T1 | S2 , C1 , T2 |

SST

Fig.16A

| PRECEDING SYSTEM STATE | NEXT SYSTEM STATE |
|---|---|
| ENTRY | S1   C1   T1 |
| S1   C1   T1 | S1   C1   T2 |
| S1   C1   T1 | S2   C1   T1 |
| S1   C1   T1 | S2   C1   T2 |
| S2   C1   T2 | S2   C1   T1 |
| S2   C1   T2 | S1   C1   T2 |
| S2   C1   T2 | S1   C1   T1 |
| S1   C1   T2 | S1   C1   T1 |
| S1   C1   T2 | S2   C1   T2 |
| S1   C1   T2 | S2   C1   T1 |
| S2   C1   T1 | S2   C2   T2 |
| S2   C1   T1 | S1   C1   T1 |
| S2   C1   T1 | S1   C1   T2 |
| S2   C2   T2 | S2   C1   T2 |
| S2   C2   T2 | S1   C1   T2 |

SST

Fig.16B

| SEQUENCE No. | STATE OF CONTROL |
|---|---|
| 0 | S1 |
|  | S2 |
| 1 | C1 |
|  | C2 |
| 2 | T1 |
|  | T2 |

Fig.17

| REACHABLE |
|---|
| S1 , C1 , T1 |
| S1 , C1 , T2 |
| S2 , C1 , T1 |
| S2 , C1 , T2 |
| S2 , C2 , T2 |

| UNREACHABLE |
|---|
| S1 , C2 , T1 |
| S1 , C2 , T2 |
| S2 , C2 , T1 |

URT

Fig.18B

| PRECEDING SYSTEM STATE | NEXT SYSTEM STATE |
|---|---|
| ENTRY | S1 , C1 , T1 |
| S1 , C1 , T1 | S1 , C1 , T2 |
| S1 , C1 , T1 | S2 , C1 , T1 |
| S1 , C1 , T1 | S2 , C1 , T2 |
| ⋮ | ⋮ |
|  |  |

Fig. 21C

| OBJECT CONTROL STATE STORAGE MEANS | C2(STATE IN WHICH COOLER IS ON) |
|---|---|

| NEXT SYSTEM STATE | PRESENT X-COORDINATE | PRESENT Y-COORDINATE | NEXT X-COORDINATE | NEXT Y-COORDINATE | PARAMETER |
|---|---|---|---|---|---|
| S1.C1.T1 | 0 | 0 | 0 | 0 | N |
| S1.C1.T2 | 0 | 0 | 1 | 0 | N |
| S1.C1.T1 | 1 | 0 | 2 | 0 | N |
| S2.C1.T2 | 1 | 0 | 2 | 1 | N |
| S2.C1.T1 | 2 | 1 | 3 | 1 | N |
| S2.C2.T2 | 3 | 1 | 4 | 1 | S |
| S2.C2.T2 | 4 | 1 | 5 | 1 | N |
| S2.C1.T2 | 4 | 1 | 5 | 2 | N |
| S1.C1.T1 | 3 | 1 | 4 | 3 | N |
| S1.C1.T2 | 3 | 1 | 4 | 4 | N |
| S1.C1.T2 | 2 | 1 | 3 | 5 | N |
| S1.C1.T1 | 2 | 0 | 3 | 6 | N |
| S2.C1.T1 | 1 | 0 | 2 | 7 | N |
| S2.C1.T1 | 0 | 0 | 1 | 8 | N |
| S2.C1.T2 | 0 | 0 | 1 | 9 | N |

Fig. 29

| PRECEDING CONTROL STATE | NEXT CONTROL STATE |
|---|---|
| A | B |
| B | C |
| C | A |
| W | X |
| W | Y |
| X | Z |
| Y | Z |
| Z | W |
| H | I |
| I | J |
| J | H |

UST

Fig. 36A

| TRANSITION | | RESTRAINT CONDITION | |
|---|---|---|---|
| PRECEDING STATE OF CONTROL | NEXT STATE OF CONTROL | PRECEDING STATE OF CONTROL | NEXT STATE OF CONTROL |
| B | C | I | J |
| W | X | B | B |
| W | Y | A | A |
| X | Z | C | C |
| X | Z | J | J |
| Y | Z | I | J |
| H | I | W | Y |
| Z | W | J | H |

SRT

Fig. 36B

| INITIAL SYSTEM STATE | A . X . H |
|---|---|

IST

Fig. 36C

| PRECEDING SYSTEM STATE | NEXT SYSTEM STATE |
|---|---|
| ENTRY | A , W , H |
| A , W , H | A , Y , I |
| A , Y , I | A , Z , J |
| A , Y , I | B , Y , I |
| B , Y , I | C , Z , J |
| B , Z , J | B , W , H |
| C , Z , J | C , W , H |
| C , Z , J | A , Z , J |
| B , W , H | B , X , H |
| C , W , H | A , W , H |
| B , X , H | D. L. |

Fig. 37

| NEXT SYSTEM STATE | PRESENT X-COORDINATE | PRESENT Y-COORDINATE | NEXT X-COORDINATE | NEXT Y-COORDINATE | PARAMETER |
|---|---|---|---|---|---|
| A.W.H | 0 | 0 | 0 | 0 | N |
| A.Y.I | 0 | 0 | 1 | 0 | N |
| A.Z.J | 1 | 0 | 2 | 0 | N |
| A.W.H | 2 | 0 | 3 | 0 | N |
| B.Z.J | 2 | 0 | 3 | 1 | N |
| B.W.H | 3 | 1 | 4 | 1 | N |
| B.X.H | 4 | 1 | 5 | 1 | D |
| B.Y.I | 1 | 0 | 2 | 2 | N |
| C.Z.J | 2 | 2 | 3 | 2 | N |
| C.W.H | 3 | 2 | 4 | 2 | N |
| A.W.H | 4 | 2 | 5 | 2 | N |
| A.Z.J | 3 | 2 | 4 | 3 | N |

Fig. 38

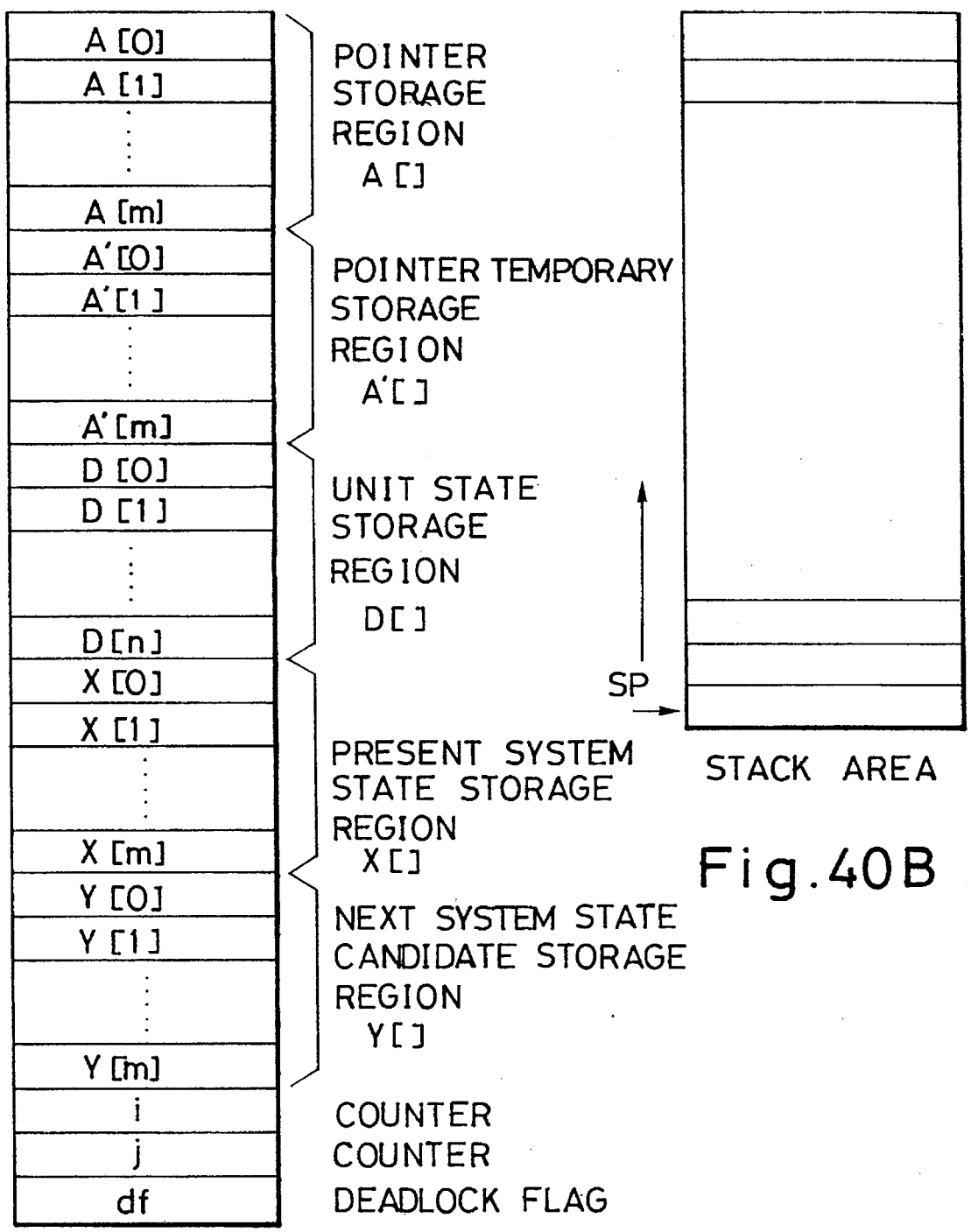

| SEQUENCE | 1 | 2 | 3 | 4 | ... |
|---|---|---|---|---|---|
| INITIAL STARTING PA | PA NAME | PA NAME | PA NAME | PA NAME | ... |

| SEQUENCE | THERMAL SENSOR | COOLER | SOFTWARE TIMER |
|---|---|---|---|
| INITIAL STARTING PA | S1 | C1 | T1 |

Fig. 48B

| OPERATION COMPLETED PA | CONDITION POINTER | STARTING PA |
|---|---|---|
| S 1 | UNCONDITIONARY | S 2 |
| S 2 | UNCONDITIONARY | S 1 |
| C 1 | POINTER | C 2 |
| T 1 | UNCONDITIONARY | T 2 |
| T 2 | UNCONDITIONARY | T 1 |

| CONDITION PA DATA |
|---|
| S 2 |
| T 2 |
| E O D |

Fig. 49B

| COMPLETION PA | STARTING PA | CONDITION POINTER | FORCIBLY COMPLETED PA | NEXT STARTING PA |
|---|---|---|---|---|
| S2 | S1 | UNCONDITIONAL | C2 | C1 |
| T2 | T1 | UNCONDITIONAL | C2 | C1 |

Fig. 51A

| SEQUENCE | 1 | | | | 2 | | | | ... |
|---|---|---|---|---|---|---|---|---|---|
| STRUCTURAL PA | PA NAME | PA NAME | PA NAME | PA NAME | PA NAME | PA NAME | PA NAME | PA NAME | ... |
| I/O PORT | PORT ADDRESS | PORT ADDRESS | PORT ADDRESS | PORT ADDRESS | PORT ADDRESS | PORT ADDRESS | PORT ADDRESS | PORT ADDRESS | ... |

Fig. 51B

| SEQUENCE | THERMAL SENSOR | | COOLER | | SOFTWARE TIMER | | ... |
|---|---|---|---|---|---|---|---|
| STRUCTURAL PA | S1 | S2 | C1 | C2 | T1 | T2 | ... |
| I/O PORT | PORT ADDRESS | PORT ADDRESS | PORT ADDRESS | PORT ADDRESS | PORT ADDRESS | PORT ADDRESS | ... |

Fig. 52A

| SEQUENCE | 1 | 2 | 3 | 4 | ... |
|---|---|---|---|---|---|
| EXECUTION PA | PA NAME | PA NAME | PA NAME | PA NAME | ... |

Fig. 52B

| | THERMAL SENSOR | COOLER | SOFTWARE TIMER |
|---|---|---|---|
| EXECUTION PA | S1 | C1 | T1 |

APPARATUS AND METHOD FOR PREDICTING THE OPERATION OF A SYSTEM IN WHICH A PLURALITY OF INDIVIDUAL PROCESSING ELEMENTS ARE OPERATED IN PARALLEL

This application is a continuation of application Ser. No. 07/392,274 filed Aug. 9, 1989, now abandoned.

BACKGROUND OF THE INVENTION

1. Field of the Invention

The present invention relates to a system control apparatus capable of controlling in parallel a plurality of processing portions each of which has an individual function or soft modules and acting in association as a system. In particular, the present invention relates to a system control apparatus for controlling a laser beam printer (LBP) or a copying machine.

2. Description of the Related Art

In a system such as a copying machine or a laser beam printer arranged such that a plurality of processing portions, each of which has an individual processing function, are included and the plurality of these processing portions needs to be controlled in parallel, each of the control operations for controlling the plurality of processing portions is performed in parallel. Therefore, systems of the type described above suffer from the disadvantage that a deadlock (a state in which the apparatus cannot be operated) occurs due to the time sequential flow between the control operations if the sequential order in which the control operations are performed is incorrect. In order to prevent a deadlock of this type or to scrutinize the specifications of the control program that acts to perform the control operations, the system needs to be controlled on the basis of a prediction of all of the probable operations in this system. Such prediction methods can be classified into the following three types:

(1) an operation prediction on the basis of the specification i.e.;
   a mathematical operation prediction method on the basis of a specification notation employing a Petri net;

(2) an operation prediction from the program code; i.e. sequential static structural tests called "a coverage test"; and (3) an operation prediction using the actual device, i.e. an operation prediction method in which the subject system is operated by using an ICE (In Circuit Emulator) or the like in a state which simulates the actual operation of the device.

However, the above-described conventional scrutinizing methods suffer from the following problems.

(1) The operation prediction on the basis of the specification.

In the notation made on the basis of the Petri net, the state of control of each of the units, the sequential order of the control of the units, and the time restriction between the units are respectively expressed by the same definition factors consisting of a transition and an arrow. Therefore, it is difficult to grasp the sequential order of control which is individual to each of the units in the control subject system, causing a difficulty in intuitively grasping the relationship between the structure of the system and the specifications. Furthermore, by using the above notation method it is difficult to describe the specifications for the system and it is difficult to understand and maintain the described specifications. Such disadvantages limit the wide use of this method to predict the operation of the system.

The usual notation method of the real time system is arranged in such a manner 1) that the state of the control of each of the units and the restriction of the sequential order between the units are shown by describing the individual state transition table for each of the units and 2) that the order of the state of control between the units are individually complemented by timing charts or documents in order to make the units operate in cooperation with each other as a system. Since the conventional system state transition table is manually written, a considerable amount of effort is needed. Furthermore, the transition table of the state of a system is structured in such a manner that the table has a circular form, causing difficulty in understanding the table since the lines expressing the transitions of the states of the system intersect each other. In addition, since the only states to be expressed are those that are probable to be reached, it has been difficult to examine all of the states which can be realized in a complicated system. For example, when a system is designed, the designer studies whether the system can be brought to a dangerous state in order to provide a fail safe operation. However, all of the states of the system cannot be subjected to the above-described type of checking on the basis of the above-described state transition table, and there has not, as yet, been a such method.

(2) The operation prediction from the program.

The conventional coverage test to be subjected to the source code is capable of examining substantially the whole portion of the static structure of a program. However, since this test is not arranged to correspond to the sequential order of all of the probable programs which can be allowed to occur in the system, it cannot predict the operation of the system.

(3) An operation prediction using the actual device

The operation prediction method in which an ICE (In Circuit Emulator) or the like is employed in an actual device is capable of predicting the operations which might be considered to occur in the environment by predicting the environment to which the system is to be subjected. However, it is difficult to predict all of the probable environments to which the system is subjected and to predict all of the operations that will probably be performed in these environments. In general, when a control system of the type described above is designed and changes are to be made, the earlier in the development process in which the changes are made, the lower the cost to modify the program. Such changes are made as a result of predicting the operation of the system. However, the predicting of the operation of the system by means of the ICE or the like is conducted near the final stage in the development of the device. Therefore the costs of developing the device will escalate.

SUMMARY OF THE INVENTION

An object of the present invention is to provide a system operation prediction apparatus capable of confirming the probable states of the system by predicting the probable states by using information about the specifications of a system.

Another object of the present invention is to provide a system operation prediction apparatus capable of predicting, in the initial stage of the development, generation of deadlock by extracting, in the initial state of the development, the states of the system including the state in which the deadlock can be generated from the probable states of the system.

A further object of the present invention is to provide a system operation prediction apparatus capable of predicting the operation of the system by automatically originating a tree structure whose lines expressing the transition of probable states of the system do not intersect each other.

A still further object of the present invention is to provide a system operation prediction apparatus capable of readily originating reliable specifications of the system involving any missing portion by determining a probability of discriminating a state to which the system can be brought and a state to which this system cannot be brought.

Another object of the present invention is to provide a system operation prediction apparatus capable of readily determining the flow of the operation of the system which is brought to an assigned state of control by determining a probability of discriminating the state of a specific state of the probable states of the system.

Another object of the present invention is to provide a system operation prediction apparatus capable of performing a processing operation on the basis of the specifications of a system by inputting information about the specifications in the form of a graphic language and by converting it to information about the specification which can be automatically executed from this language.

Another object of the present invention is to provide a system operation prediction apparatus capable of readily performing change in and standardization of the specifications of the system by defining the operations of the processing elements performing each of the processing operations after the operations have been separated into processing procedures such as the control procedures, and capable of effectively extending the system or processing a control program.

In order to achieve the above-described objects, the system operation predicting apparatus according to the present invention comprises:

input means for inputting information about the specifications for the system in a graphic language;

storage means for processing and storing, on the basis of the graphic language input by the input means, a state of control and a control sequence for each of the processing elements forming the system; and originating means for originating a state diagram about the operation of the system on the basis of the state of control and the control sequence stored in the storage means.

A system control apparatus according to the present invention for operating a system operation by controlling a plurality of individual processing elements in parallel comprises:

input means for inputting information about the specifications for the system in a graphic language;

storage means for processing and storing, on the basis of the graphic language input by the input means, a state of control and a control sequence for each of the processing elements forming the system;

condition storage means for determining and storing starting conditions and completed conditions for the operation state on the basis of the graphic language; and control means for controlling each of the processing elements on the basis of each of conditions, the operation state, and sequential order of transition stored in the condition storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view which illustrates states and transitions of the same;

FIG. 3 is a view which illustrates an example of an output of a flag;

FIG. 4 is a view which illustrates the relationship between the transition state and the flag and a trigger;

FIG. 5 is a view which illustrates an output of the flag from unit b to unit a;

FIG. 6 is a view which illustrates the relationship between the state of the flag and the execution of the transition;

FIGS. 14A and 14B are views which illustrate an example of the defining of the specifications according to this embodiment;

FIGS. 15A to 15C respectively illustrate a UST, an SRT, and an IST files;

FIGS. 16A and 16B are views which illustrate an example of data of the SST file;

FIG. 17 is a view which illustrates a dynamic state according to this embodiment;

FIGS. 18A and 18B are views which respectively illustrate an RT file and a URT file;

FIGS. 21C is a view which illustrates an example of the contents of the SST file;

FIG. 28 is a view which illustrates an example of an object state registration table;

FIG. 29 is a view which illustrates an example of a TT file;

FIGS. 36A to 36C are views which respectively illustrate the UST, the SRT, and the IST files;

FIG. 37 is a view which illustrates an example of data in the SST file;

FIG. 38 is a view which illustrates the TT file;

FIG. 40 and 40B a view which illustrates an example of data for the working memory;

FIGS. 48A and 48B are views which illustrate information about the state of storage in an initial PA table;

FIGS. 49A and 49B are views which illustrate information about the state of storage in a starting condition table;

FIG. 51A and 51B a view which illustrates information about the state of storage in an I/O map table;

FIG. 52A and 52B a view which illustrates information about the state of storage in an execution PA table;

FIG. 55A and 55B are a flow chart which illustrates the forced stopping of the PA processing according to the third embodiment;

DESCRIPTION OF THE PREFERRED EMBODIMENTS

Preferred embodiments according to the present invention will be in detail described with reference to the accompanying drawings.

[Description of the Overall Structure (FIG. 1)]

Figure 1:
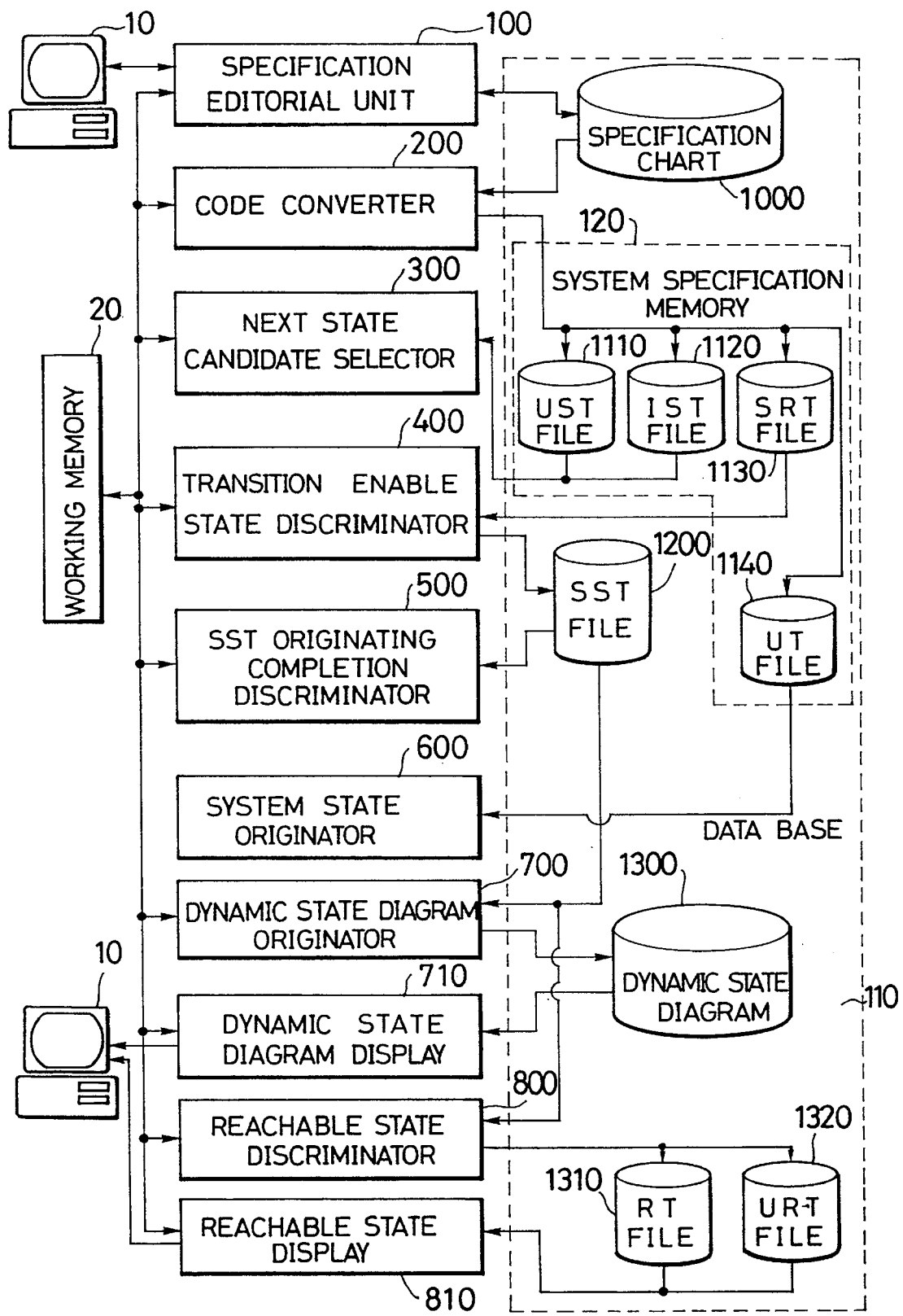
FIG. 1 is a block diagram which illustrates the schematic structure of a system according to a first embodiment.

FIG. 1 is an overall structural view which illustrates an embodiment of the present invention.

Referring to FIG. 1, reference numeral 10 represents an input/output device including a data input portion which comprises a keyboard and the like and a data output portion which comprises a CRT or the like so that an operator is capable of performing inputting and outputting of data through this input/output device 10 in an interactive manner. Reference numeral 100 represents a specification-editorial unit which make a file 1000 on a data base 110 store the specifications of a parallel control system expressed in accordance with a real time system notation method to be described hereinafter and to be input through the input/output device 10. Reference numeral 200 represents a code converter for processing files 1110 to 1140 to be described later and provided on the data base 110 in a system specification memory 120 on the basis of the system specifications stored in the file 1000.

The files 1110 to 1140 will be described in detail. Reference numeral 1110 represents a UST (Unit Sequence Table, to be called "a UST" hereinafter) file capable of storing the state of control of each of the units in the system and the sequential order between the states of the control. Reference numeral 1120 represents an IST (Initial State Table, to be called "an IST" hereinafter) file storing the initial state of the system. Reference numeral 1130 represents an SRT (System Restraint Table, to be called "an SRT" hereinafter) file capable of storing the time restraint present between units. Reference numeral 1140 represents a UT (Unit Table, to be called "a UT table" ereinafter) file capable of storing the state of control involved by the sequence of each of the units.

Reference numeral 300 represents a next state candidate selector capable of selecting the candidate for the next state in accordance with the contents of the UST file 1110, the IST file 1120, and the working memory 20 so as to make the thus-selected candidate in the working memory 20. Reference numeral 400 represents a transition enable discriminator which determines the next state on the working memory 20 which has been selected from the next state candidate selector 300 on the basis of the transition restraint information in the SRT file and transmitting an output to an SST file 1200 (System Sequence Table, to be called "SST" hereinafter) which stores the sequential order of the state of the system if it is determined that the transition can be performed. Reference numeral 500 represents an SST originating completed discriminator capable of determining whether or not the processing performed by the SST file has been completed on the reference made to the SST file 1200.

Reference numeral 600 represents a system state originator capable of extracting all of the probable states of the system on the basis of the contents of the UT file 1140. Reference numeral 700 represents a dynamic state diagram originator capable of processing a dynamic state diagram 1300 on the basis of contents of the SST file 1200 in the data base 110. Reference numeral 710 represents a dynamic state diagram display for outputting the dynamic state diagram 1300 to the input/output portion 10 including a CRT and the like so as to display the same. Reference numeral 800 represents a reachable state discriminator for processing an RT file 1310 or a URT file 1320 on the data base 110 on the basis of information stored in the SST file 1200, where the RT (Reachable Table) file 1310 stores the reachable state of the system, while the URT (un-reachable Table) file 1320 stores the un-reachable state of the system. Reference numeral 810 represents a reachable state display for displaying the reachable state of the system in the input/output device 10 with reference made to the RT file 310 and the URT file 1320 in the data base 110. Each of the components 100 to 810 are arranged to be aided by a computer (it, of course, comprising a computing portion, processing memories, a control memory for storing the processing procedure represented by a flow chart to be described later, and an interface acting to transmit and receive information). The working memory 20 is structured as to be accessed from each of the components 100 to 810. A detailed description about the working memory 20 will be provided later.

[Description of Specification Notation method (FIGS. 2 to 12)]

The specification notation method for the real time system capable of defining the specification to be stored in the specification memory in the real time system according to this embodiment will be described prior to making reference to the description about the operation of the system shown in FIG. 1.

FIG. 2 is a view which illustrates an example of the graphical description in which the specification notation method for the real time system according to this embodiment is employed.

Referring to the drawing, as elements for describing the specifications for illustrating the sequential order for controlling each of the units, a circular portion designated by reference numeral 1 illustrates a controlled state, while reference numeral 2 represents a transition from a controlled state to the next controlled state. As elements for describing the specifications for illustrating the time restraint between the units, reference numeral 3 represents a flag, while reference numeral 4 represents a component called "a trigger".

Then, these description elements will be described in detail.

The controlled state designated by reference numeral 1 comprises description elements showing operations executed for a certain time period of a plurality of operations executed by each of the units, the description elements being designated by individual symbols so as to correspond to the types of the operation, where all of the controlled states are described by using circles and each of the controlling operations is given a name in order to specify the operation. These controlled states are arranged such that a flag 3 with which a unit can notify the other units the present state of control can be, as shown in FIG. 3, connected thereto.

The transition shown by reference numeral 2 comprises description elements showing the sequential order of operation of each of the units, the transition being designated by a directed arc shown by a continuous line directed from a certain controlled state to the next controlled state. For clarity, the controlled state of the two types of the controlled states connected by a certain transition and to be executed earlier is called "a leading controlled state", the next controlled state is called "a last controlled state", and the leading controlled state of a certain transition to the last controlled state is called "an execution of transition"; this execution of transition is arranged to be completed within a certain time period which cannot affect the operation of the system described by this specification notation method.

Furthermore, as factors to restricting the start timing for starting the execution of the transition, flag 3 and trigger 4 can be connected to the transition. In a case where no flag or trigger are connected, the transition is executed when the leading controlled state is executed. The transition in the case where flag 3 and trigger 4 are connected thereto will be described later. As shown in FIG. 4, a trigger 4a which has been transmitted from the transition can be connected to the transition in order to notify the other units of the point at which the transition has been executed.

Then, the state of transition by means of the flag will be described.

The flag 3 serves as a description element for defining the starting time for executing the transition in accordance with the state of execution of the controlled state, this flag 3 being expressed by a symbol which relates the transition to be defined and at least a controlled state. In this embodiment, the flag 3 is expressed by a directed arc shown by a dashed line directed from a certain controlled state PAa to the transition 2 whose execution time point is intended to be defined.

The time restraint related to this transition is shown in FIG. 5.

The control flag 3 is generated during a time interval in which controlled state PAa is being executed, and PA1 starts upon the allowance of the execution of the transition after controlled state PA2 has been completed. In the unit b, PAb starts when the execution of PAa is completed.

FIG. 6 is a view which collectively illustrates the conditions for executing the transition performed by the flag 3. As shown in FIG. 6, if the flag turns on, the transition is not executed so far as the controlled state is being processed. The transition is executed after the main processing has been completed.

Then, the transition of the state performed by the trigger 4 will be described.

The trigger 4 also serves as a description element for defining the executing timing of a specific transition in accordance with the state of execution of the controlled state, this trigger 4 being expressed by a symbol which relates a specific transition and at least another transition. This trigger 4 acts, when a certain transition is executed, to forcibly execute another specific transition. The execution of the thus-forced transition is arranged to be completed simultaneously with the execution of the original transition or within a time period which does not affect the sequential order of operation of the system from the execution of the transition.

Figures 7, 8:
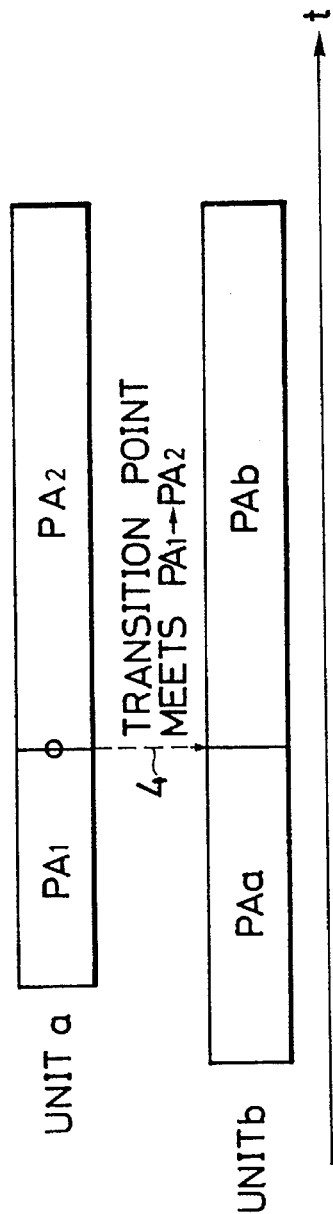
FIG. 7 is a view which illustrates a trigger output and the transition from unit a to unit b.
FIG. 8 is a view which illustrates the relationship between the state of the trigger and the execution of the transition.

This trigger 4 is, as shown in FIG. 2, described with a directed arc 4 designated by a double arrow dashed-line directed from a certain transition (PA1→PA2) toward a transition (PAa→PAb) whose execution timing is intended to be defined. The transition timing in this state is shown in FIG. 7, where when the transition connected to the trigger 4 from the controlled state PA1 to PA2 is executed, execution of the transition from PAa to PAb starts. FIG. 8 is a view which collectively illustrates the conditions for executing the transition by means of the trigger 4. As is shown in FIG. 8, when the trigger 4 is input, a transition is immediately executed regardless of the state of the control.

The timing of a further complicated transition can be defined by using both the flag and the trigger above and this situation will be described.

<Product of a plurality of flags>

Figure 9A:
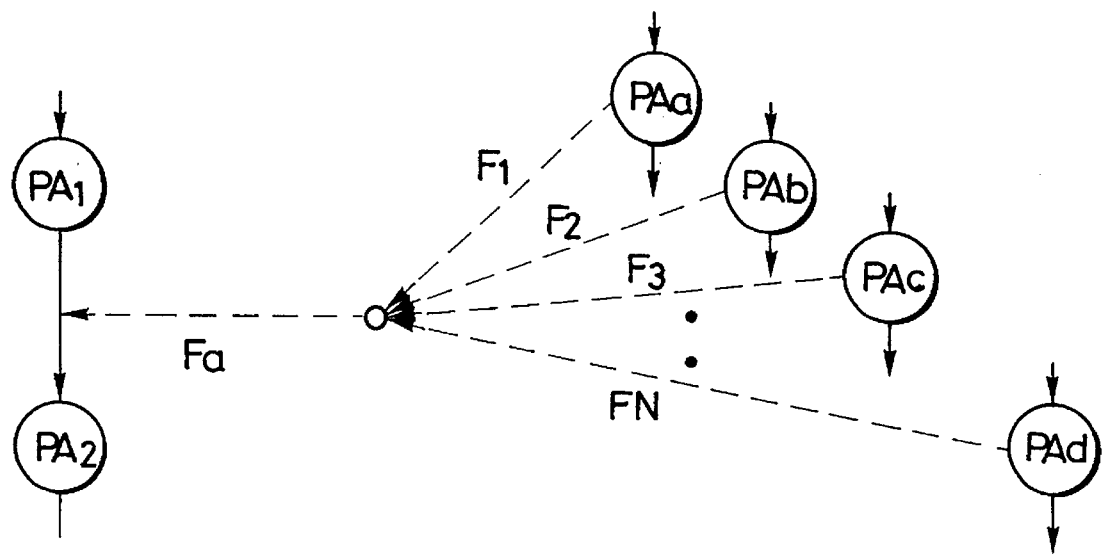
FIGS. 9A and 9B are views which illustrate the combination of a plurality of flags.
Figure 9B:
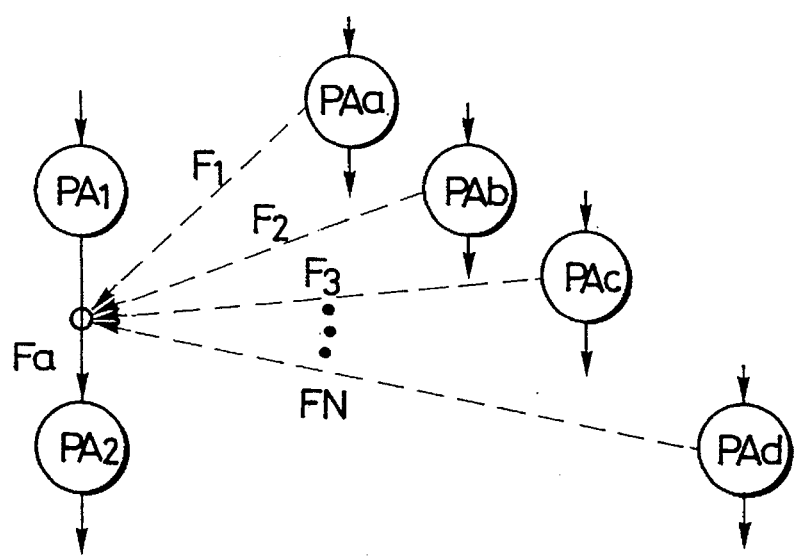

FIGS. 9A and 9B are views which illustrate an example of the definition of an executing timing for a specific transition made by combining a plurality of flags, where the state of combination of the products of the flags is designated by a symbol O.

This state of the combination shows the fact that the execution of the transition (PA1→PA2) related to these flags is permitted during only the time period in which all of the controlled states which are the origins of these flags F1 to Fn is being executed, according to the above-described definition upon the timing for executing the transition by the flag described with reference to FIG. 6. Therefore, these combined flags are called "composed flag Fa" and are treated similar to the above-described flags.

<Product of a plurality of triggers>

Figure 10A:
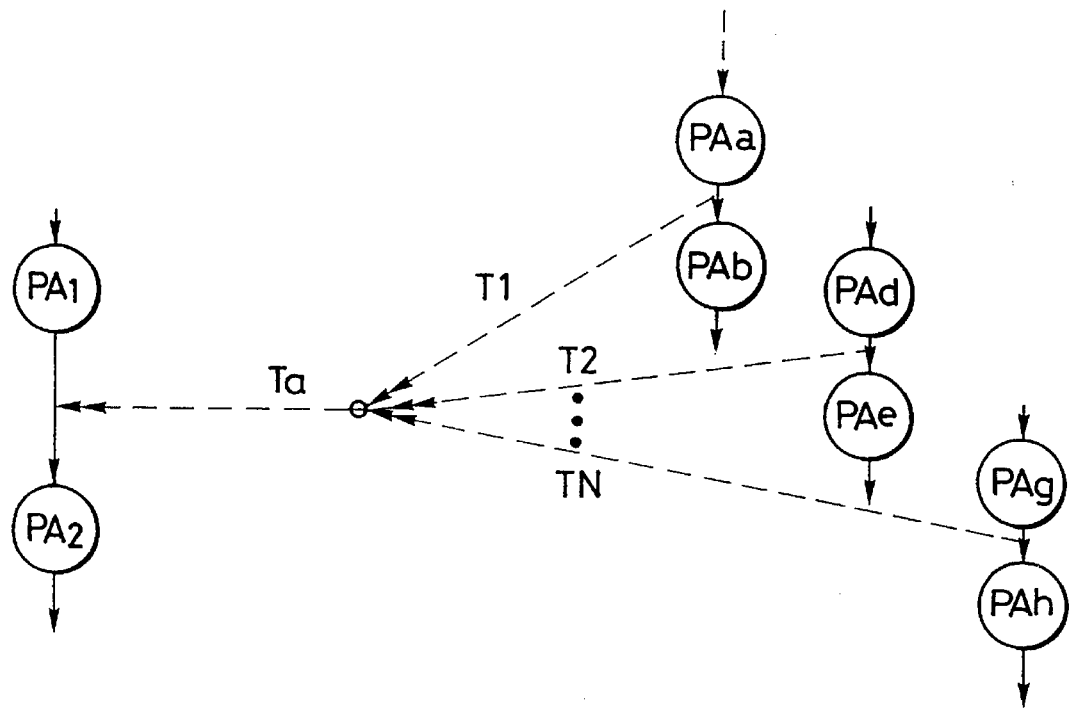
FIGS. 10A and 10B are views which illustrate the combination of triggers.
Figure 10B:
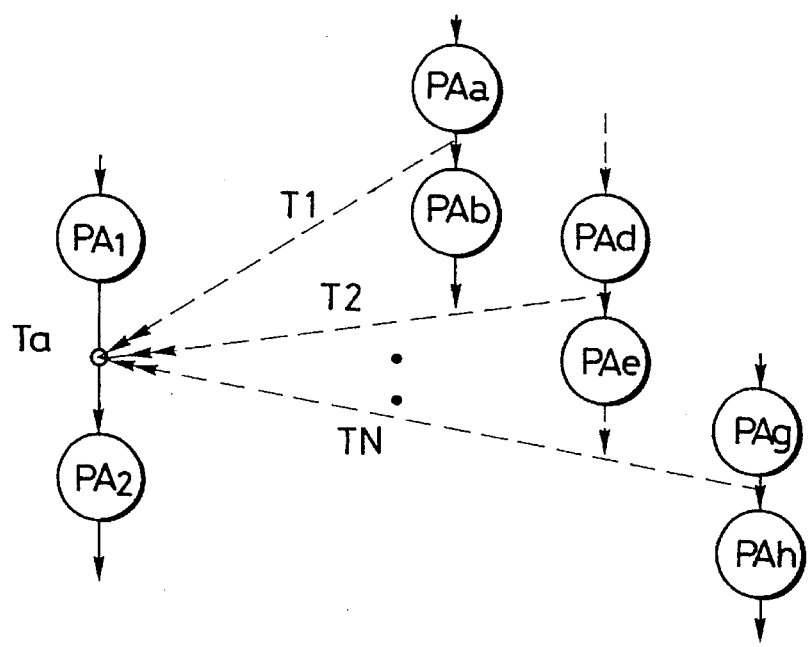

FIGS. 10A and 10B are views which illustrate an example of the definition of timing for executing the specific transition (PA1→PA2) by means of combining a plurality of triggers (T1 to Tn), where the state of combination of the products of the triggers is designated by a symbol O. This state of the combination shows the fact that the execution of the specific transition (PA1→PA2) to which the above triggers have been input is forced when all of the transitions which are the origins of the triggers generates simultaneously, according to the time restriction for the above-described execution of the transition by means of the trigger with reference made to FIG. 8. Therefore, these combined triggers are called "composed trigger Fa" and are treated similar to the above-described triggers.

<Product of a plurality of triggers and a plurality of flags>

Figure 11:
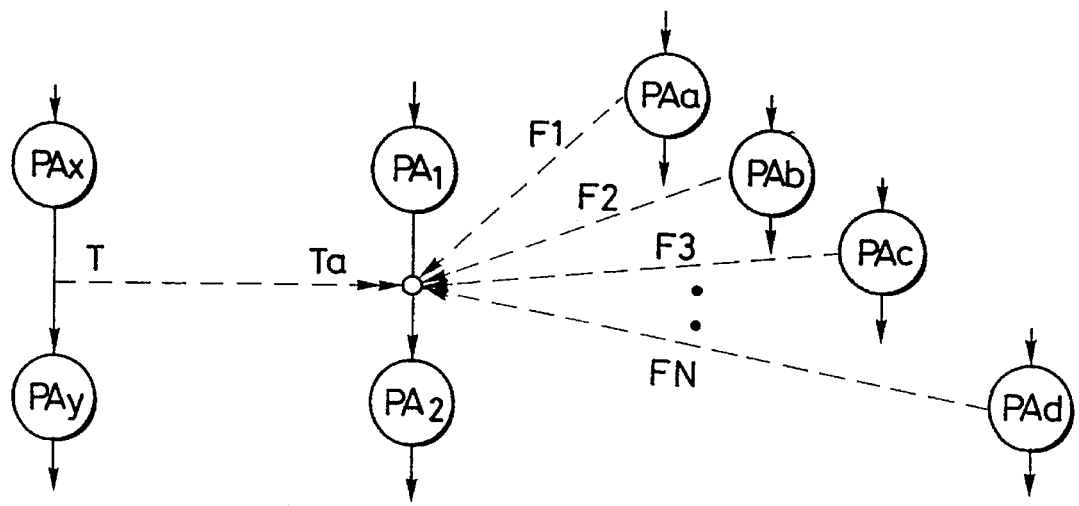
FIG. 11 is a view which illustrates the combination of a plural of flags and triggers.

FIG. 11 is a view which illustrates an example in which the timing for execution of the specific transition (PA1→PA2) is defined by the combination of a trigger T and a plurality of flags F1 to Fn, where the combination of the products of the trigger and the flag is designated by a symbol O.

This state of the combination shows the fact that the execution of the transition (PA1→PA2) related to the flags F1 to Fn is permitted only at the time of the transition (PAx→PAy) which is the origins of these trigger T during execution of all of the controlled states which are the origins of these flags F1 to Fn. Therefore, this combination can be treated as a composed trigger (a trigger Ta). Furthermore, the general product of a plurality of triggers and flags can be concluded into the above-described example by treating the product of a plurality of the triggers as a composed trigger.

<Sum of an arbitrary number of flags and triggers>

Figure 12:
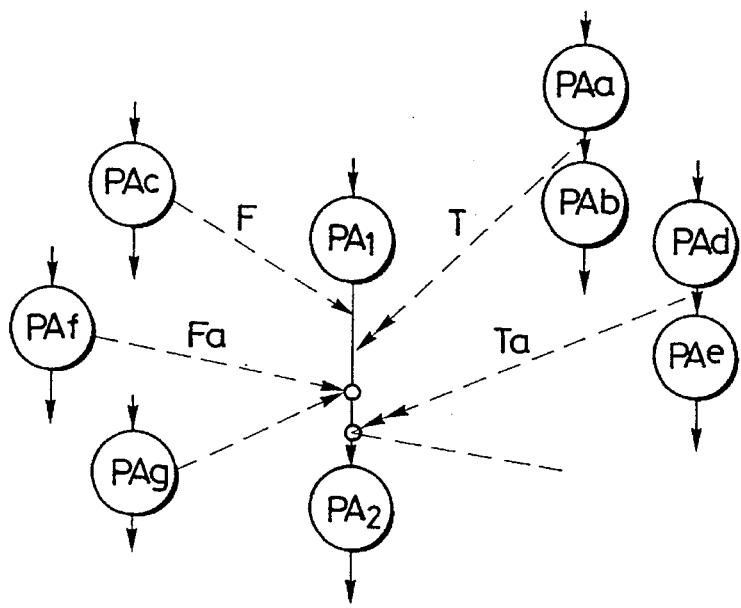
FIG. 12 is a view which illustrates the combination of a plurality of flags and a plurality of triggers.

FIG. 12 is a view which illustrates an example in which an arbitrary numbers of flags F, composed flags Fa, triggers T and composed triggers Ta are used in the same transition in order to define the execution timing for the specific transition ((PA1→PA2). In this example, the execution of the transition is generated at the time at which the transition is conducted at the first occurring under the above conditions. This type of combination is called "the sum of the flags or triggers". In order to express this type of relationship, that is, the sum of the flags and triggers, the parallel connection of the flags, the composed flags, the triggers, and the composed triggers to the transition, which is capable of giving time restriction by a required number, is used as a symbol.

Figure 13A:
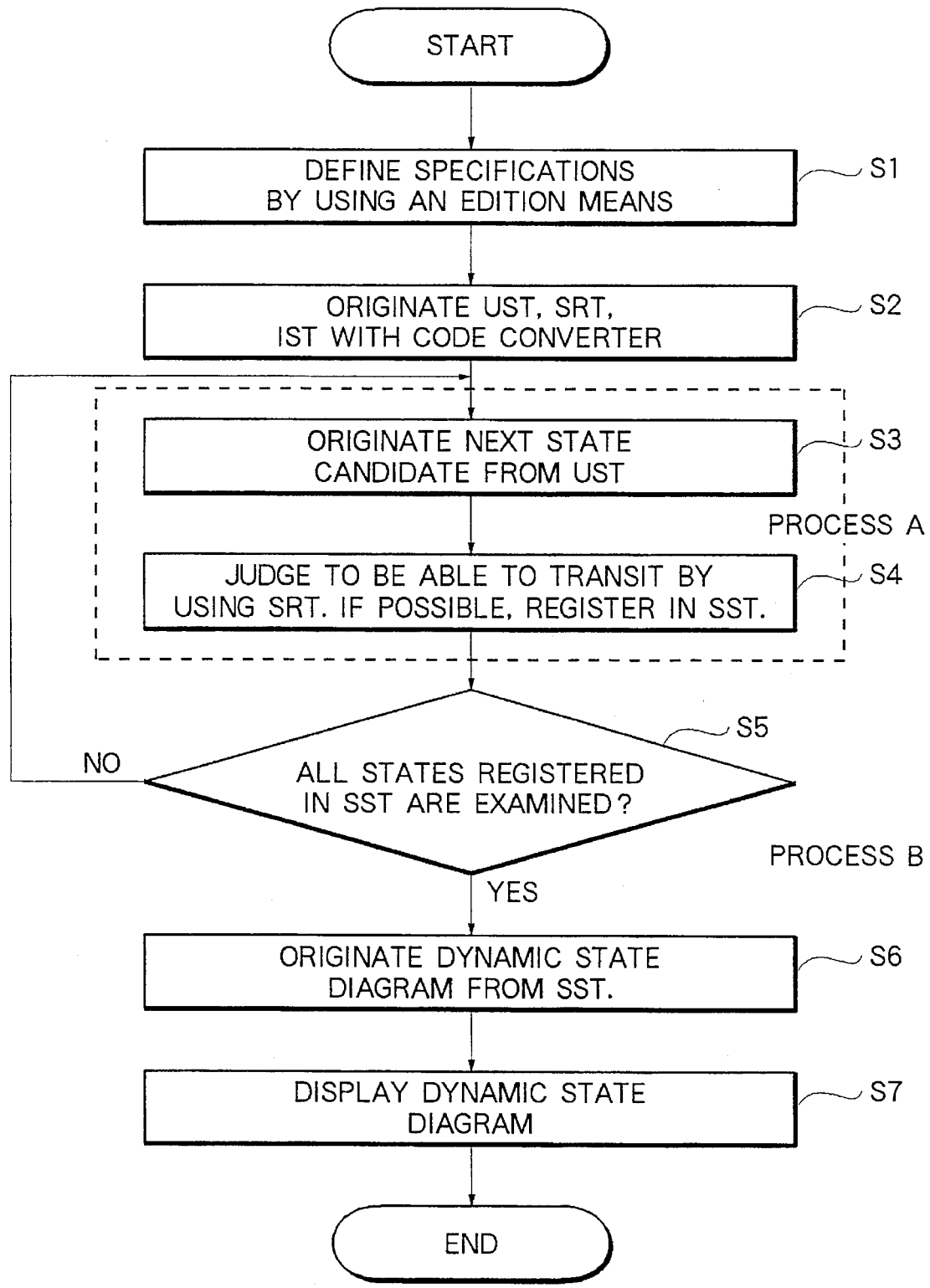
FIGS. 13A and 13B are flow charts which illustrate the processing of a file according to this embodiment.
Figure 13B:
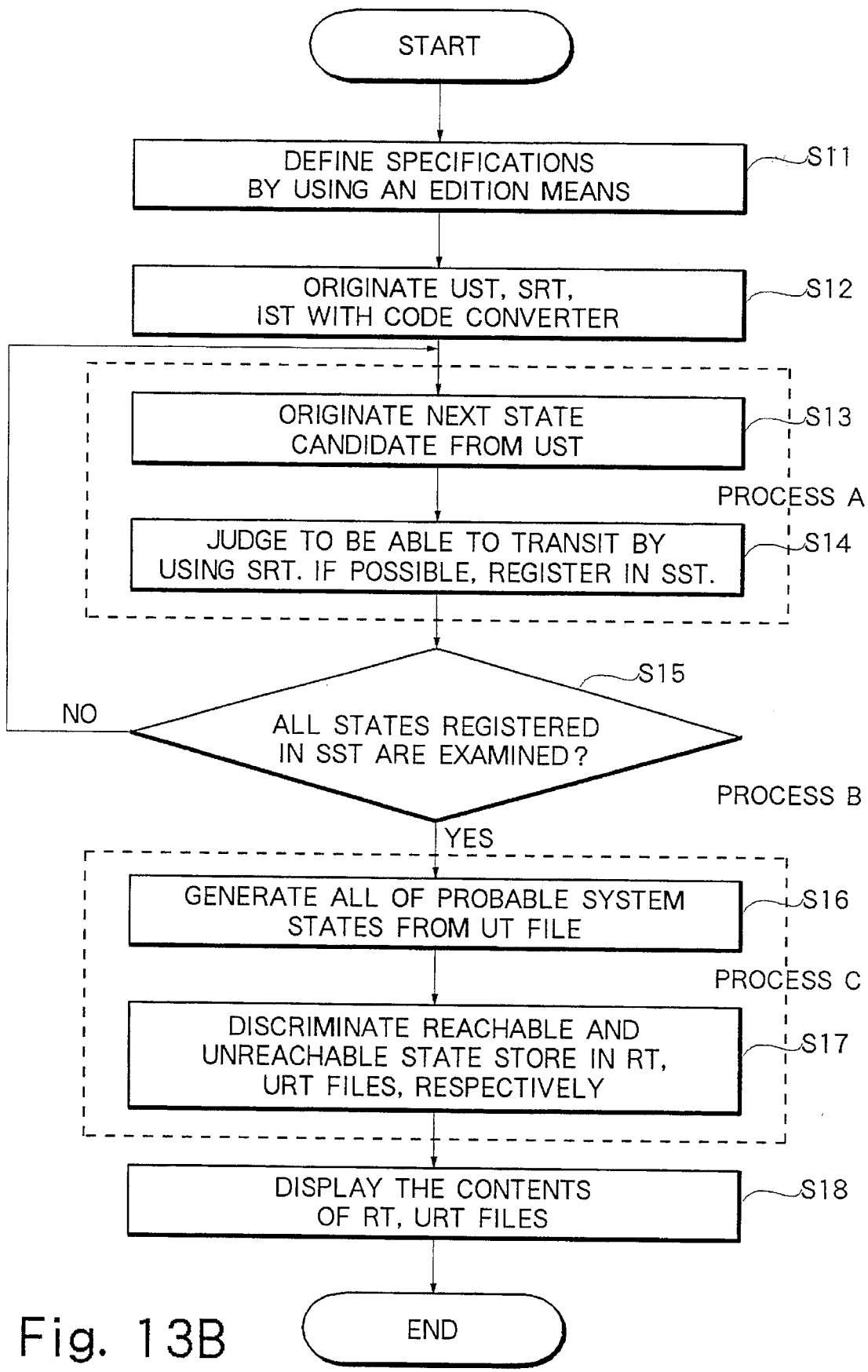

FIGS. 13A and 13B are flow charts which illustrate the processing of the file in the system specification memory 120 according to this embodiment, processing and displaying of the dynamic state chart, and the processings for the RT and URT files. The description of this flow chart will be described later.

[Description of a specific example of definition of the specifications (FIGS. 13 to 17)]

Figure 14A:
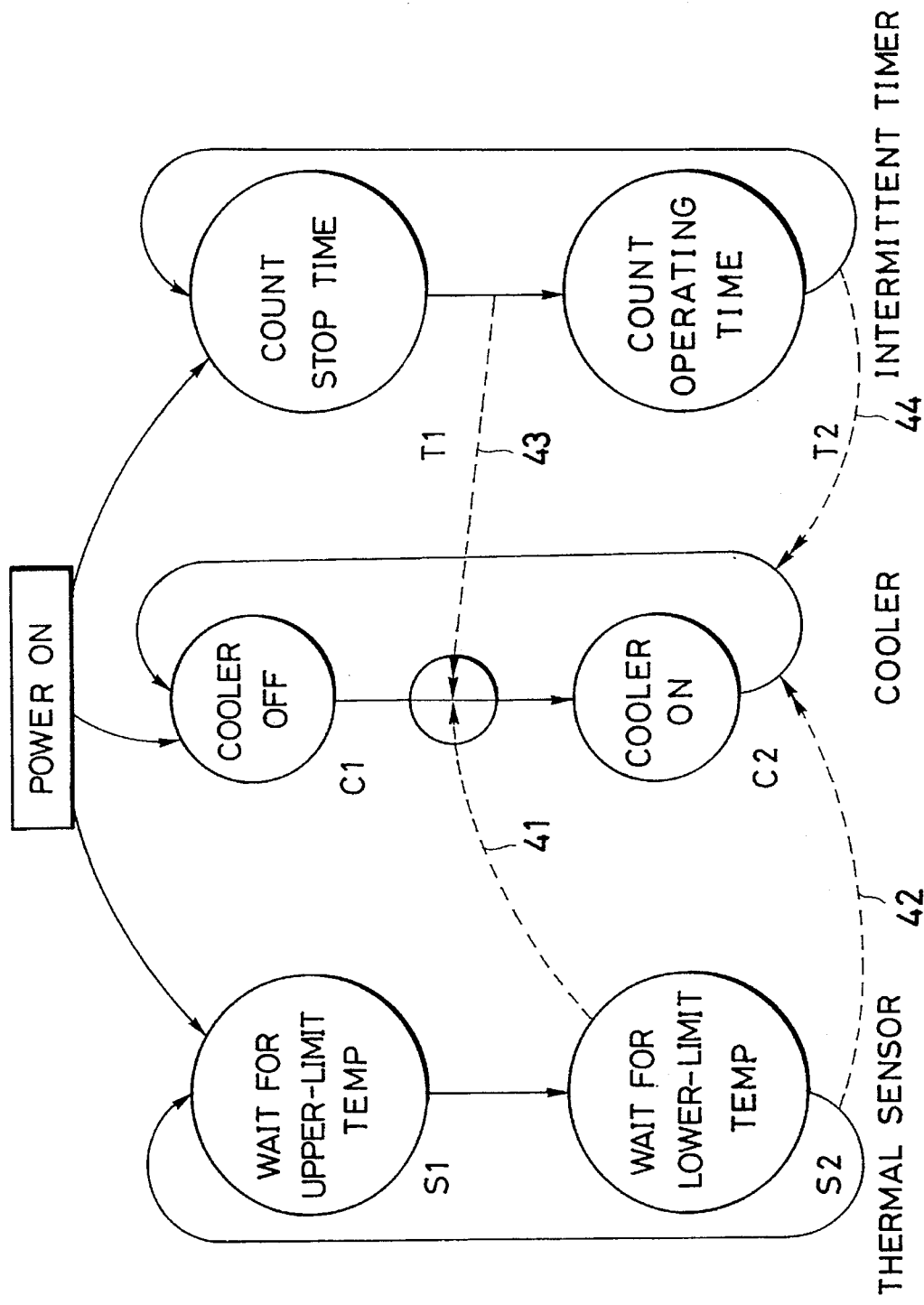

FIG. 14A is a view which illustrates an example of defining the specifications of the subject system in accordance with the specification notation method for the above-described real time system, where the specifications for a thermostat are defined, this thermostat comprising three units, a thermal sensor, a cooler, and an intermittent timer. Next, the operation of the thermostat defined with reference to FIG. 14A will be described.

According to the sequence for this thermal sensor, the mode is brought to a waiting mode for a predetermined upper-limit of temperature immediately after the power has been supplied. When the temperature reaches the predetermined upper-limit, the mode then makes the transition to a waiting mode for a predetermined lower-limit of temperature, this fact being notified to the sequence for the cooler by using a flag 41. When the temperature reaches the lower limit of temperature under condition S2, a trigger 42 (a forced-completed signal) is transmitted to the cooler so that the mode is brought to the upper-limit waiting mode S1 again, and these operations are arranged to then be repeated.

On the other hand, the sequence for the cooler is arranged such that OFF-mode C1 is in effect immediately after the power has been supplied, but the cooler makes the transition to ON-mode C2 when the intermittent timer starts counting the operation time (the trigger 43 is input) during the time when the thermal sensor is waiting for the lower-limit temperature level (during the time when the flag 41 is in ON-mode) according to the sequence for the thermal sensor. When the sequence of the thermal sensor then makes the transition to the upper-limit waiting mode, or when the counting of the operation time is then completed (when the trigger 44 is input), the cooler is returned from the ON-mode C2 to the OFF-mode C1, and the operations described above are arranged to then be repeated.

The sequence for the intermittent timer is arranged such that the time counting mode T1 for the stoppage time and the time counting mode T2 for operation time are executed repeatedly after a power on operation, and the trigger 43 or the trigger 44 is transmitted to the sequence for the cooler when each of the modes is completed.

For clarity, the controlled states of each of the sequences are defined by S1, S2, C1 and the like.

The flow charts shown in FIG. 13A and 13B will be described on the basis of the operation defined with reference to FIG. 14A and 14B.

First, in step S1, an operator defines, as shown in FIG. 14, the specification for the subject system by using the specification editorial unit 100 and through the input/output device 10. In step S2, the UST, the IST, and the SRT files are originated in the code converter 200 on the basis of the thus-defined specifications. FIGS. 15A, 15B, and 15C are views which respectively illustrate examples of the contents of the UST, the SRT, and the IST files which have been originated on the basis of the specifications defined on the basis of FIG. 14A.

FIG. 15A is a view which illustrates an example of the contents in the UST file 1110 in which the preceding controlled state and the next controlled state are expressed. FIG. 15B is a view which illustrates the sequence restraint table (the SRT file) 1130 for the sequence, and FIG. 15C is a view which illustrates an example of the contents in the initial state table (the IST file) 1120.

Referring to FIG. 15B, reference numeral 50 shows the requirements to bring the cooler from the OFF-mode C1 to the ON-mode C2. It is apparent that the coder makes the transition from the OFF-mode C1 to the ON-mode C2 only when the time makes the transition from the stop-time counting mode T1 to the operating-time counting mode T2 with the thermal sensor being brought in the lower-limit temperature waiting mode S2. The stoppage of the cooler (transition from C2 to C1) is executed when the lower-limit temperature waiting mode S2 is completed (from S2 to S1) or when the operating time counting mode is completed (from T2 to T1) as shown by reference numerals 51 and 52. FIG. 15C is a view which illustrates an example of the contents in the IST file, where the modes arranged in the initial state are S1, C1, and T1.

Then, the flow advances to step S3 in which the next system state candidate to which the transition from the present system stored in the working memory 20 is selected on the basis of information stored in the UST file 1120. It is assumed that the present system is in state (S1, C1, T1), transition from C1 to C2 and from S1 to S2 can be conducted in accordance with the UST shown in FIG. 15A. Therefore, states (S1, C2, T1), (S2, C1, T1) or the like can be nominated as the candidate for the next system state. In step S4, whether the transition to the candidates for the next system state exemplified in step S3 from the present system state is determined on the basis of information stored in the SRT file shown in FIG. 15B. If the transition to the exemplified candidate can be conducted, this fact is additionally stored, as the sequential order of the system state, in the SST file 1200 serving as the memory for storing the sequential order of the system state.

As described above, the transition from (S1, C1, T1) to (S1, C2, T1) cannot be conducted due to the restriction according to the SRT 1130. However, the transition from (S1, C1, T1) to (S2, C1, T1) or (S1, C1, T2) can be performed since there is no restriction in the SRT 1200. As described above, a pair consisting of, for example, (S1, C1, T1) and (S2, C2, T1) is registered as the preceding system state and the next system state in the SST file 1200.

FIG. 16 is a view which illustrates an example of the thus-processed SST file 1200. FIG. 16A is a view which illustrates the reachable system state from the initial system state. FIG. 16B is a view which illustrates a portion of the thus-originated SST file 1200.

In step S5, whether all of the reachable states in the subject system has checked is examined. If it is determined all reachable states have been checked, the flow advances to Step S6. However, if there is a system state which has not been subjected to checking, the processings from step S3 are repeatedly executed with the un-checked system state arranged to be the present system state. For example, in the state shown in FIG. 16A, it is apparent that the next states of (S1, C1, T2), (S2, C1, T1), and (S2, C1, T2) have not been examined among the next system states (the reachable system states). Therefore, these un-examined system states are arranged to the present system states, and the processings from step S3 are repeated so that the SST file 1200 shown in FIG. 16B is originated.

Figure 25:
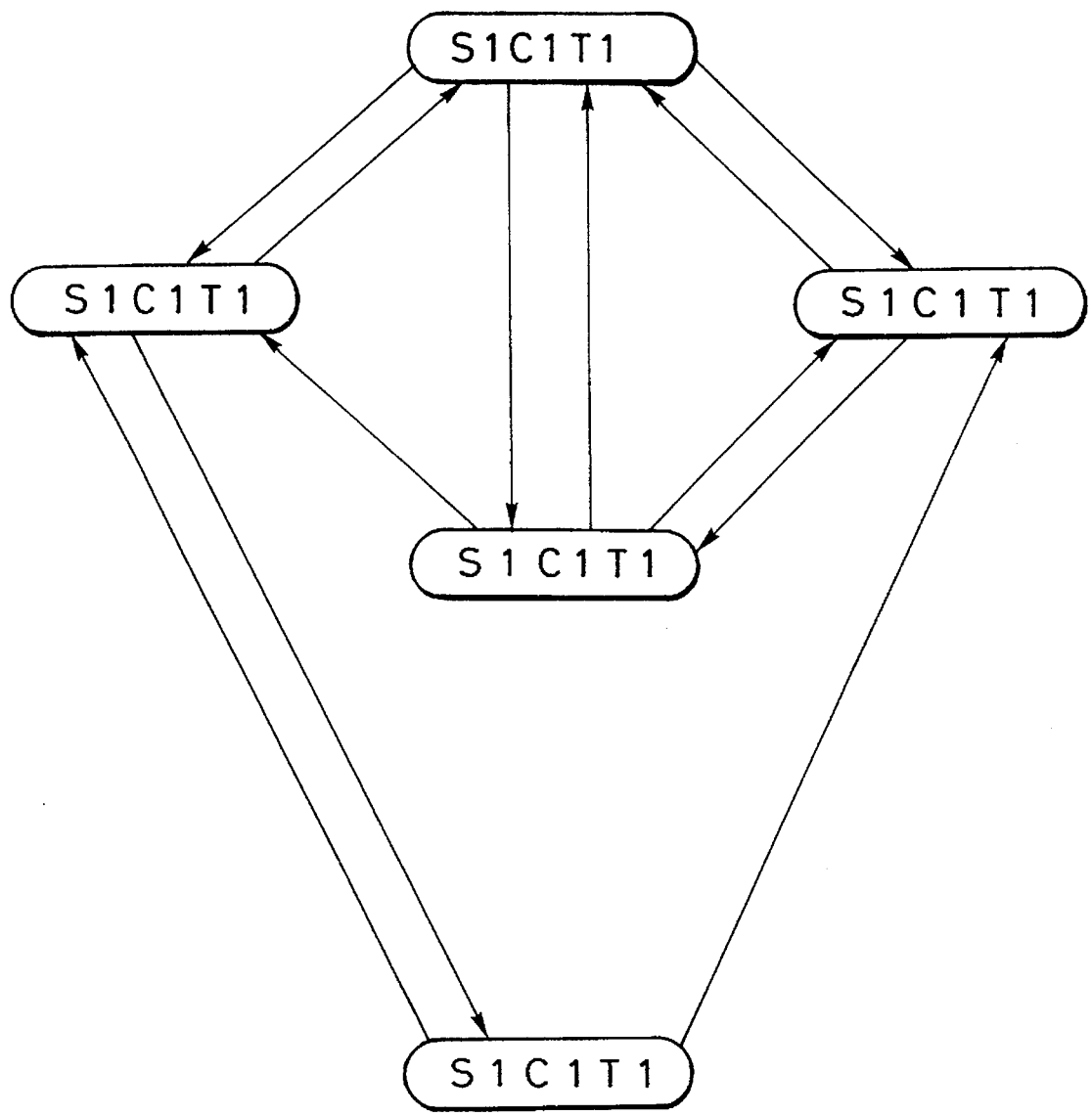
FIG. 25 is view which illustrate a dynamic state according to this embodiment.

In step S6, the dynamic state chart 1300 expressing the operation state of the system in accordance with the specifications defined in step S1 is processed on the basis of information stored in the SST file 1200. FIG. 25 is a dynamic state chart which illustrates the operation of the thermostat shown in FIG. 14A, this dynamic state chart being generated on the basis of the SST file shown in FIG. 16B. The thus-originated dynamic state chart is displayed on a CRT or the like of the input/output device 10 in step S7.

FIG. 13B is a flow chart which illustrates the processing of the RT file 1310 and the URT file 1320, where the steps S11 to S15 are the same as steps S1 to S5 in the flow chart shown in FIG. 13A, and therefore, the description about them are omitted here.

In step S16, all of the probable system states are processed on the basis of the specifications defined in step S11 by using information stored in the UT file 1140. According to the system for the thermostat defined by a method shown in FIG. 14A according to this embodiment, there are three sequences, each of which has two controlled states. Therefore, the total number of the probable states in the system becomes $2^3=8$. FIG. 17 is a view which illustrates an example of the UT file 1140 according to this embodiment, where sequence No. 0 represents a sequence, No. 1 represents the sequence operation of the cooler, and No. 2 represents the operation sequence of the intermittent timer.

Then, the flow advances to step S17 in which a discrimination is made of the reachable states and the unreachable states among all of the probable states in the subject system obtained in step S16, this discrimination being performed on the basis of information stored in the SST file 1200 or the specifications for the subject system defined in step S11. The reachable states are stored in the RT file 1310, while the un-reachable states are stored in the URT file 1320.

FIG. 18 is a view which illustrates an example of the contents of the RT file 1310, and FIG. 18B is a view which illustrates an example of the contents in the URT file 1320 in which the un-reachable system states have been registered.

[Description of processes A to C (FIGS. 19 to 25)]

Figures 19A, 19B:
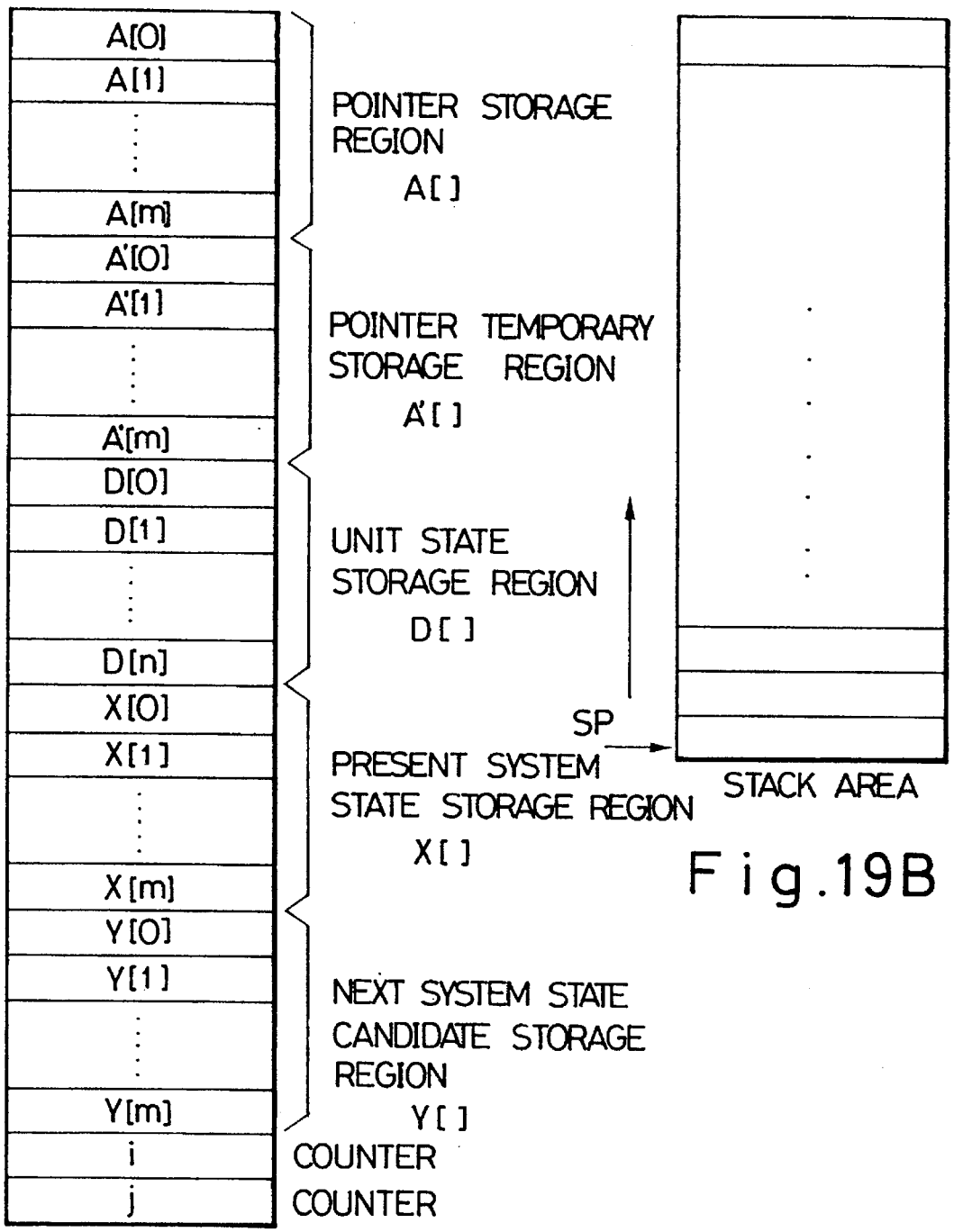
FIGS. 19A and 19B are views which illustrate an example of the structure of memories of a working memory.

FIG. 19 is a view which illustrates an example of the structure of the memories of the working memory 20 when the processes A and B are executed in accordance with the flow chart shown in FIG. 13, this working memory 20 comprises two portions, that is, a data area shown in FIG. 19A and a stack area shown in FIG. 19B.

The data area comprises pointer storage regions A [ ], unit state storage regions D [ ], present system state storage regions X [ ], next system state candidate storage regions Y [ ] for storing the states of the candidates of the next system state, and counters i and j.

A detailed description about the processes A to C in the flow chart shown in FIG. 13 will be made with reference to the thermostat shown in FIG. 14.

[Description of the process A (FIGS. 19 and 20)]

Figure 20A:
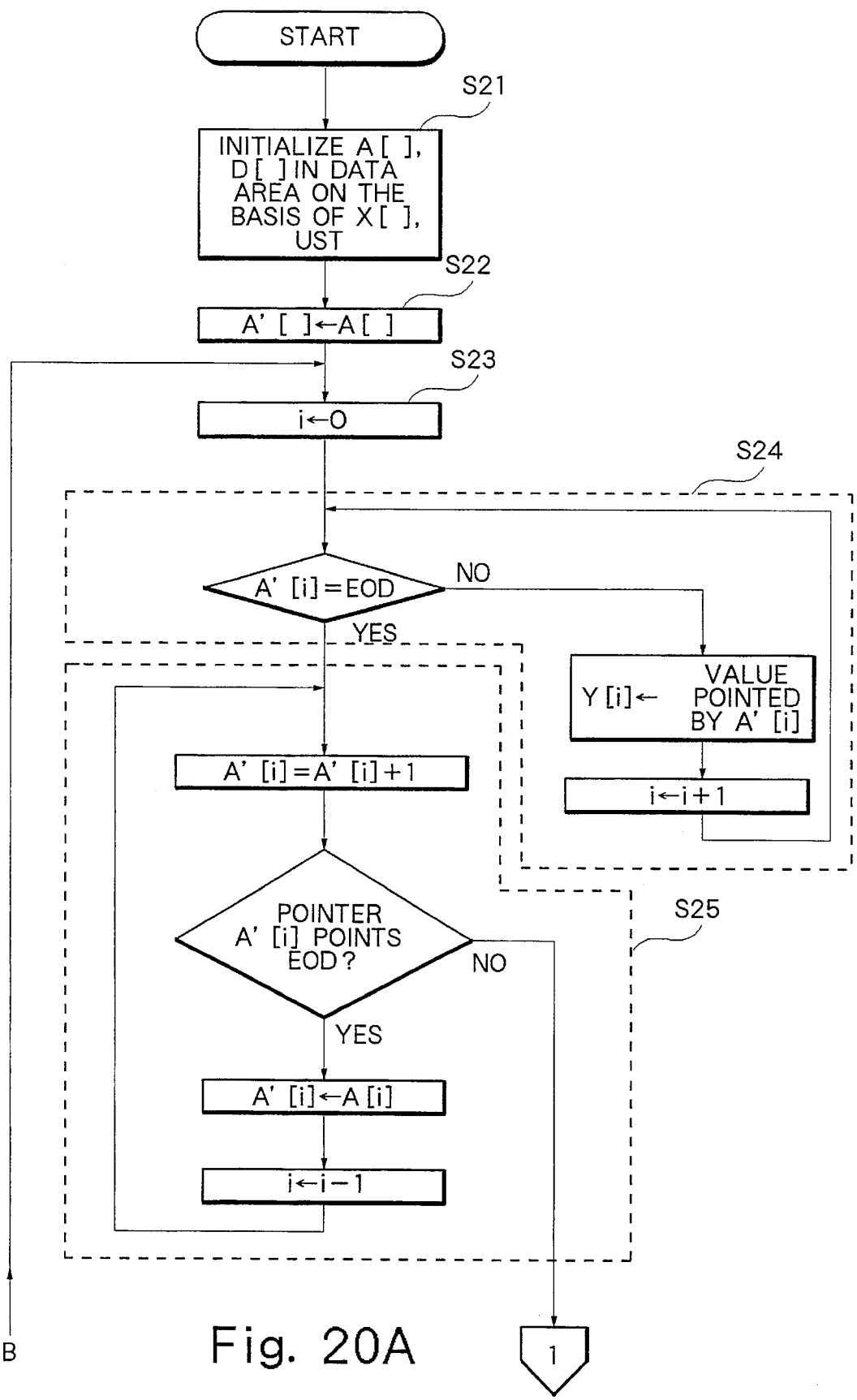
FIG. 20A and 20B are a flow chart which illustrates the detailed operation in the process A shown in FIG. 13.
Figure 20B:
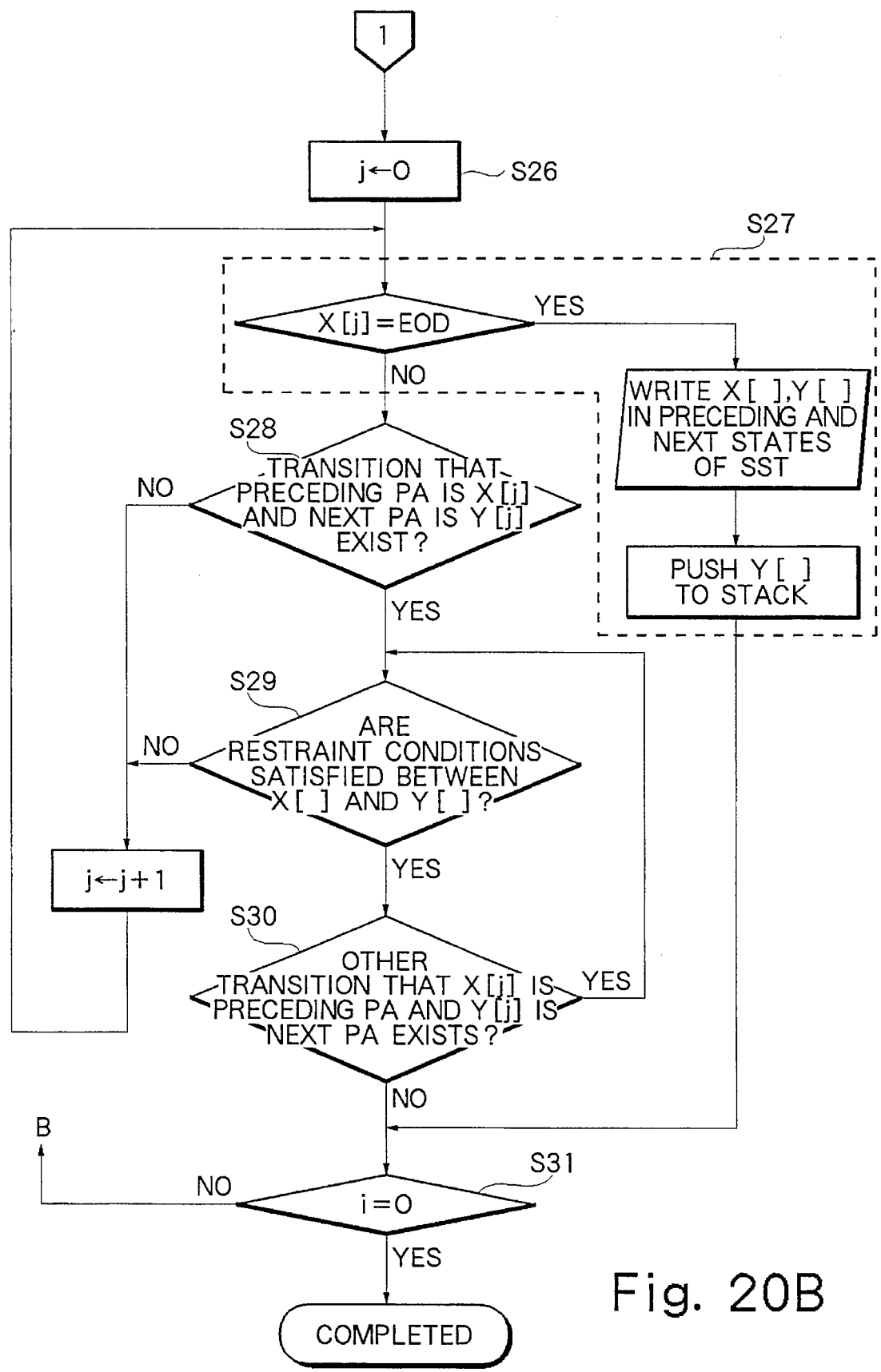

FIGS. 20A and 20B are flow charts which illustrate an example of the process A. The process A extracts all of the next system state candidates from the present system state and the UST file 1110, selects a system state which can actually occur as the next system state with reference made to the SRT file 1130, and registers the thus-selected next system state in the SST file 1200.

In order to realize this process A, it might be considered to employ the following two methods.

(1) In one method all of the next system state candidates are exemplified, and then the probability of transition of all of the thus-exemplified candidates is examined.

(2) In a second method an operation consisting of exemplifying a candidate for the next system state and determining the probability of the transition of the thus exemplified candidate is repeated until the next system state candidates are exhausted.

The above-described method (2) will be described in detail in terms of efficiency of the system.

When the process A starts, only the preset system state X [ ] in the data area of the working memory 20 has been initialized, and the rearmost portion of each of the storage regions in the working memory 20 stores, as a delimiter, "EOD". It is assumed that the contents of the SST file 1200 is as shown in FIG. 21C.

Figures 21A, 21B:
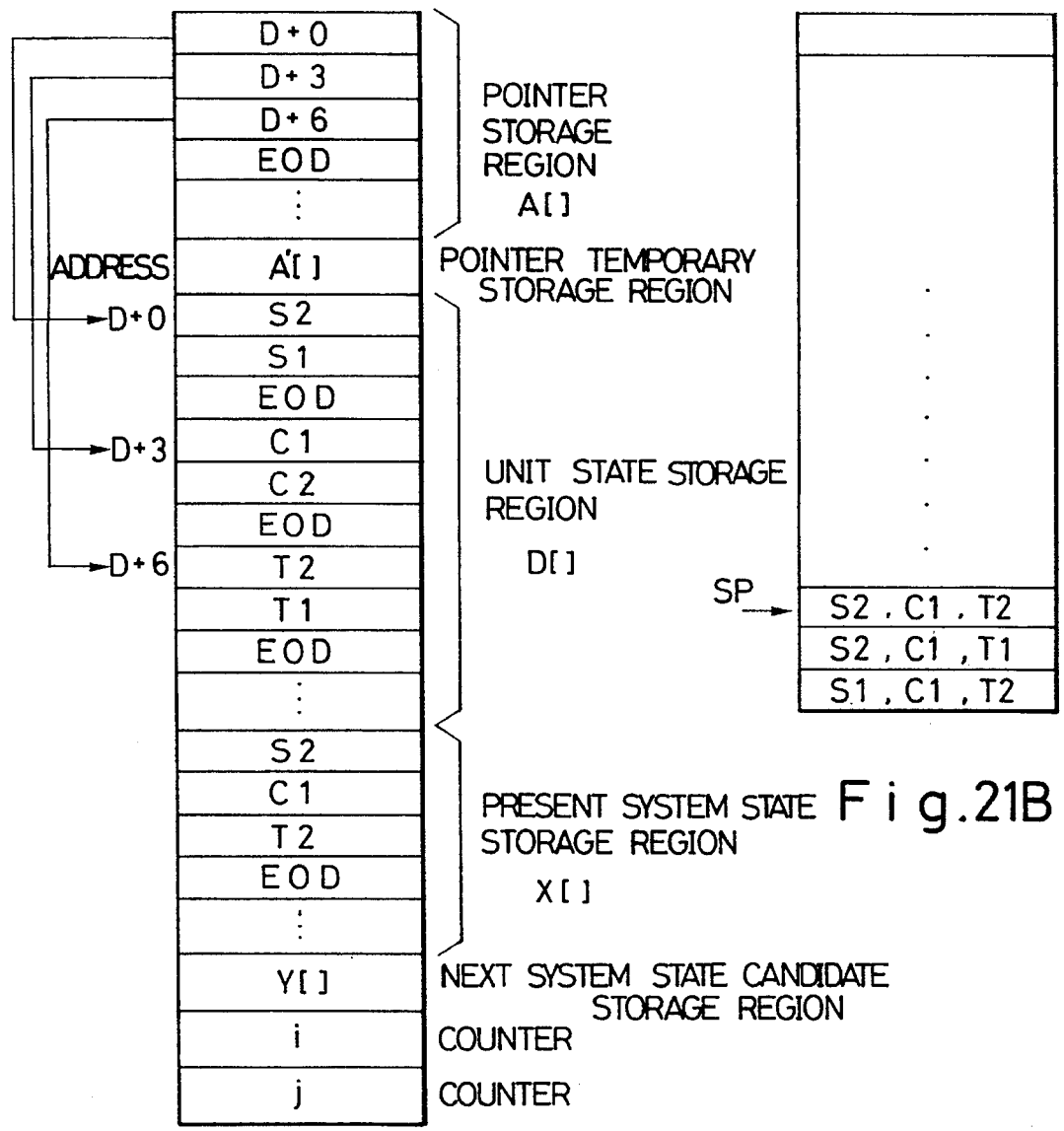
FIGS. 21A and 21B are views which illustrate the state of the memories in the working memory after the process A has been performed.
Figure 22:
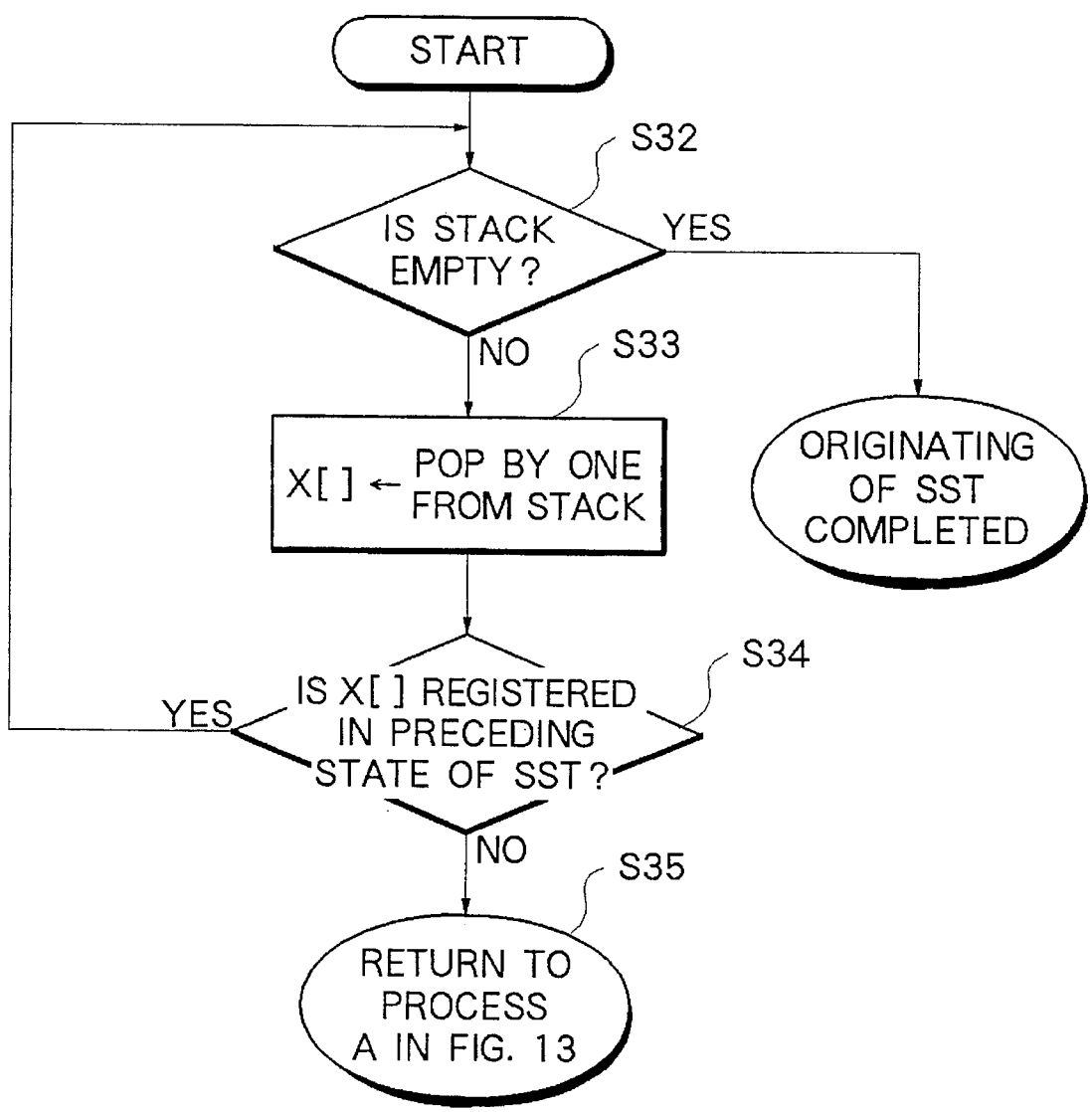
FIGS. 22 is a flow chart which illustrates the process B shown in FIG. 13B.

The flow chart shown in FIG. 20A will be described. First, each of the controlled state for the units which are stored in the present system state X [ ] and which are being executed is checked in step S21. Since controlled states which do not makes a transition to the next controlled state and which remain in the present state are included in the controlled states above, the present controlled states are stored in the unit state storage region D [ ]. In addition, in order to correspond to the case in which transition to the next controlled state is performed when the present controlled state of each of the units is completed, a next controlled state whose preceding controlled state is arranged to be the present controlled state is stored in the unit state storage region D [ ] in the working memory 20. At this time, the front address of each of the units is stored in the pointer storage region A[ ]. FIG. 21A is a view which illustrates the state described above.

In step S22, the contents of the pointer storage region A [ ] are copied in the pointer temporary storage region A' [ ], and in step S23, the counter i is initialized to "0". In step S24, the value pointed by a pointer of the pointer temporary storage region A' [ ] is, as the next system state candidate in Y [ ] with the counter i, made to be incremented. Assuming that the pointer A' [ ]={D+0, D+3, D+6} as shown in FIG. 21A, it is arranged that (S2, C1, T2) is copied in the next state candidate storage region Y [ ].

In step S25, the pointer in A' [ ] is made to be incremented so as to make it point to the next next-state candidate, and in step S26, the counter j is initialized to "0". In the steps following step S27, checking of the present system states stored in the storage region X [ ] of the present system state is repeated until all of the same is checked. In step S27, "EOD" is detected from the present system state storage region X [ ]. When it is detected that the checking has been completed, X [ ] and Y [ ] are respectively written in the preceding system state and the next system state in the SST file 1200. Then, the next system state Y [ ] is push in the stack, and the flow advances to step S31.

On the other hand, if the presence of a present system stored in the X [ ] is detected in step S27, the flow advances to step S28 in which a pair of controlled states (PA) is selected, by using the counter j, from X [ ] and Y [ ], and it is determined whether there is a registered transition in which the thus-selected controlled states (PA) are respectively arranged to be the preceding controlled state thereof and the next controlled state thereof in the SRT file 1130. If there is no registration, the counter j is made to be incremented, and the flow returns to step S27.

In step S28, if there is a registration of the transition in the SRT file, the flow advances to step S29 in which it is determined whether the restraint conditions from the present controlled state to the next controlled state of Y [ ] registered in X [ ] have been satisfied. If the conditions are not satisfied, the flow returns to step S27 with the counter j made to be incremented by one. If the conditions are satisfied, the flow advances to step S30, and it is determined whether there is a further registered transition whose preceding controlled state is arranged to be the present controlled state of X [ ] and whose next controlled state is arranged to be the next controlled state of Y [ ] in the SRT file 1130.

If it is determined that there is a further registered transition in the SRT file 1130, the flow returns to step S29. If there is no transition of the type above, the flow advances to step S31 in which it is determined, by using the counter i, whether all of the next system state candidates have been checked, assuming that X [ ] is the present system state. If all has not been checked, the flow returns to step S23.

[Description of process B (FIG. 22)]

The process B is arranged to determine whether the SST file 1200 has been processed.

First, in step S32, it is determined whether or not the stack area shown in FIG. 21B is empty. If it is empty, it is determined that the processing of the SST file 1200 has been completed, and the processing is completed here. If the stack area is not empty, the flow advances to step S33 in which one data item (POP) is taken out from the stack pointed by a stack pointer SP in the stack area, and it is arranged to be the present system state and is stored in X [ ]. In step S34, it is determined whether or not the present system state X [ ] has been, as the preceding system state in the SST file 1200, registered, that is, whether or not it has been already checked. If it has been already registered as the preceding system state in the SST file 1200, the flow returns to step S32. If it is determined that the present system state X [ ] has not been registered as the preceding system state in the SST file 1200, it is determined that the processing of the SST file 1200 has not been processed, and the flow returns to the process A shown in FIG. 13.

[Description of the process C (FIGS. 23 and 24)]

The process C shown in FIG. 23 will be described in detail with reference made to the above-described thermostat. The process C is arranged such that the reachable system state and un-reachable system state are distinguished from each other on the basis of information in the UT and the SST and the thus-distinguished system states are respectively stored in the RT and the URT files.

Figure 23A:
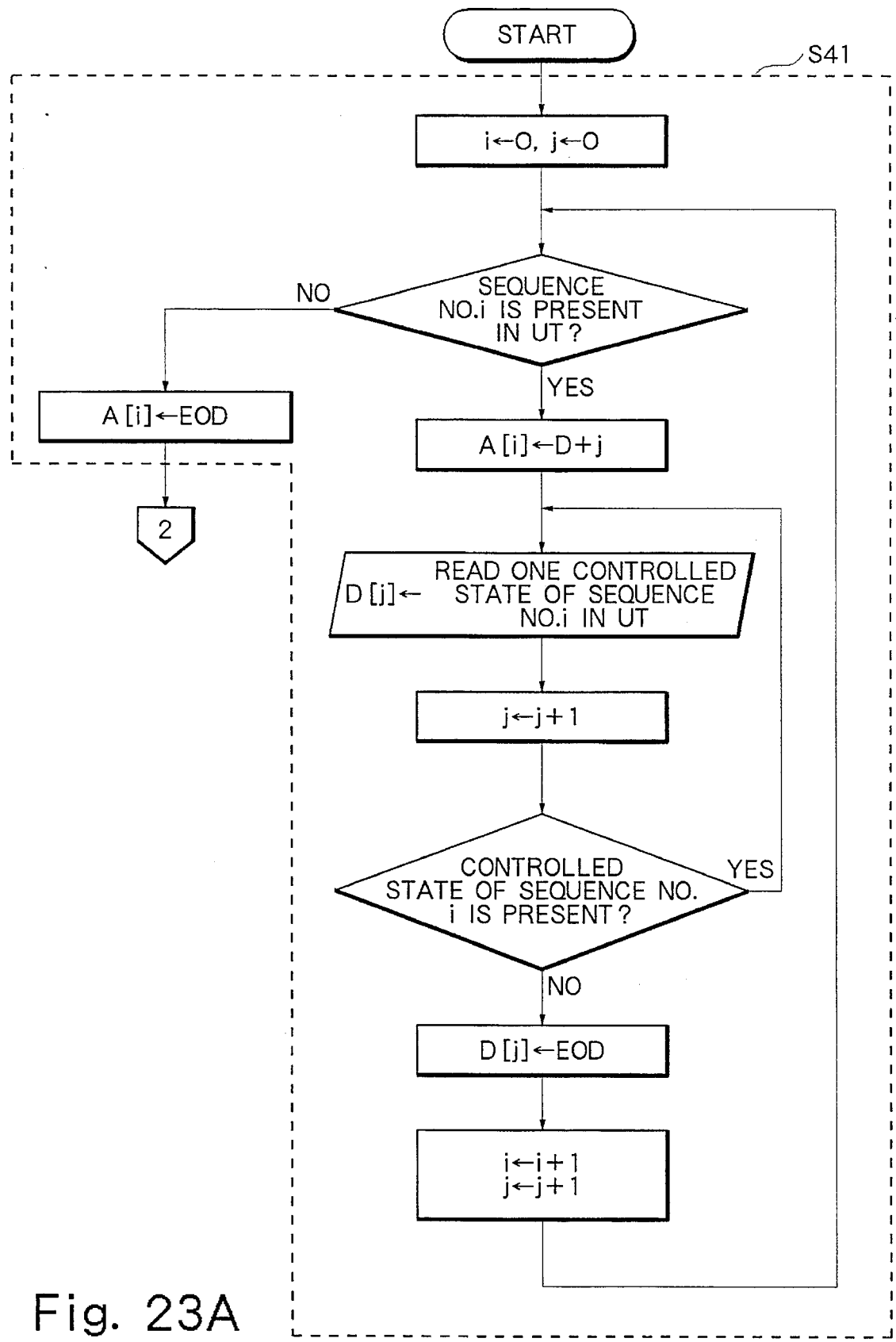
FIG. 23A and 23B are a flow chart which illustrates the detailed operation of the process C shown in FIG. 13B.
Figure 23B:
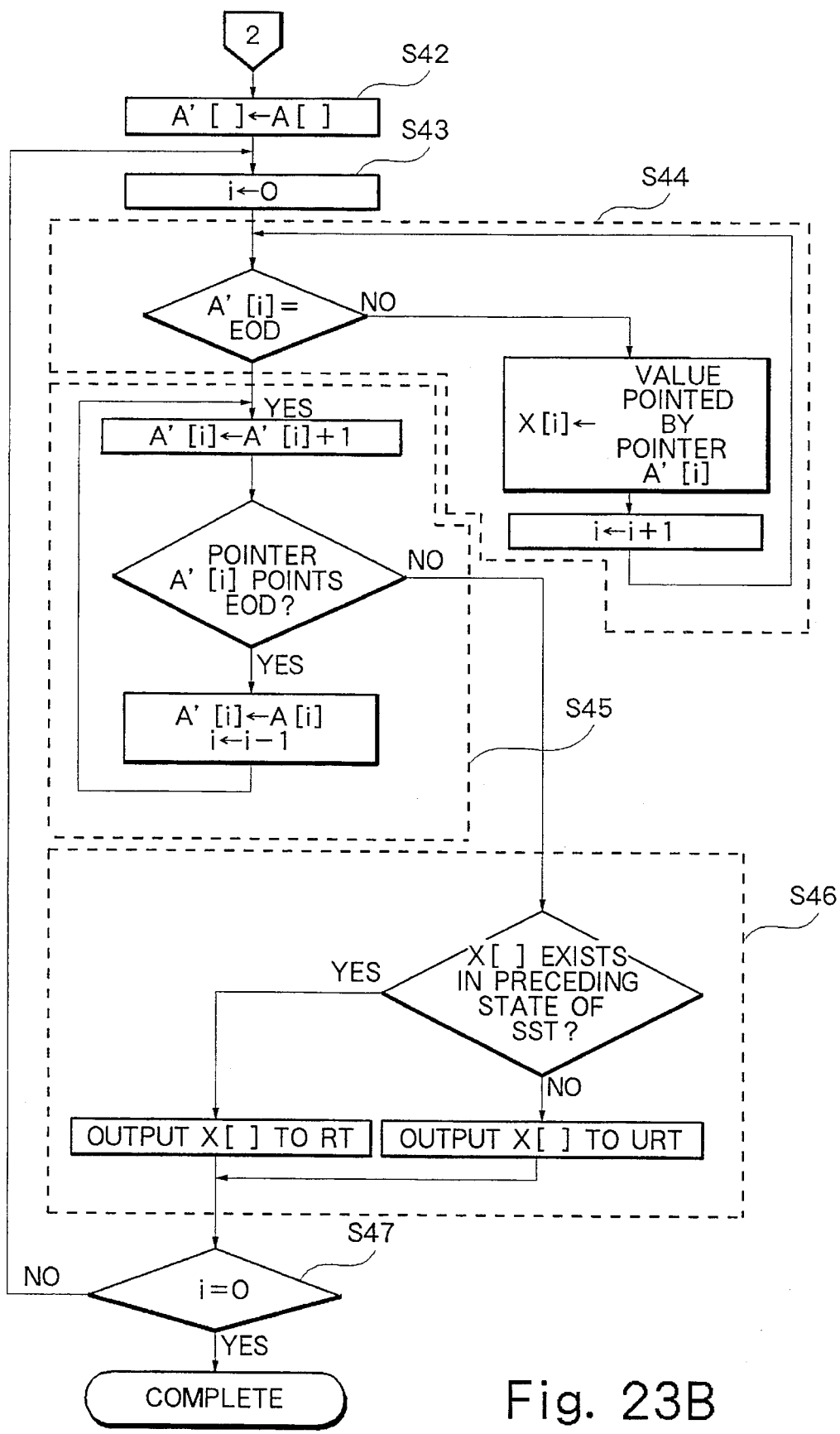
Figure 24:
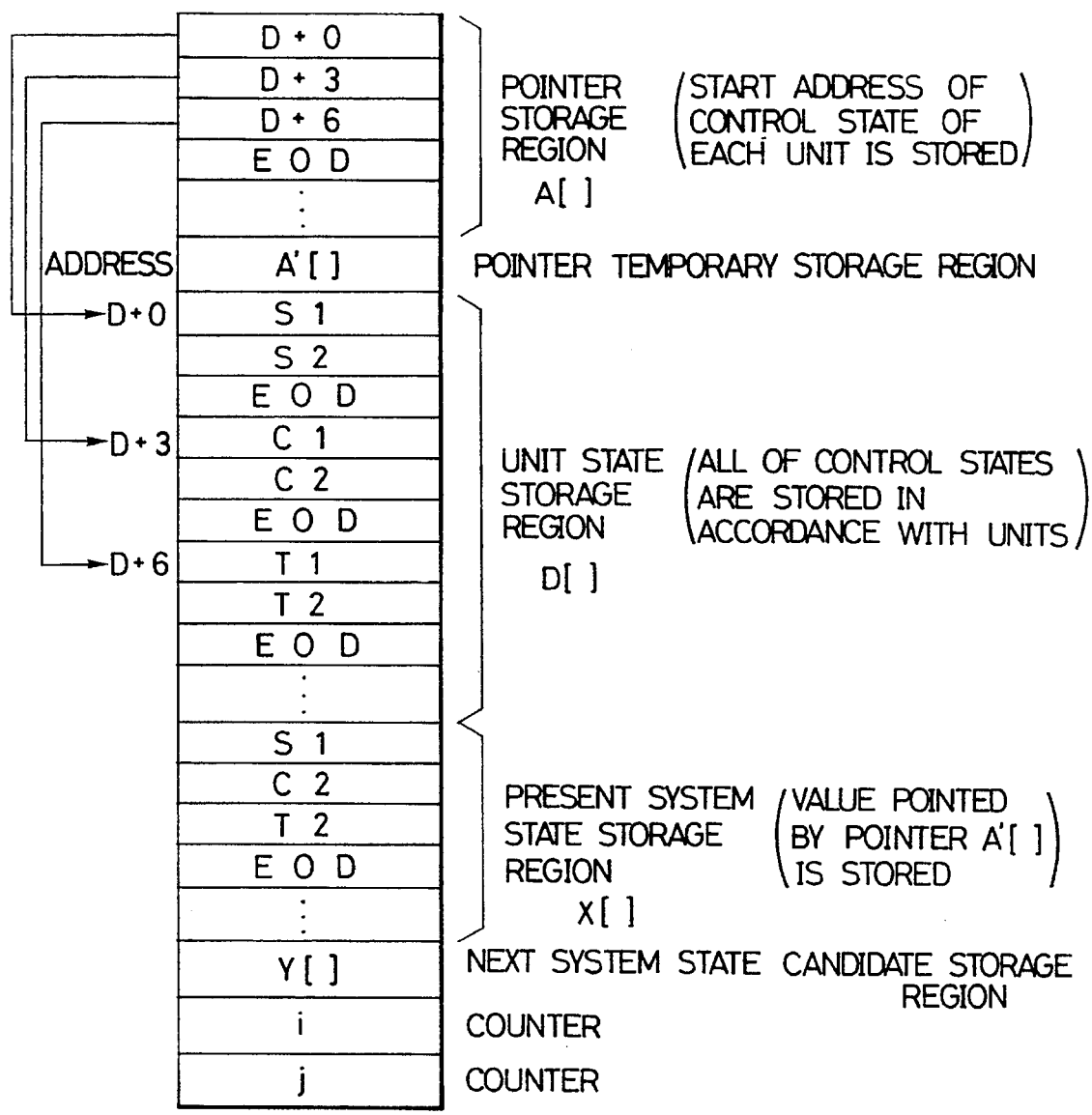
FIG. 24 is a view which illustrates an example of data for the working memory.

FIG. 23A is a flow chart which illustrates the detailed processing procedure in the process C. In step S41, all of the controlled states are stored in the unit state storage region D

[ ] in the working memory 20 on the basis of information stored in the UT file 1140, which stores control information of each of the units. At this time, the front address of each of the units is stored in the pointer temporary storage region A [ ], and "EOD" is finally stored. This process is shown in FIG. 25 which illustrates the state of the memory. When the processing of the pointer has been thus completed, the flow advances to step S42 in which the contents of the pointer storage region A [ ] is transferred to the pointer temporary storage region A' [ ]. Then, in step S44, the value pointed by the pointer in the pointer temporary storage region A' [ ] is, as the present system state, copied in X [ ] with the counter i made to be incremented by one. This means that assuming that A' [ ]={D+0, D+4, D+7}, {S1, C2, T2} is copied in X [ ] due to the condition of the memories shown in FIG. 19. In step S45, the next system state is assigned by incrementing the pointer in A' [ ]. If the value pointed to by the pointer A' [ ] is not "EOD", the flow advances to step S46 in which it is determined whether the present system state X [ ] has been registered in the preceding state in the SST file in order to determine whether the present system state X [ ] can reach the subject controlled state. If it has been registered, the system state X [ ] is stored in the RT file 1310. If it has not been registered, the system state X [ ] is stored in the URT. As a result, since (S1, C1, T2) and the like have been, as shown in FIG. 16, registered in the SST file 1200, they are stored in the RT file 1310 upon a determination that they are the reachable controlled states. However, since (S1, C2, T2) and the like have not been stored in the SST file 1200, they are stored in the URT file 1320.

As described above, in step S47, it is determined whether all of the states of the subject system have been checked on the basis of the contents of the counter i. If this checking has not been completed, the flow returns to step S43.

As described above, according to this embodiment, all of the probable states of the system can be confirmed, and the following advantages can be obtained.

(1) Since it can be confirmed whether the described specifications have been defined as intended, the specification can be defined efficiently.

(2) Since the specifications can be evaluated in the specification definition process in the earlier stage in the development of the system, the cost required to modify the system, and the cost required to develop the software can be reduced.

(3) Since the system states of the type reachable in a usual sequence can be distinguished from the system states of the un-reachable type in all of the states to occur in the subject system, the analysis of the specifications can be efficiently performed.

[Description of a second embodiment (FIG. 26)]

Figure 26:
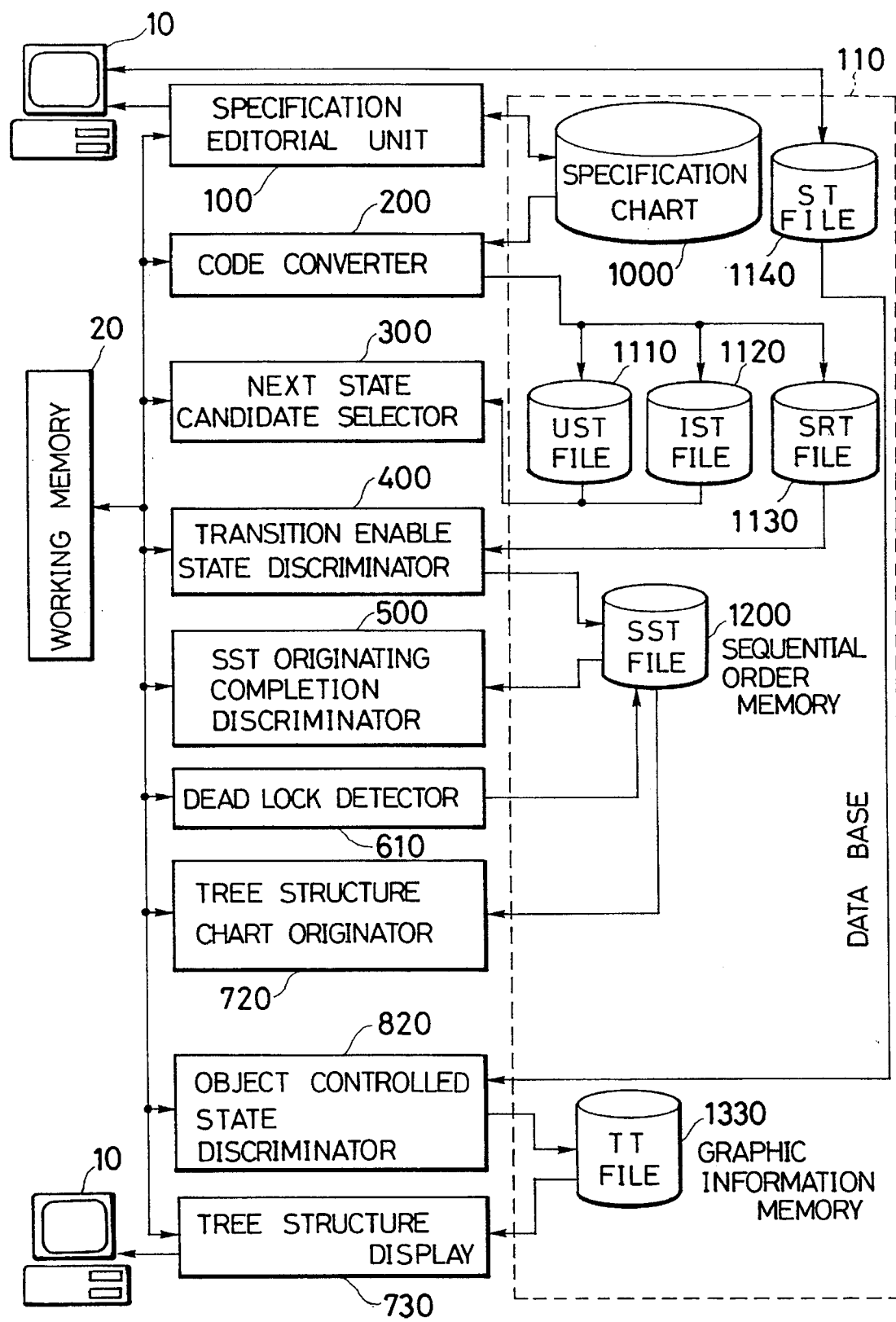
FIG. 26 is a block diagram which illustrates the schematic structure of a system according to a second embodiment.

FIG. 26 is an overall structural view which illustrates a second embodiment of the present invention, where the common components to those shown in FIG. 1 are given the same reference numerals, and the descriptions about these components are omitted here.

Referring to FIG. 26, reference numeral 1140 represents an ST (Search Table) file with which an operator input, through the input/output device 10, a control state desired to be confirmed as object one to this ST file 1140. Reference numeral 610 represents a deadlock detector capable of detecting a deadlock in the system and when a deadlock is generated, it is transmitted to the SST file 1200. Reference numeral 720 represents a tree structure chart originator for originating, on the basis of the contents in the SST file 1200, coordinate information required to process the tree structure chart. Reference numeral 820 represents an object controlled state discriminator for storing graphic information about an object controlled state in a graphic information memory 1330. Reference numeral 730 represents a tree structure display capable of displaying the tree chart for the object controlled state on the input/output device 10 on the basis of the graphic information supplied from the TT (Tree Table) file 1330. Similar to FIG. 1, the components 100 to 820 are aided by a computer, and the working memory 20 is so structured as to be accessed from each of the components 100 to 820. A detailed description of the working memory 20 will be provided later.

The method for describing the specifications in the specification memory in the real-time system according to the second embodiment is arranged in a similar fashion to the first embodiment. The operation of the second embodiment will be described with reference to a flow chart shown in FIG. 27. The object of this embodiment is to examine the state of the system when the cooler is turned on after registering C2 (a state in which the cooler is turned on) in the ST file 1140. Although the number of the object is arranged to be one, a plurality of controlling information items may be registered. For example, an improbable state in which the thermal sensor is in an upper-limit temperature waiting mode and the cooler is in an ON-mode can be detected by arranging the object controlled state to be (S1, C2), and another improbable state in which the cooler is turned on and the intermittent time is being counting can be examined by arranging the same to be (C2, T1).

Since steps S51 to S55 are the same as those in the flow chart shown in FIG. 13A, the description of these steps are omitted here. In step S56, coordinate information which is necessary for originating the tree structure chart on the basis of the specifications defined in step S51 is processed in accordance with information stored in the SST file 1130. In step S57, the object controlled state stored in the ST file 1140 is identified from coordinate information which has been processed in step S56, the thus identified object controlled state is, together with coordinate information which is necessary in drawing, stored in the memory 1330 for storing information which is necessary for drawing the tree structure chart.

Since the object control information C2 (see FIG. 28) according to this embodiment forms a portion of the controlled state (S2, C2, T2), it is transmitted to the graphic information file 1330 with a mark representing a fact that the coordinate information (S2, C2, T2) is the object controlled state. This process is shown in FIG. 29 in which information about drawing the tree structure chart generated on the basis of the contents in the SST file shown in FIG. 16B is shown, this information being stored in the TT file 1330, where parameter "S" in FIG. 29 shows the object controlled state.

Figure 30A:
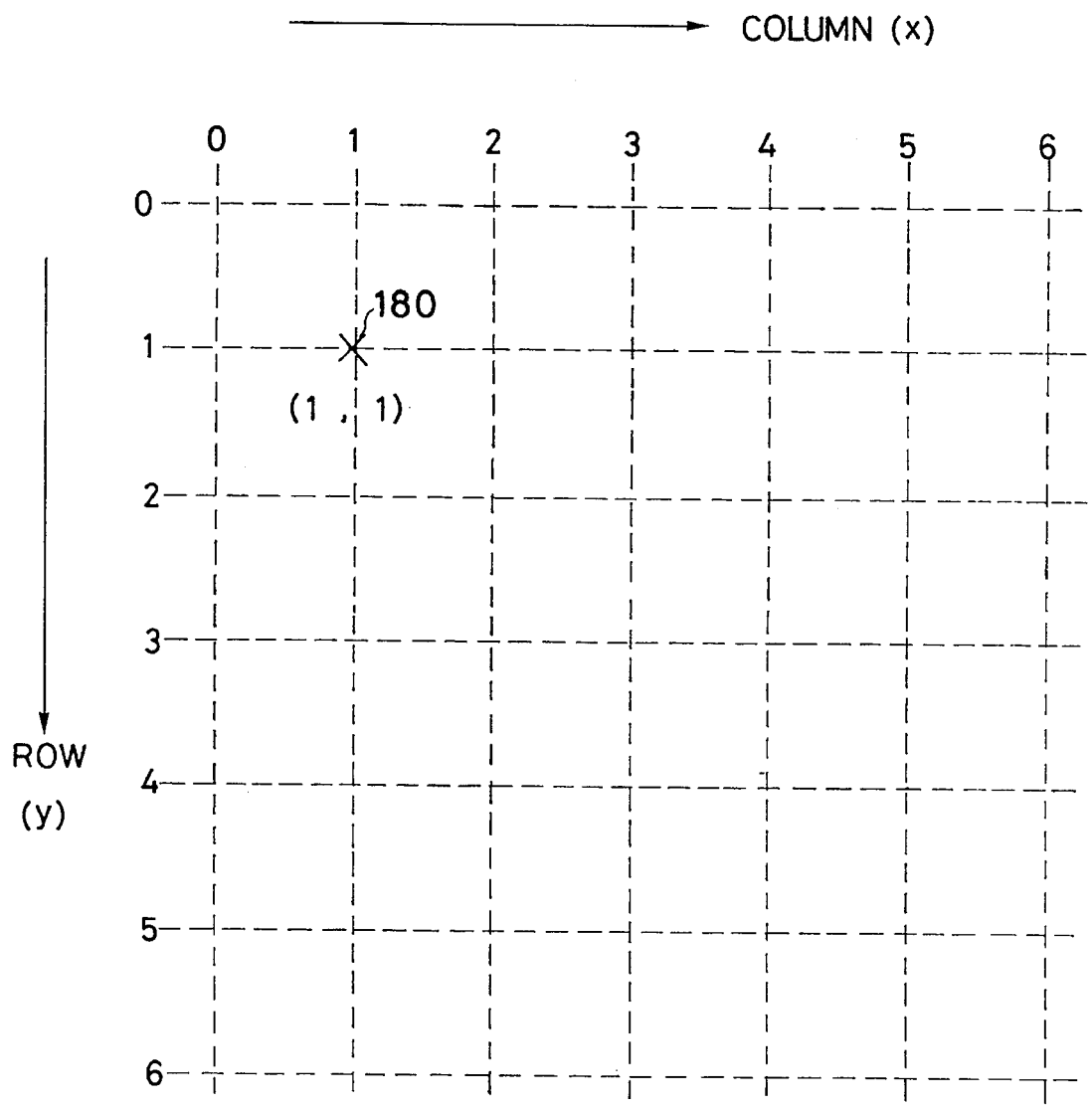
FIGS. 30A and 30B are views which illustrates a tree structure chart.
Figure 30B:
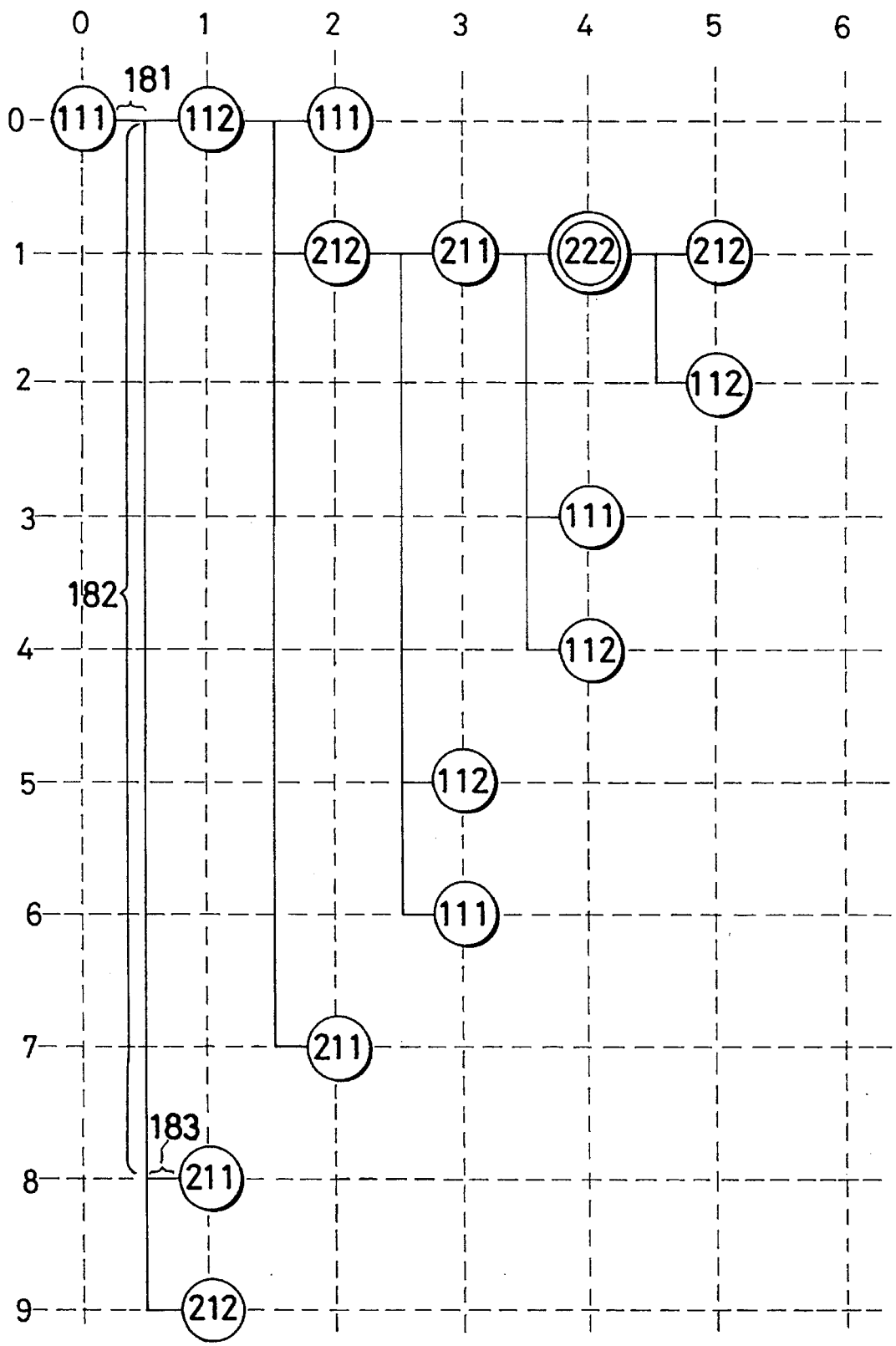

In step S58, the tree structure chart is displayed on the CRT of the input/output device 10 on the basis of the contents of the TT file 1330. At this time, the state of the system including the object controlled state is clearly indicated. FIG. 30B is a view which illustrates the thus-displayed tree structure chart, where the state of the system including the object controlled state is expressed as a double circle as to be distinguished from the other system states.

Figure 27:
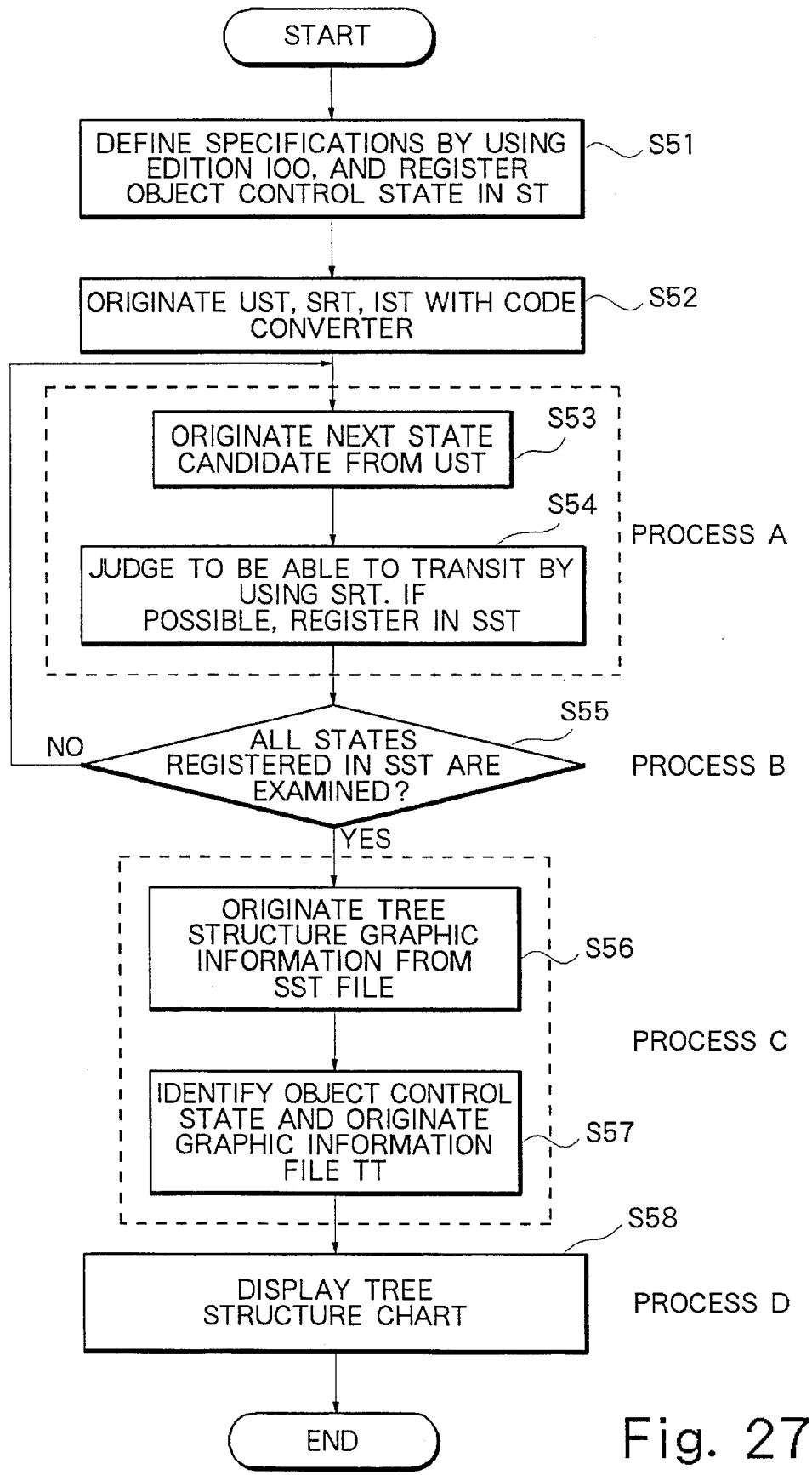
FIG. 27 is a flow chart which illustrate the processing of a file according to the second embodiment.

Since the processes A and B in the flow chart shown in FIG. 27 are the same as those shown in FIG. 13, a description about these processes are omitted here. Then, the process C and D will be described.

[Description of the process C (FIGS. 31 to 34)]

Figures 31A, 31B:
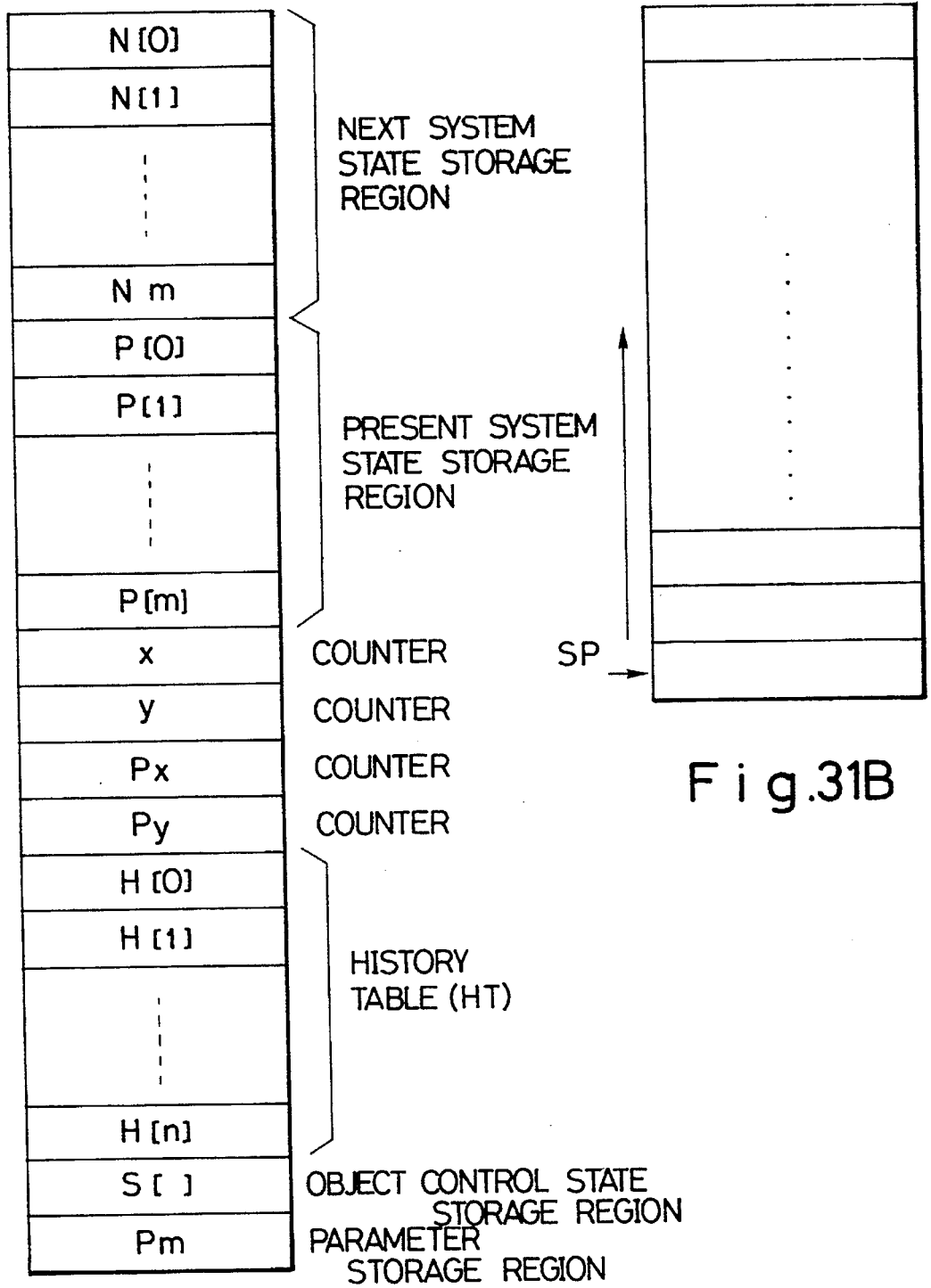
FIGS. 31A and 31B are views which illustrate an example of the structure of memories of a working memory after the process B according to the second embodiment has been performed.

FIG. 31 is a view which illustrates an example of the structure of the working memory 20 when the process C is being executed. The working memory 20 comprises the data area shown in FIG. 31A and the stack area shown in FIG. 31B.

The data area includes: a region P [ ] for storing a present system state, a region N [ ] for storing the next system state, a counter x serving as a column counter for the next system state, a counter y serving as a row counter for the next system state, a column counter Px for the present system state, a row counter Py for the present system state, a history table H [ ] in which the hysteresis of the controlled state is stored, S [ ] in which the object controlled state is stored, a parameter storage region Pm, and the like.

Figure 32A:
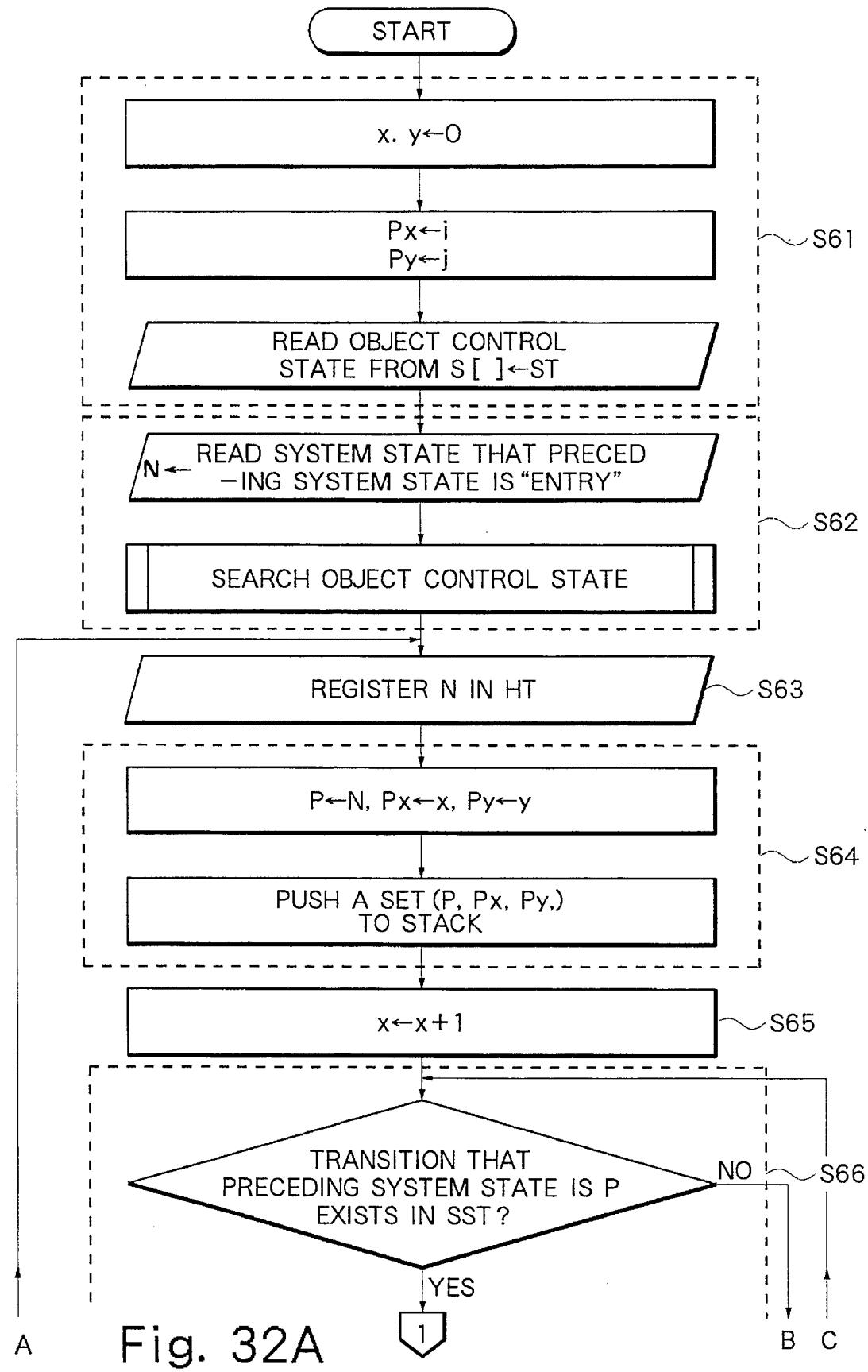
FIG. 32 is a flow chart which illustrates the detailed processing of the process C according to the second embodiment.
Figure 32B:
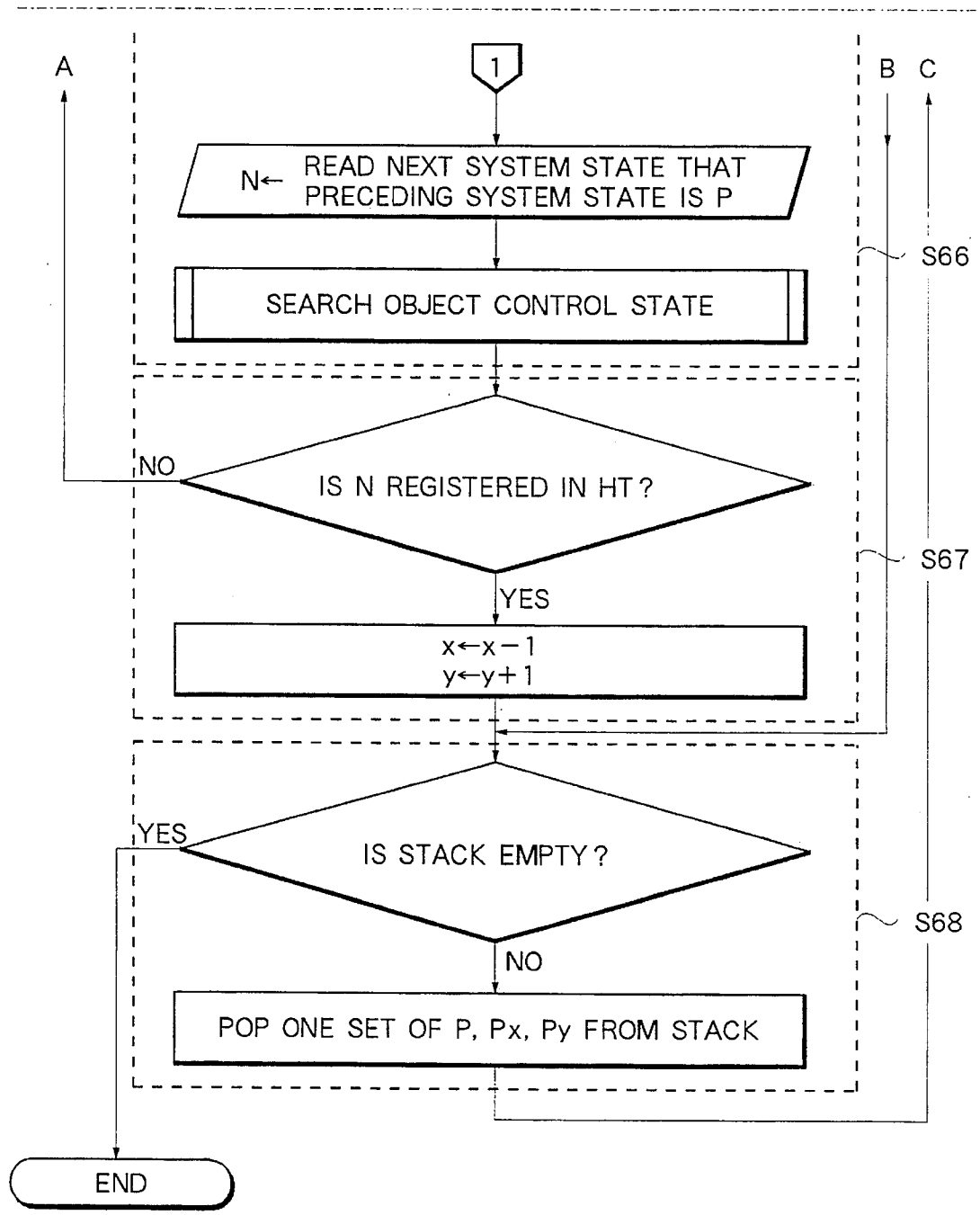

FIG. 32 is a flow chart which illustrates the detailed procedure of the process C in which the coordinate of each of the system states is determined on the basis of the contents of the SST file and register the thus-determined coordinate as the tree structure chart graphic information in the TT file 1330.

In step S61, the column counter x and the row counter y for the next system state are respectively initialized to "0", and the column and row counters Px and Py for the present system state are also initialized. Then, an object controlled state is read out from the ST file 1140 in which the object controlled state is stored so as to be stored in the storage region S [ ].

In step S62, a next system state whose preceding system state is arranged to be "entry" is read out from the SST file 1200 as to be stored in the next system state N [ ] so that an identification routine for the object controlled state to be described later is executed. Then, the flow advances to step S63 in which the contents in the next system state region N [ ] are stored in the history table H [ ].

In step S64, the present system state P [ ], the column counter Px and the row counter Py of the present system state are set as to be registered (PUSH) to the stack area. In step S65, the column counter x is made to be incremented by one, and it is determined whether or not a next system state whose preceding state is arranged to be the present system state P [ ] is present in the SST file 1200. If it is present, the thus-detected next system state is written in the next system state N [ ] so that an identification routine capable of identifying the object controlled state to be described later is executed.

In step S67, it is determined whether there is the next system state N [ ] n the history table H [ ]. If it is detected, it is determined that the following tree structure has been already originated, and the column counter is decremented by one, while the row counter y is incremented by one. On the other hand, if the N [ ] is not present in HT, the flow returns to step S63. In step S68, it is examined whether the stack area of the working memory 20 is empty. If it is empty, the process is completed here. If it is not empty, a set consisting of P, Px, and Py is read out (POP) from the stack area, and the flow returns to step S66.

Figure 32C:
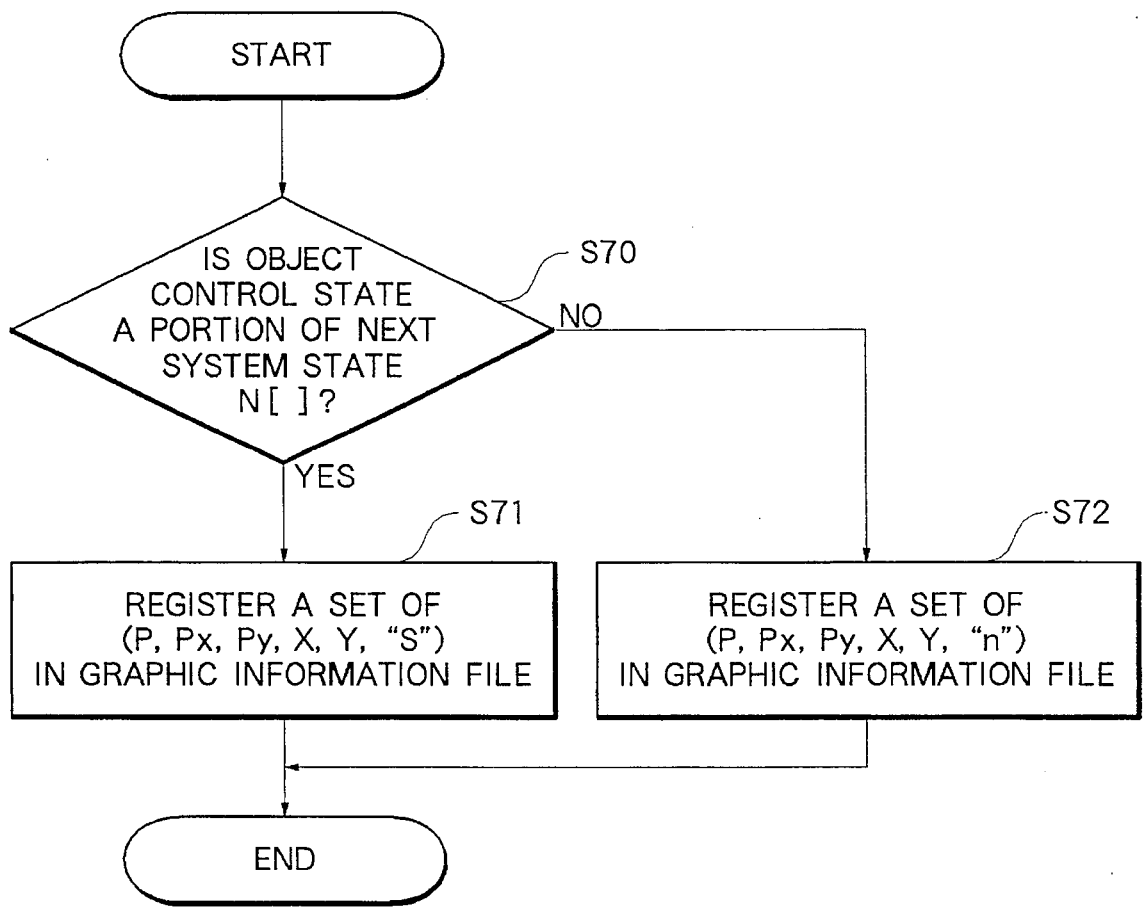

FIG. 32C is a flow chart which illustrates an identification routine capable of identifying the object state.

In the routine, it is determined whether the object controlled state S [ ] is a portion of the next system state N [ ]. If it is a portion of the next system state N [ ], the flow advances to step S71 in which a set of (P, Px, Py, x, y, "S") is registered in the TT file 1330 in which graphic information is stored. On the other hand, if the present system state P [ ] is not a portion of N[ ], the flow advances to S72 in which a set of (P, Px, Py, x, y, "S") is registered in the TT file 1330.

FIG. 29 is a view which illustrates the contents of the graphic information file 1330.

[Description of the process D (FIG. 33)]

Figure 33:
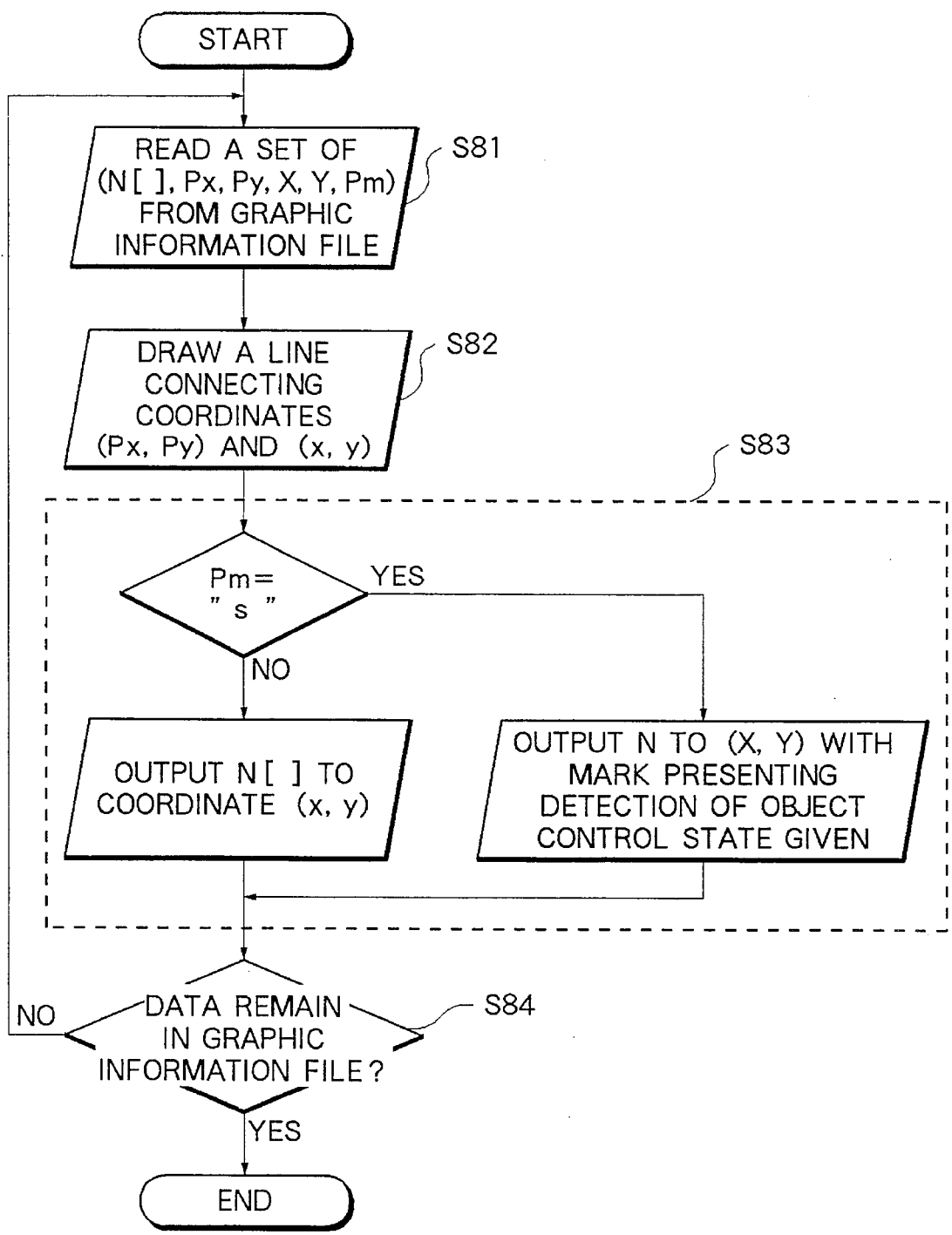
FIG. 33 is a flow chart which illustrates the detailed processing of the process D according to the second embodiment.

FIG. 33 is a flow chart which illustrates the detailed procedure of the process D in which a tree structure chart is displayed in the input/output device 10 on the basis of the graphic information file 1330 which has been originated in the process C. For example, as shown in FIG. 30B, the object controlled state stored in the ST file 1140 is displayed distinguishably from the other controlled states. In the thus-conducted display, a logical lattice as shown in FIG. 30A is assumed on the CRT of the input/output device 10, in which point 180 is expressed by (1, 1).

Referring to FIG. 33, the next system state N[ ], the column counter Px and the row counter Py for the present system state, the column counter x and the row counter y for the next system state are read from the graphic information file 1330. In step S82, a line connecting (Px, Py) and coordinate (x, y) are drawn. However, any line is not drawn when (Px, Py) coincides with (x, y) in this step.

As can be clearly seen from FIG. 30B, the present system state (coordinate (Px, Py)) and the next system state (coordinate (x, y)) are connected with, for example, three line segments, (Px, Py)–((Px+x)/2, Py) (for example, a line segment 181), ((Px+x) /2, Py)–((Px+x)/2, y) (for example, a line segment 182), and ((Px+x) /2, y)–(x, y) (for example, a line segment 183). When they coincide with each other, the number of the segment lines becomes less than three. In step S83, the content of N [ ] is displayed in the coordinate (x, y) of the next system state. In this state, it is determined whether or not the value of the parameter Pm is "S". If "S" is given, N [ ] is displayed with a mark representing the fact that the subject state is the object controlled state. An example of this process is shown in FIG. 30B in which a system state (222) expressed with a double circle is illustrated as this example. As a method to display the object system state, it might be considered to employ a method of raising the brightness or a method of providing a special symbol.

If the parameter Pm is "N", the N [ ] is intact and transmitted to its coordinate position. In step S84, it is examined whether all of the information stored in the TT file 1330 has been checked. If all has been checked, the process is completed here. If all has not been checked as yet, the flow returns to step S81 in which the above described operation is executed.

As described above, it is apparent from the tree structure chart shown in FIG. 30B, the state C2 is realized, that is, the cooler is turned on when the state of the system is (2, 2, 2)=(S2, C2, T2). It is apparent that the state above is realized only when the thermal sensor is in the lower-limit waiting mode and the intermittent time is being counting the operation time.

As described above and according to this embodiment, the following effects can be obtained by identifying a specific state from all of the probable system states.

(1) Since the probable system states can be readily grasped when specifications for the system are defined in the early state in the system development, the time taken to process the specifications can be shortened, and the specifications involving no missing processes can be processed.

(2) Reliable specifications can be originated and software corresponding to the thus-originated specifications can be as generated by checking improbable system states of all of the system controlled states.

[Description of deadlock detection process]

Figure 34:
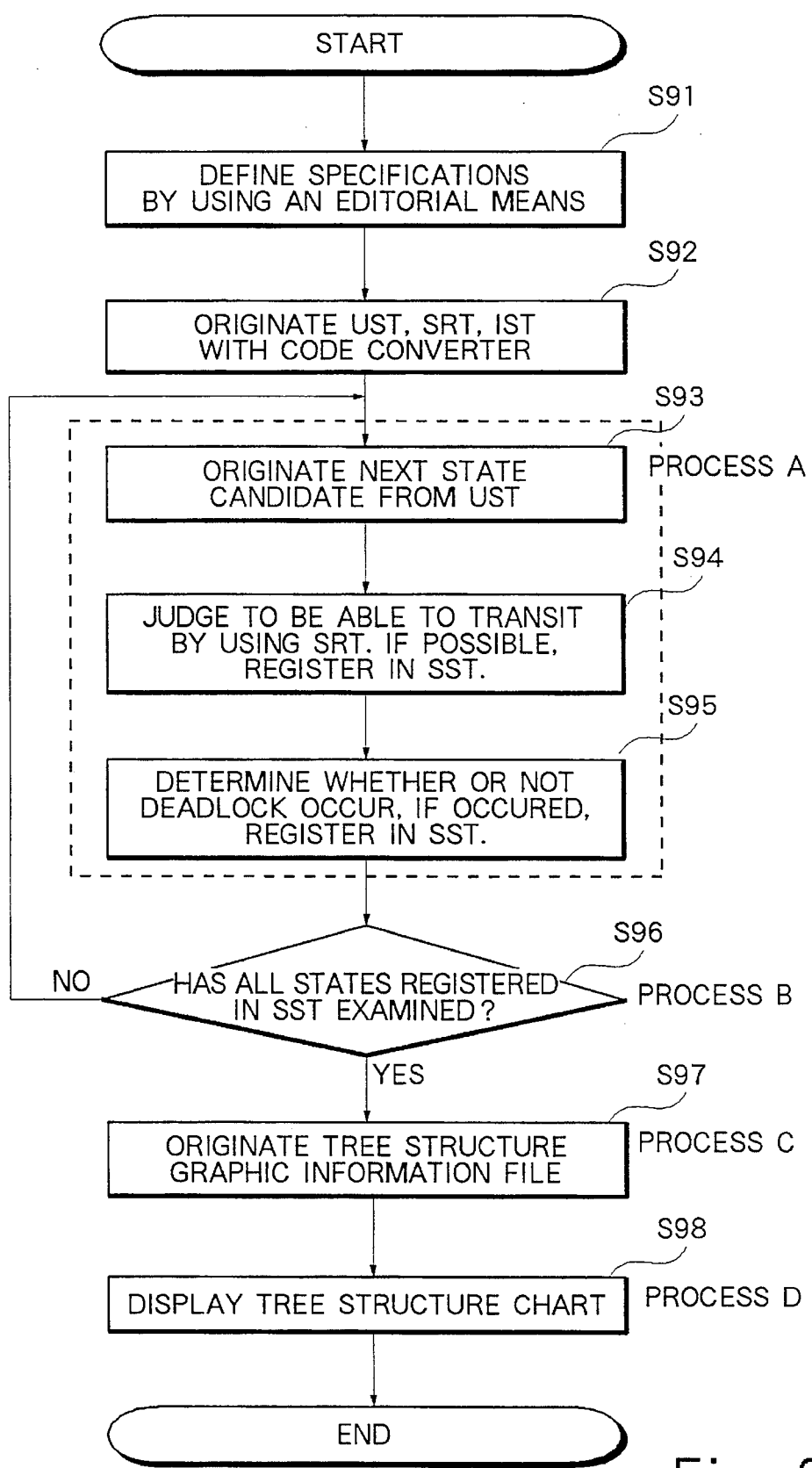
FIG. 34 is a flow chart which illustrates the procedure for processing the file when a deadlock is detected.
Figure 35:
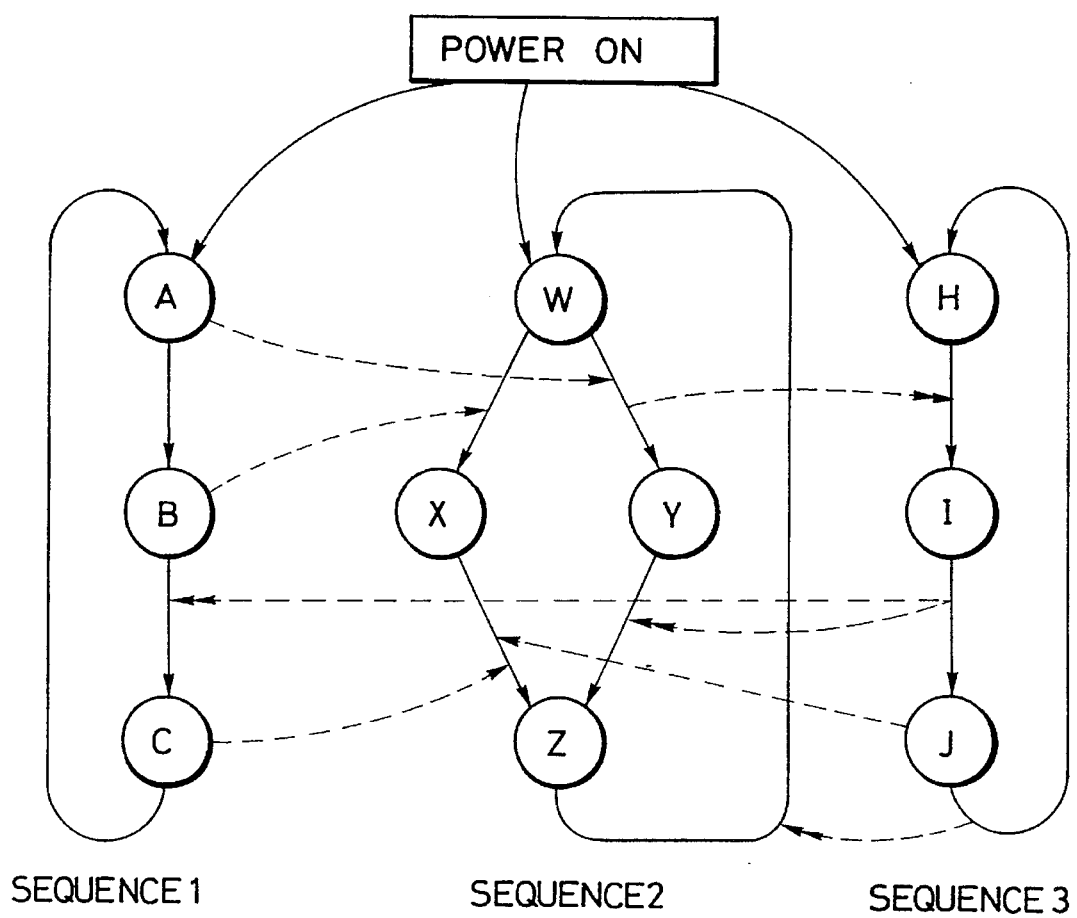
FIG. 35 is a view which illustrates an example of the defining of the specifications.

FIG. 35 is a view which illustrates an example of the definition of the usual specifications for a system in accordance with the above-described method of describing the specifications for a real time system. Referring to this drawing, an example in which specifications for a real time system consisting of three units (sequences 1 to 3) is illustrated. Then, a flow chart shown in FIG. 34 will be described on the basis of the operation defined in FIG. 35. The difference between this flow chart shown in FIG. 34 and that shown in FIG. 27 lies in the deadlock detecting process in step S95 for the process A. Therefore, a major portion of the description will be provided about the process A.

An operator defines specifications for the system as shown in FIG. 35 using the specification chart editorial unit 100 and through the input/output device 10. On the basis of the thus-defined specifications, the UST, IST, and SRT files are originated from the code convertor 200. FIGS. 36A, 36B, and 36C are views which respectively illustrate the UST, IST, and SRT files processed on the basis of FIG. 35. FIG. 36A is a view which illustrates an example of the contents of the UST file and in which the preceding controlled state and the next controlled state are shown. FIG. 36B is a view which illustrates an example of the contents of the sequence restraint table (the SRT file), and FIG. 36C is a view which illustrates an example of the contents of the initial state table (the IST file) 1120.

In step S93, a next system state candidate which results from a transition from the present system state is, on the basis of information stored in the UST file 1120, selected in the basis of the present system state stored on the working memory. Assuming that the present system state is (A, Y, I), transitions from A to B, from Y to Z, and from I to J can be performed from the UST shown in FIG. 36A, (B, Y, I), (A, Z, I), (A, Y, J) and the like can be exemplified as next system state candidates. In step S94, it is, on the basis of information stored in the SRT file shown in FIG. 36B, determined whether the next system state candidates exemplified in step S93 are capable of being produced from the present system state. If this transition can be performed, the system states above are added as the sequential order in the system in the SST file 1200 which serves as the system state sequential order memory.

According to the example described above, the transition from (A, Y, I) to (B, Y, I) or to (A, Z, J) can be performed since any restraint is present in the SRT 1130. Therefore, for example, a pair consisting of, (A, Y, I) and (B, Y, I), or a pair consisting of (A, Y, I) and (A, Z, J) is registered in the SST file 1200. In the former case, (A, Y, I) is arranged to be its preceding system state and (B, Y, I) is arranged to be its next system state.

In step S95, if all of the three sequences for the next system states of the present system is determined to be improbable and to be the result of a transition in step S94, this means that the system state to which the present system state can make a transition is not present. Therefore, the above-described system states are registered, as the deadlock state, in the SST file 1200. According to this example, since restrictions which cannot be met simultaneously are provided for all of the transitions from B to C, X to Z, and H to I of B, X, H, the system state (B, X, H) is, together with "D.L" representing a deadlock, registered in the SST 1200 when the system is in a state (B, X, H).

Figure 39A:
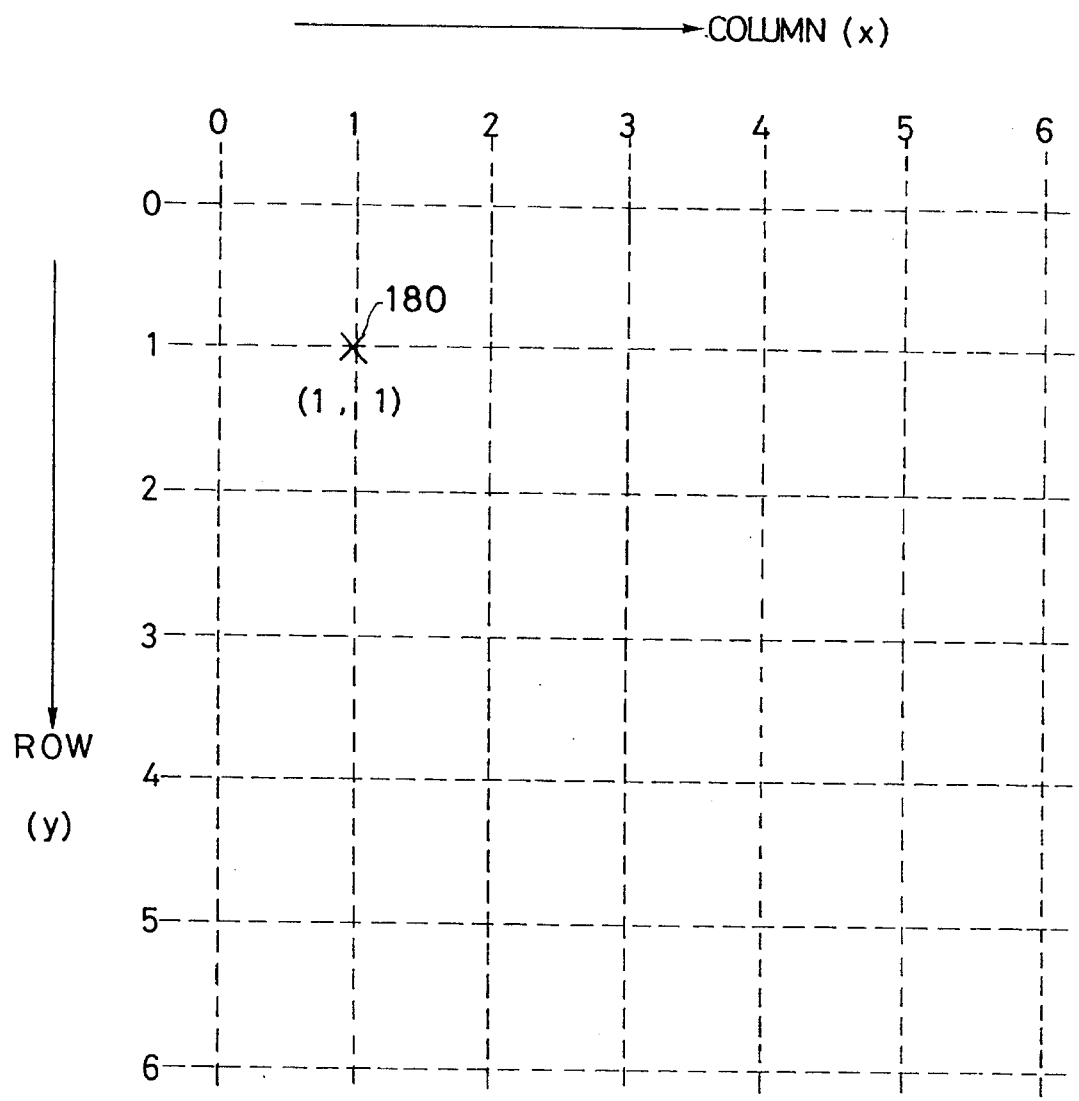
FIGS. 39A and 39B are views which illustrate the tree structure chart.
Figure 39B:
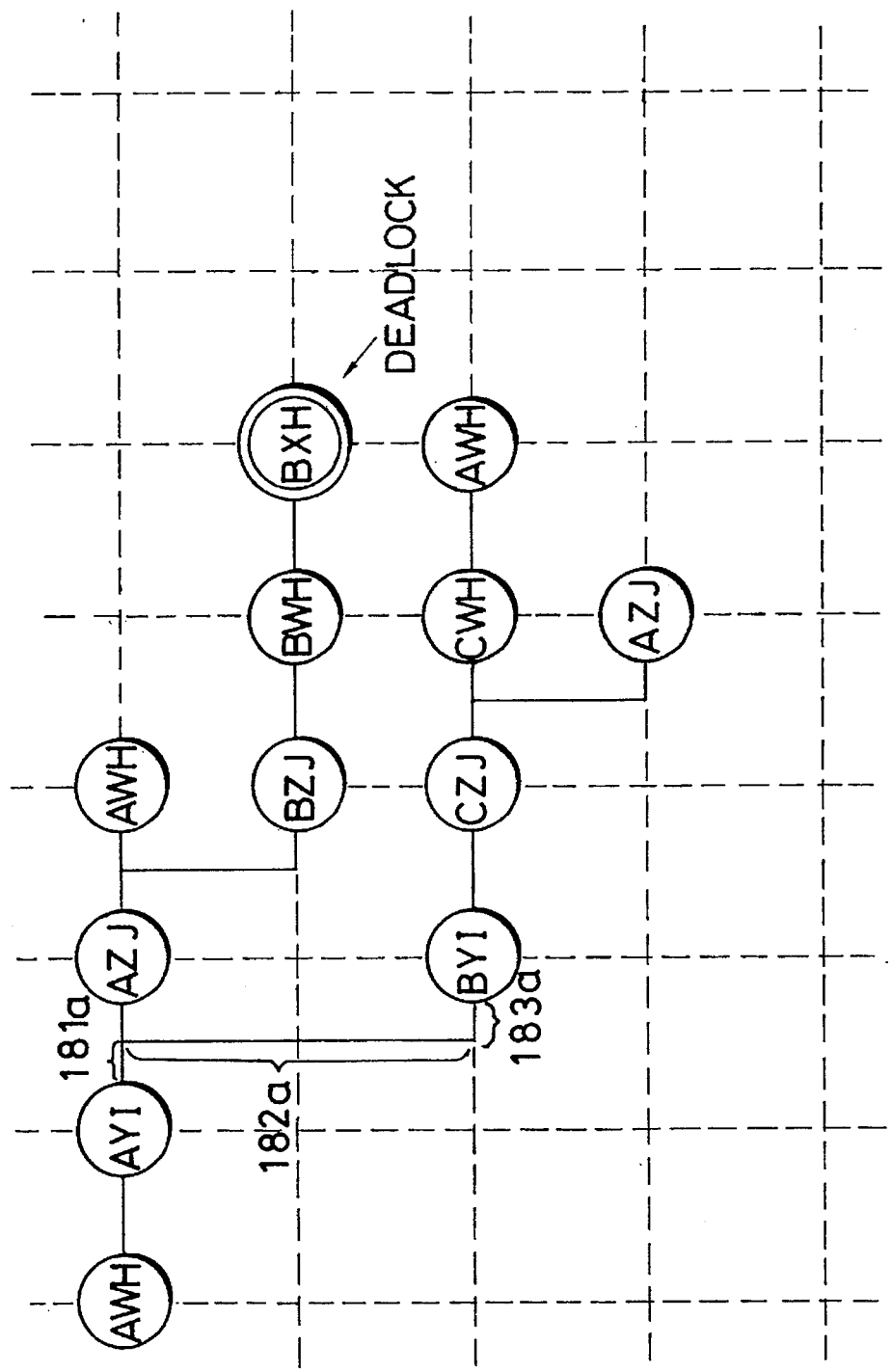

FIG. 37 is a view which illustrates an example of the thus-processed SST file 1200. When all of the reachable system states are thus checked, coordinate information required to originate the tree structure chart on the basis of the specifications defined in step S1 is processed in step S97 on the basis of information stored in the SST file 1130. FIG. 38 is a view which illustrates an example of graphic information about the tree structure chart which has been thus originated. The parameter "D" shown in FIG. 38 shows a deadlock state. In step S98, a tree structure chart as shown in FIG. 39B is, on the basis of coordinate information stored in TT file 1330 and from coordinate information originated in step S97, displayed on the CRT of the input/output portion 10.

FIG. 40 is a view which illustrates an example of the structure of the memory in the working memory 20 when the processes A and B are executed in accordance with the flow chart shown in FIG. 34. This structure is arranged similar to that shown in FIG. 19, and the difference is only in that a deadlock flag df is added.

[Description of process A (FIG. 41)]

FIG. 41 is a flow chart which illustrates the process A in the flow chart shown in FIG. 34. This process A is arranged to be capable of extracting all of the next system state candidates on the basis of the present system state and from the UST file 1110, selecting a probable system state from all of the next system state candidates extracted, making a reference to the SRT file 1130, and registering the thus-selected candidate in the SST file 1200. This process A is structured substantially similarly to the process shown in FIG. 20, and the difference from it lies only in step Sill. Therefore, a description will be provided about step S111.

Figures 42A, 42B:
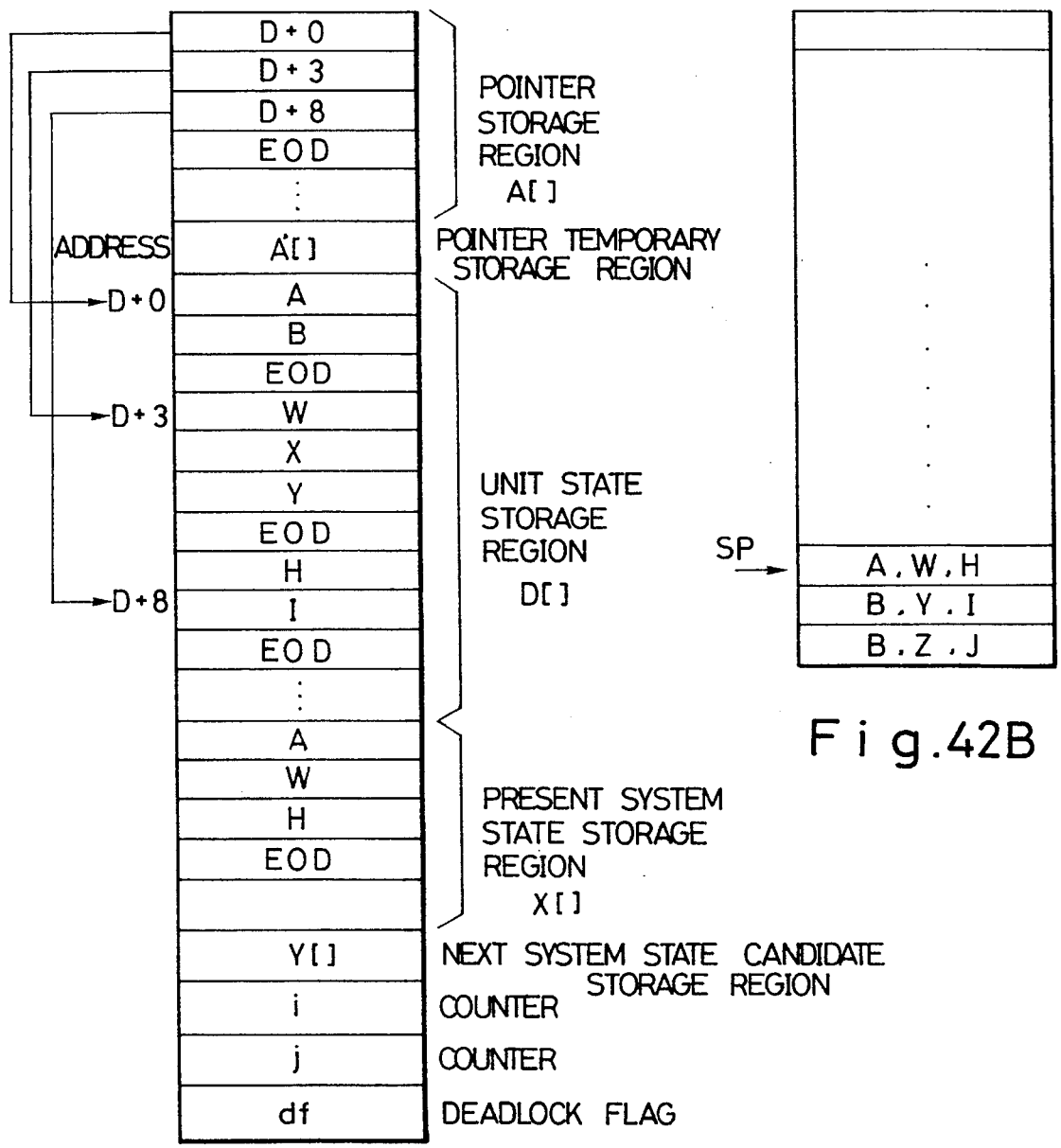
FIG. 42 is a view which illustrates the state of the memories in the working memory after the process A shown in FIG. 34 has been performed.

FIG. 42 is a view which illustrates a state in which each of the points in the working memory 20 has been set in accordance with step S101.

In step S102, the contents of the pointer storage region A [ ] are copied in the pointer temporary storage region A' [ ]. In step S103, the counter i is initialized to "0" and the deadlock flag df is also initialized to "1". In step S104, the value pointed to by the pointer of the pointer temporary storage region A' [ ] is copied in Y [ ] as the next system state candidate with the counter i made to be incremented. For example, assuming that A' [ ]={D+0, D+3, D+8}, it is arranged that {A, W, I} is copied in Y [ ] due to the memory state shown in FIG. 42.

In step S10B, the pointer in A' [ ] is incremented as to point the next next-system state candidate. In step S106, the counter j is initialized to "0". In step S107, the processings from step S107 are repeated until all of the present system states stored in X [ ] are checked. When the fact that the checking has been completed is detected upon the detection of "EOD" from the present system state storage region X [ ], X [ ] and Y [ ] are respectively written in the preceding system state and the next system state. In addition, in order to express the fact that no deadlock has been generated, the deadlock flag df is set to "0", and Y [ ] is pushed (stored) in the stack. Then, the flow advances to step S111.

On the other hand, when the presence of any present system states stored in X [ ] is detected in step S107, the flow advances to step S108 in which the corresponding pair of controlled states is selected by using the counter j from X [ ] and Y [ ], and it is determined whether or not a transition whose preceding controlled state and the next transition state comprise the thus-selected controlled states is registered in the SRT file 1130. If any transition of the type described above is not registered, the flow returns to step S107 with the counter j made to be incremented.

If the fact that a transition is registered in the SRT file 1130 is determined in step S108, the process advances to step S109 in which it is determined whether the restraint conditions against the transition from the present controlled state registered in X [ ] to the next controlled state in Y [ ] is satisfied. If the conditions are satisfied, it is determined whether a transition whose preceding controlled state is arranged to be the present controlled state in X [ ] and whose next controlled state is arranged to be the next controlled state in Y [ ] is registered in the SRT file 1130.

If the transition of the type described above is registered in the SRT file 1130, the flow returns to step S109. If no transition is detected, the flow advances to step S111 in which it is determined whether the deadlock flag df is turned on. If it is determined that the deadlock flag df is turned on, a system state whose preceding system state is arranged to the system state stored in X [ ] and whose next system state is arranged to be "D.L" is registered in the SST file 1200. Then, it is determined whether or not all of the next system state candidates in which X [ ] is arranged to be the present system state has been checked by using the counter i. If the checking has not been completed, the flow returns to step S103.

[Description of the process C (FIGS. 43 and 44)]

The process C shown in FIG. 43 will be described in detail with reference to the above-described sequence. An example of the structure of the working memory 20 when the process C is executed is arranged to be the same as that shown in FIG. 31.

Figure 43A:
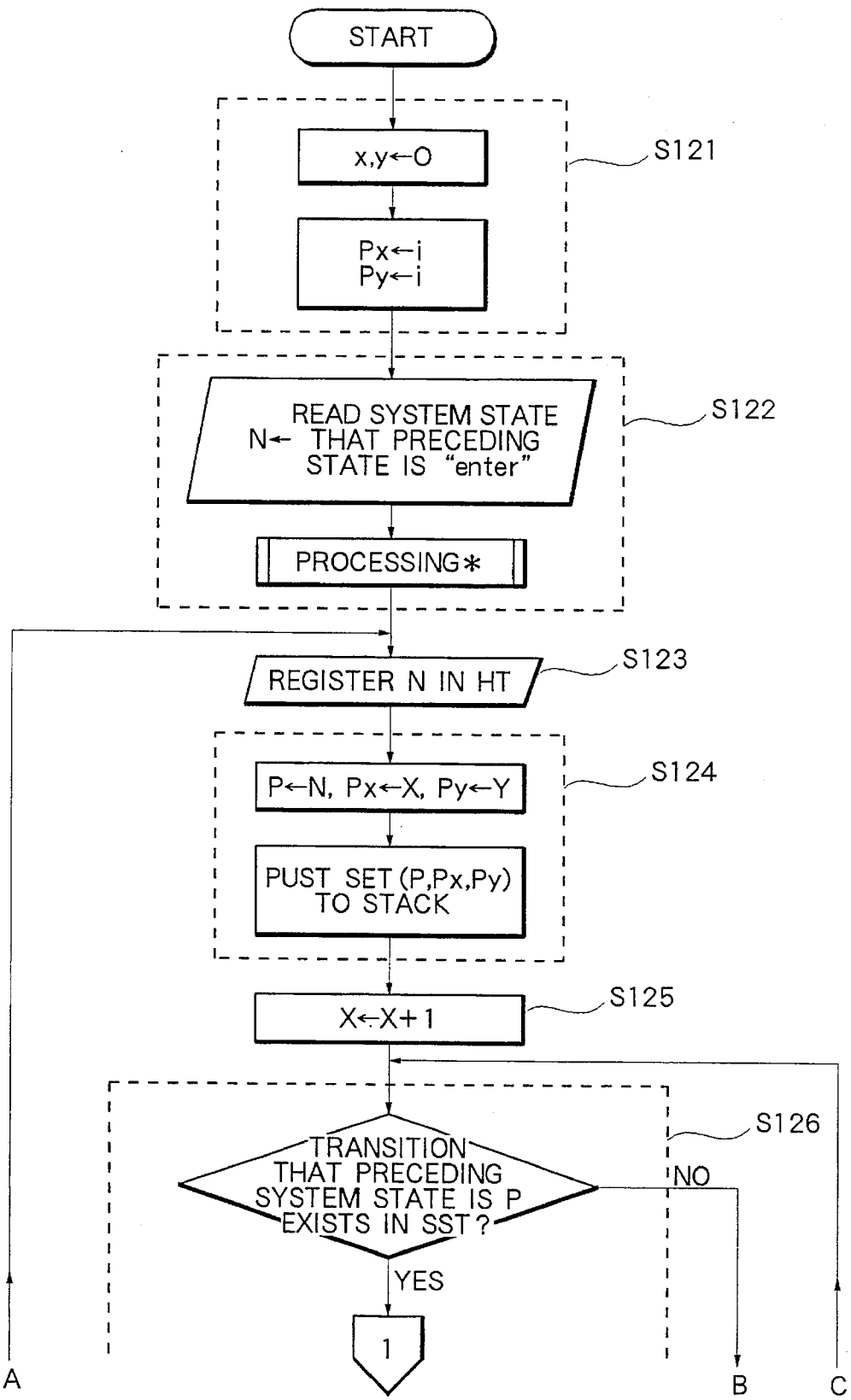
FIG. 43 is a flow chart which illustrates the detailed processings of the process C shown in FIG. 34.
Figure 43B:
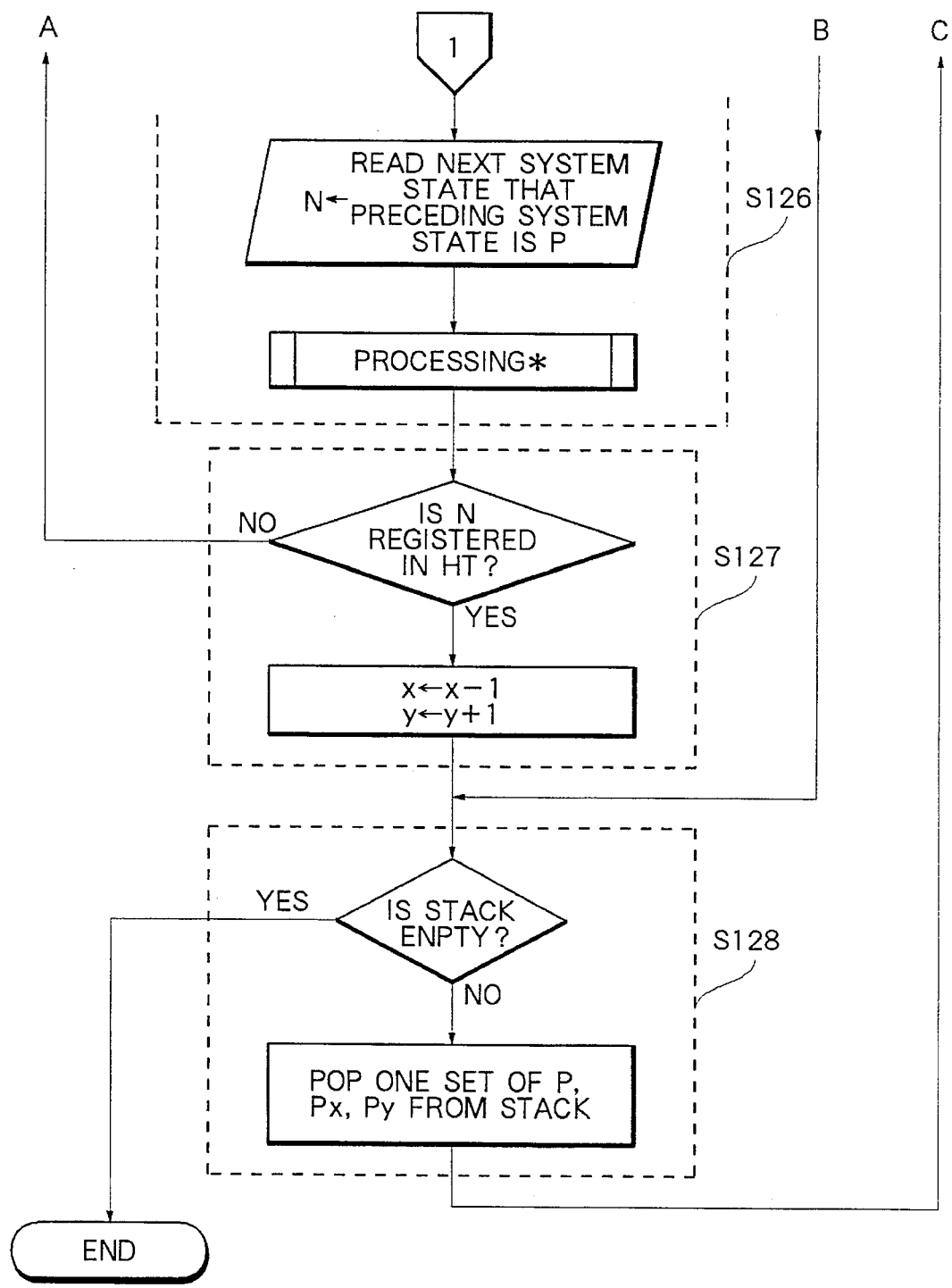

FIG. 43 is a flow chart which illustrates the detailed process according to the process C, this process being arranged to be substantially the same as that shown in FIG. 32. The difference lies only in steps S122 and S126.

Figure 43C:
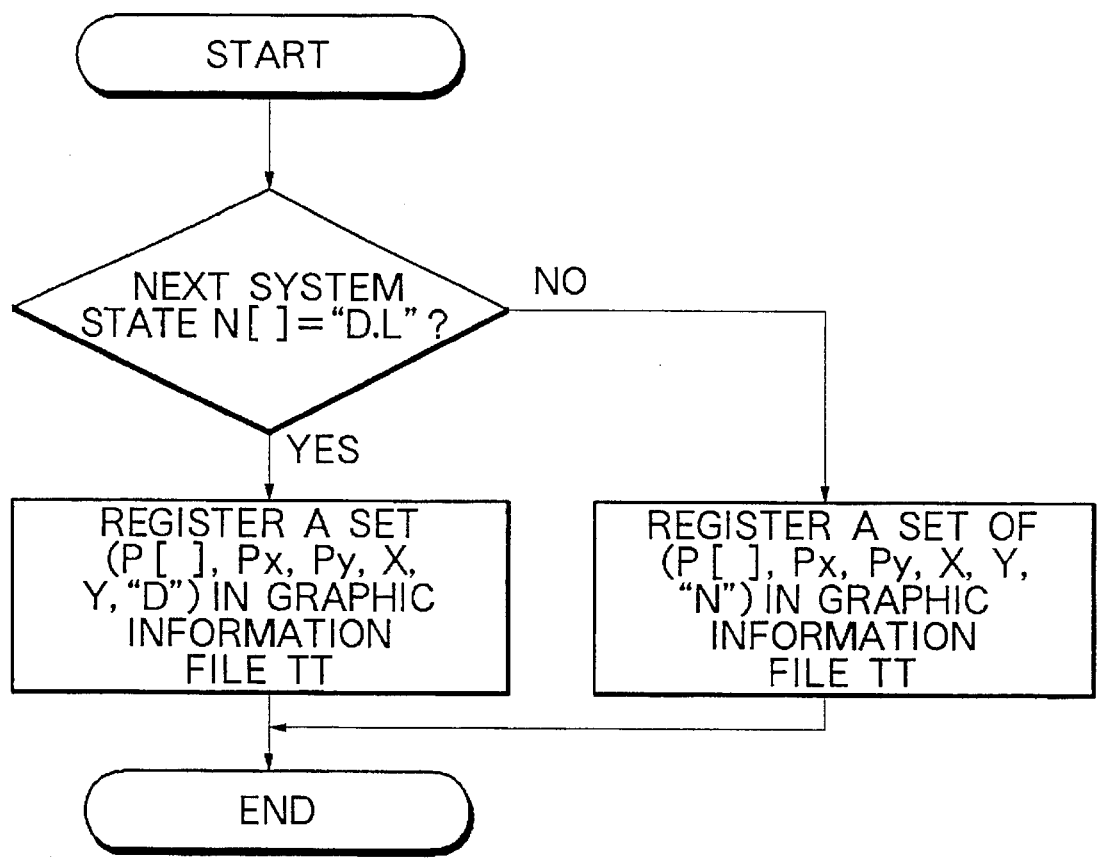

FIG. 43C is a view which illustrates the difference between the processing in step S122 from that in the flow chart shown in FIG. 32A, where, as graphic information, graphic data consisting of N [ ], Px, Py, x, and y is written in the graphic file (the TT file 1330). In this example, when the next system state is deadlock "D.L", "D" is arranged to be written, as a parameter, in the TT file 1330. When it is not the deadlock "D.L", "N" is arranged to be written, as a parameter, in the TT file 1330.

Then, the flow advances to step S123 in which the contents of the next system storage region N [ ] is stored in the history table H [ ]. In step S124, the present system state P [ ], and the column counter Px and the row counter Py for the present system state are set as to be registered (PUSH) in the stack area. In step S125, the column counter x is incremented by one, and in step S126, it is determined whether a next system state whose preceding system state is arranged to be the present system state P [ ] is present in the SST file 1200. If it is present, the next system state is written in the next system state N [ ] and the processing shown in the flow chart shown in FIG. 43C is executed.

FIG. 38 is a view which illustrates an example of the contents of the graphic information (TT file) 1330 when the process above is completed.

[Description of the process D (FIG. 44)]

Figure 44:
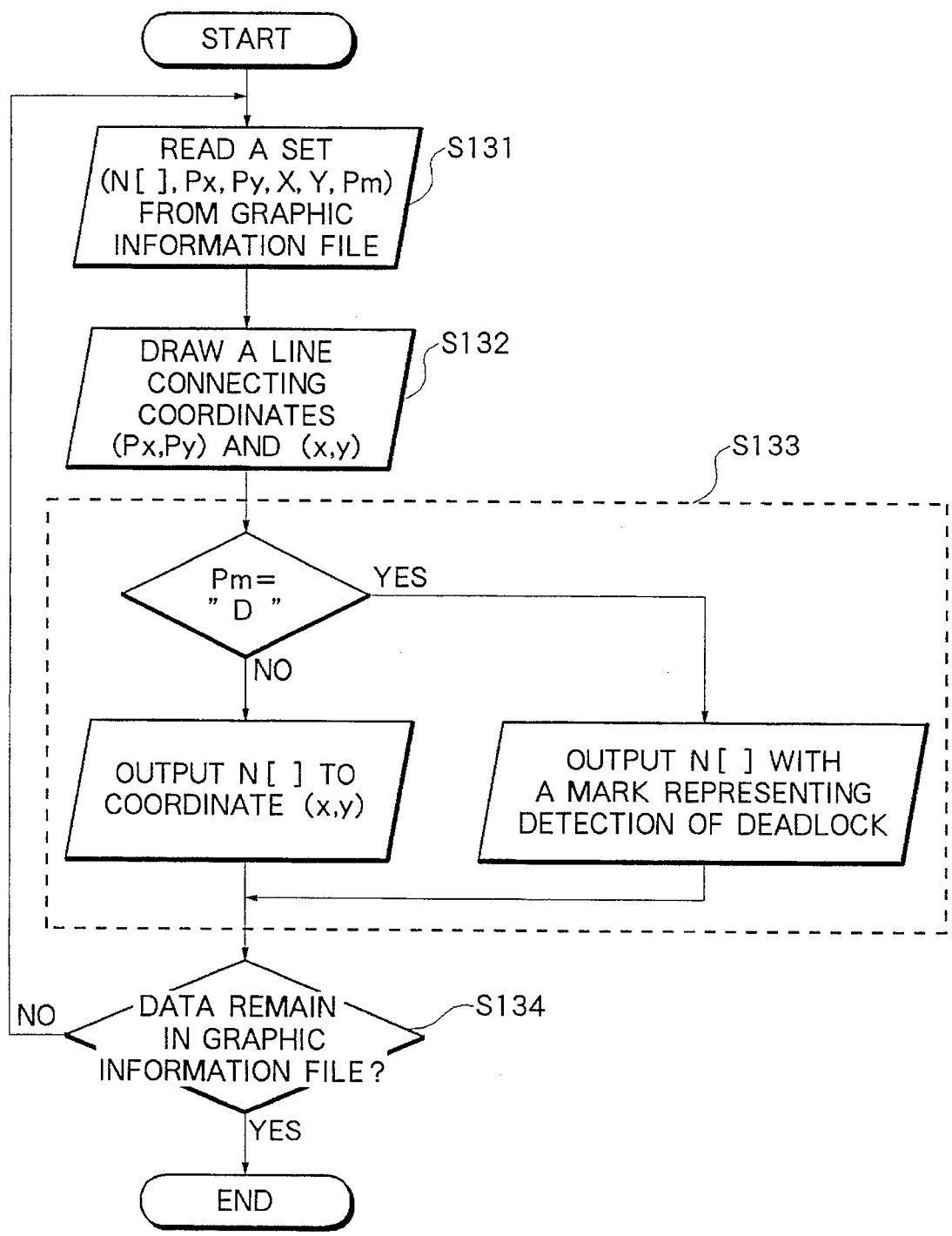
FIG. 44 is a flow chart which illustrates the detailed processings of the process D shown in FIG. 34.

FIG. 44 is a flow chart which illustrates the detailed process according to the process D shown in FIG. 34. This flow chart displays a chart showing a tree structure in the input/output device 10 on the basis of the graphic information file 1330 originated in accordance with the process C, where the deadlock state (B, X, H) is, as shown in FIG. 39B, shown individually from the other controlled states. Also according to this display, a logical lattice as shown in FIG. 39A is assumed on the CRT of the input/output device 10, in which point 180 is expressed by (1, 1).

Referring to FIG. 44, the next system state N [ ], the column counter Px and the row counter Py for the present system state, and the column counter x and the row counter y for the next system state are read from the graphic information file 1330. In step S132, a line connecting (Px, Py) and coordinate (x, y) are drawn. However, no line is drawn when (Px, Py) coincides with (x, y) in this step.

As can be clearly seen from FIG. 39B, the present system state (coordinate (Px, Py)) and the next system state (coordinate (x, y)) are connected with, for example, three line segments, (Px, Py)–((Px+x)/2, Py) (for example, a line segment 181), ((Px+x)/2, Py)–((Px+x)/2, y) (for example, a line segment 182), and (Px+x)/2, y)–(x, y) (for example, a line segment 183). In step S133, the content of N [ ] is displayed in the coordinate (x, y) of the next system state. In this state, it is determined whether the value of the parameter Pm is "D". If "D" is given, N [ ] is displayed with a mark representing the fact that the subject state will brought to a deadlock state. An example of this process is shown in FIG. 18B in which a system state (B, X, H)=(BXH) expressed with a double circle is illustrated as this example. As a method to display the object system state, it might be considered to employ a method of raising the brightness or a method of providing a special symbol.

If the parameter Pm is "N", the N [ ] is intact and transmitted to its coordinate position. In step S134, it is examined whether all of information stored in the TT file 1330 has been checked. If all has been checked, the processing is completed here. If all has not been checked as yet, the flow returns to step S131 in which the above-described operation is executed.

As described above, it is apparent that all of the probable system states can be confirmed and the following effect can be obtained.

(1) Since generation of deadlock can be predicted when the specifications are determined in the early stage of the system development, a most suitable system can be designed.

(2) Since the causes of the deadlock can be correctly grasped, development and design of software exhibiting improved reliability can be conducted.

The actual system control to be performed in accordance with the above-described prediction of the operations will be described.

[Description of the controlling operation]

According to this system, a user uses a graphic specification editorial unit 11 shown in FIG. 45 as to define the specifications for the system through a terminal 10 and a language SR graph (SRG), to be described later, for describing the graphical specification. A programmable controller according to this embodiment performs the controlling operation on the basis of the thus-defined controlling information so that a plurality of peripheral equipment 60 are operated in association with one another. The following description will be provided with reference to the case in which the above-described system shown in FIG. 14A is controlled.

The SRT involves the following notations as follows.

(1) The sequential order of the operation of each of the devices.

This sequential order is, hereinafter, called "a sequence for a device". Referring to FIG. 14A, there are provided three sequences for: a thermal sensor; a cooler; and a software timer. In order to define these sequences for these devices, it is necessary for the functions (FIG. 14B) which can be performed by the subject devices and the sequential orders to be determined. In the SRG, these factors are expressed as the PA and the transitions between them. The term "PA" is an abbreviation of Primitive Action which indicates a sole action of a plurality of actions that is conducted by the subject device in a certain time point, the PAs being expressed by circles in which the name of the action (PA name) is written.

(2) Conditions for instructing an operation between devices.

In this process, whether a certain device may make the transition to its next operation (the state of operation is shifted) is determined. This process consists of a negative relationship which is effected upon confirmation of the states of operations of the other devices and a positive relationship which is effected by forcibly causing the operations of the other devices to make the transition to their next states as a result of the transition of a certain device to its next operation. As described above, the former relationship is expressed by a concept called "a flag", while the latter relationship is expressed by a concept called a "trigger" in the SRG.

Therefore, the basic expression elements of the SRG comprises a PA, a transition, a flag, and a trigger. The usage and method of operation these expression elements will be described.

(3) Transition

The restraint for the sequential order of the state of operation (PA) in each of the devices to be executed is expressed. Referring to FIG. 14A, it is designated by a continuous-line arrow direction from a PA before this transition to a PA after the transition.

(4) Flag

Referring to FIG. 14A, it is designated by a dashed-line arrow directed to a transition from an original PA of a certain device to the other device.

(5) Trigger

When the PA of a certain device is completed and makes the transition to the next PA, the transition in an assigned device is forced to be conducted and this situation is graphically represented. In the graphical expression, this condition is designated by a double-line arrow directed from the original transition to the destined transition.

(6) Synchronization conditions are determined by combining the flag and trigger

The flag and the trigger can be combined so as to be used. A logical product of a plurality of flags can serve as a flag, and a logical product of a plurality of flags and the trigger can serve as a trigger, which are called a composed flag and a composed trigger, respectively. This can be achieved by in parallel inputting the logical sum of a plurality of triggers and the flag. As described above, a further complicated transition condition can be determined by using the flag and the trigger of the type described above.

[Description of the system (FIG. 45)]

Figure 45:
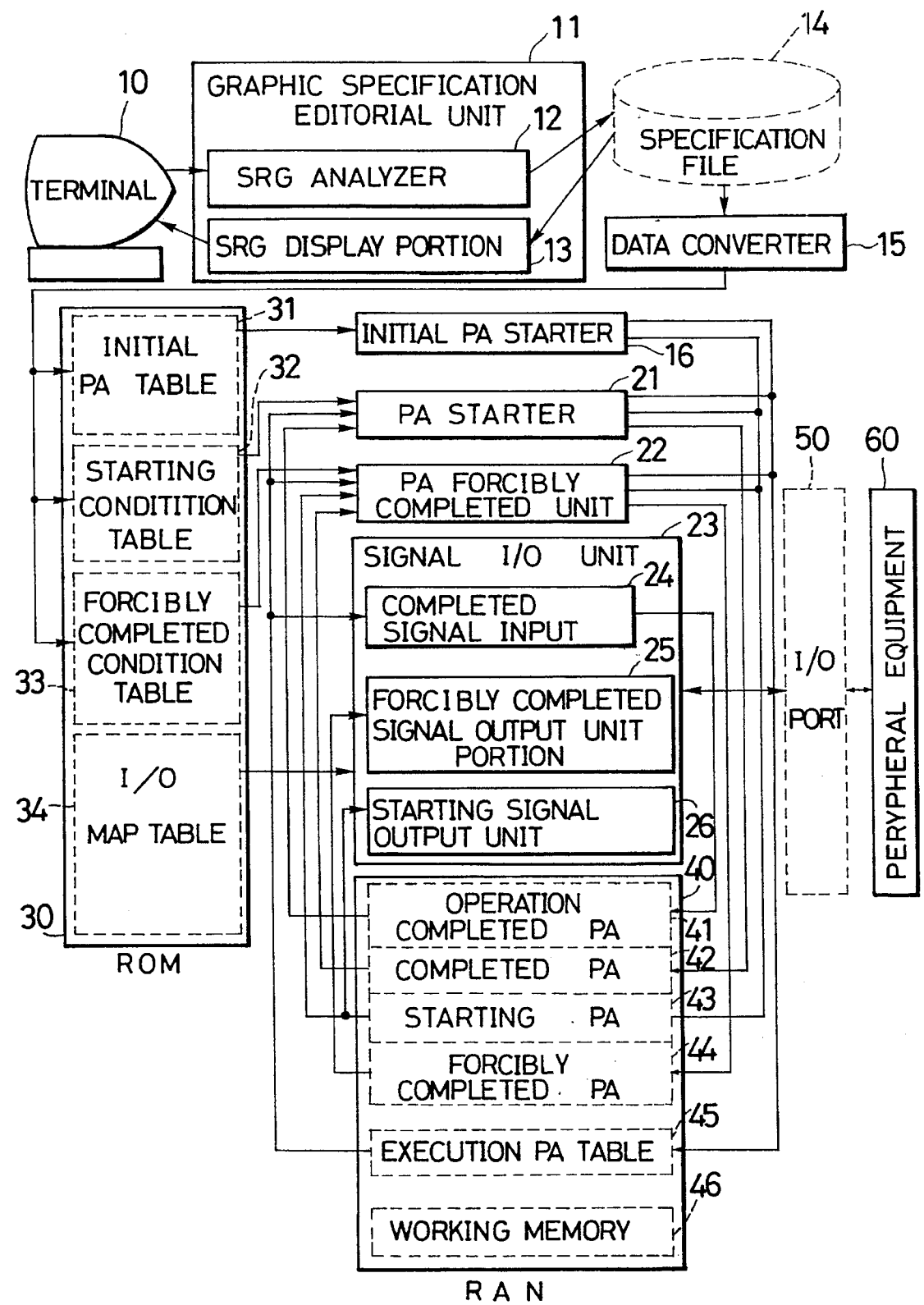
FIG. 45 is a block diagram which illustrates the schematic structure of the third embodiment according to the present invention.
Figure 46:
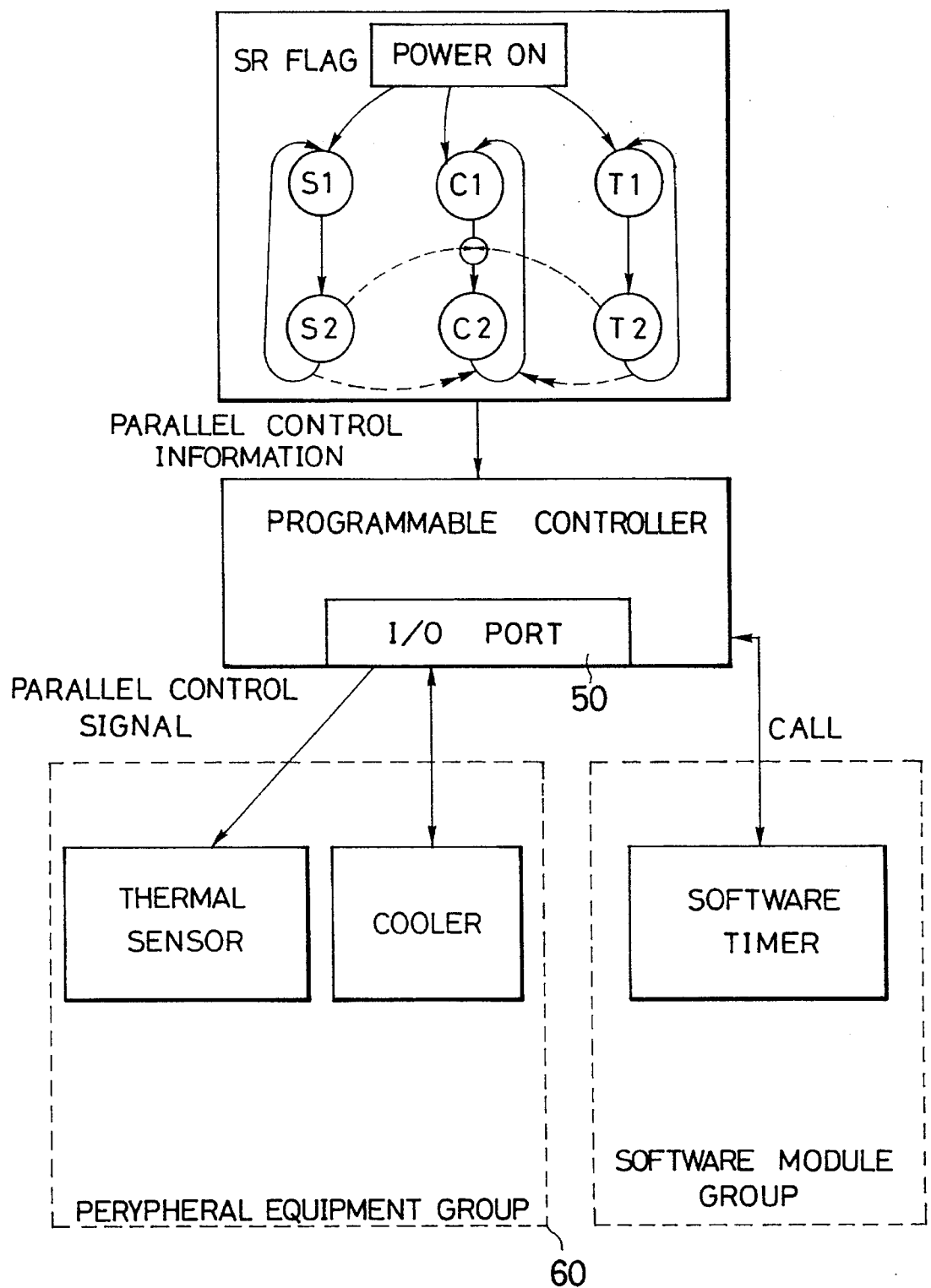
FIG. 46 is a schematic view which illustrates the control operation in the system according to this embodiment.

FIG. 45 is a schematic structural view which illustrates an example of a system according to a third embodiment.

Referring to FIG. 45, reference numeral 10 represents a terminal displaying inputting and displaying functions such as a keyboard and a CRT. Information about the specifications for the system can be input through this terminal 10 in a graphic notation language (SRG). Reference numeral 14 represents a specification file for storing specification information about each of the devices, this specification information being processed on the basis of specification information which has been input through the terminal 10. Reference numeral 11 represents a graphic specification editorial unit comprising: an SRG analyzing portion for analyzing, on the basis of the language SRG, the graphic information input through the terminal 10 so as to have the thus-analyzed specification information stored in the specification file 14; and an SRG display 13 for displaying the specific drawing at the terminal 10 on the basis of the specification information about each of the devices in the specification file 14.

Reference numeral 15 represents a data converter for processing, on the basis of the specification information about each of the devices in the specification file 14, various data to be stored in an initial PA table 31, starting condition table 32, and a forcibly completed condition table 33. Each of the tables in these ROM regions serves as read only memories when the system is operated. This data converter 15 is capable of processing data to be stored in each of the tables when the specifications for the system are defined before the operation of the system.

[Description of the ROM table (FIG. 48 to 51]

The structure of the ROM region 30 will be described. The initial PA table 31 stores the controlling operation to first start after the power has been supplied. This PA table 31 stores, as shown in FIG. 48A, the PA name corresponding to each of the sequences. FIG. 48B is a view which illustrates a specific example of the system shown in FIG. 14A, in which the upper-limit temperature waiting (S1) for the thermal sensor to start after the power has been supplied, the cooler off (C1), and the counting of time stoppage time (T1) are set therein.

Reference numeral 32 represents a starting condition table which stores the execution starting condition for making a device, which has already conducted its PA, execute a transition to the PA when an arbitrary number of the devices in the system are in a specific controlled state PA. It is apparent, from a specific example shown in FIG. 49B on the basis of the system shown in FIG. 14A, that any starting conditions are not set for transition of the thermal sensor from the upper-limit temperature waiting mode (S1) to the lower-limit temperature waiting mode (S2), the transition from S2 to S1, and the transition of the timer. On the other hand, when the cooler undergoes a transition from the OFF-mode (C1) to the ON-mode (C2), a condition is provided as PA data that the sensor is in the lower-limit waiting mode (S2) and the timer is in the counting mode for the operation time (T2).

Figures 50A, 50B:
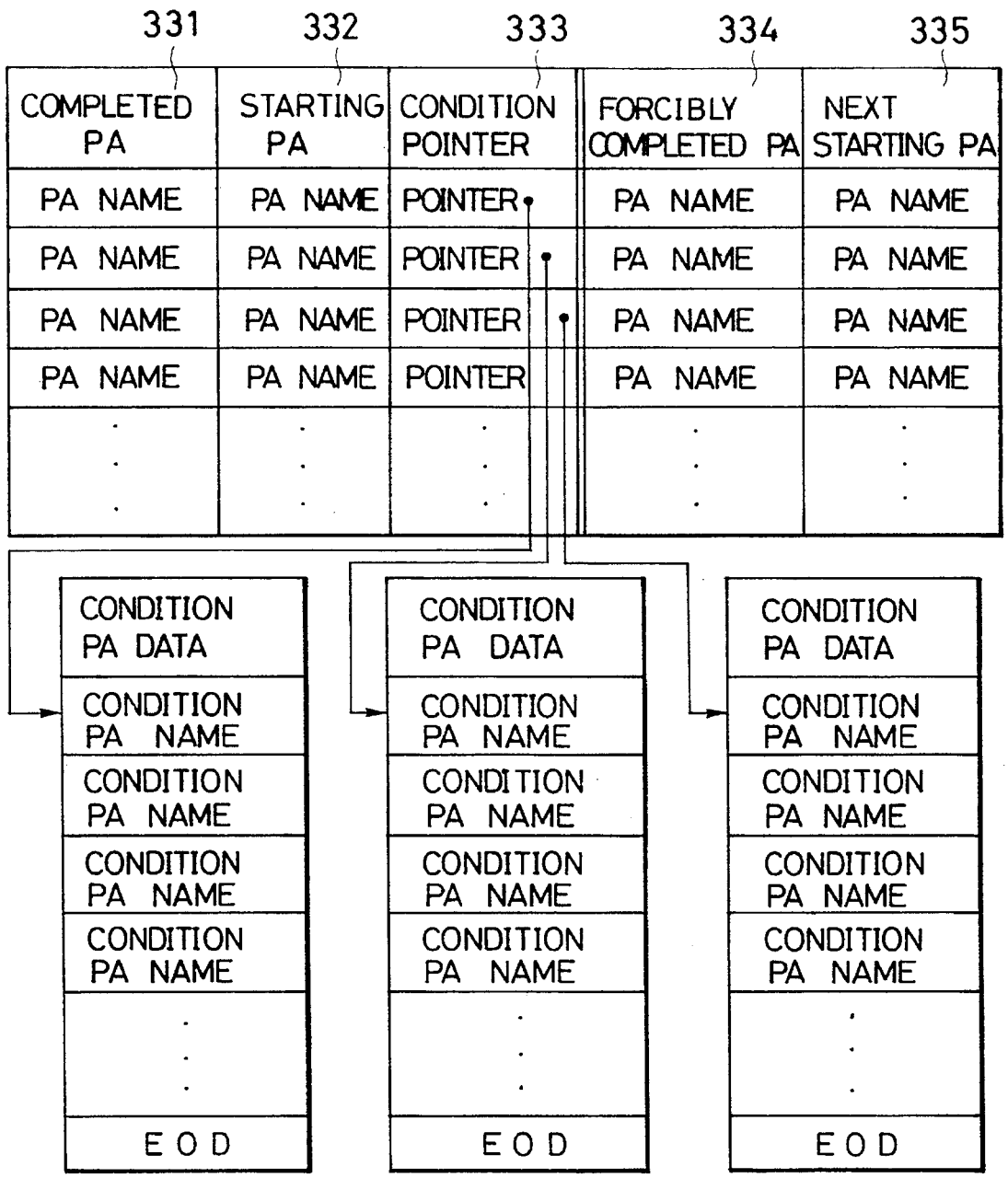
FIGS. 50A and 50B are views which illustrate information about the state of storage in a forced stopping condition table.

Reference numeral 33 represents a forced completed condition table consisting of: a completed PA name 331 extracted from the specification file 14; a starting PA name 332 to start as a result of the completion of this PA; a completed condition 333 to be forcibly completed and a PA name 334 to be forcibly completed as a result of the above-described start; and a PA name 335 to start next to the thus-forcibly completed PA. FIG. 50B is a view which illustrates an example of the forcibly completed condition table 33 processed on the basis of the system shown in FIG. 14A, in which is illustrated a fact that the cooler undergoes an unconditional transition from the ON mode (C2) to the OFF mode (C1) when the thermal sensor undergoes a transition from the lower-limit waiting mode (S2) to the upper-limit waiting mode (S1) or when the timer undergoes a transition from the counting for the operation time to the counting for the stoppage time.

Reference numeral 34 represents an I/O map table in which information corresponding to an I/O port 50 connected to the peripheral equipment 60 and, as shown in FIG. 51, port addresses are stored so as to correspond to each of PAs of each of the sequences. FIG. 51B is a view which illustrates a specific example of the structure shown in FIG. 50.

Then, the other components will be described with reference back to FIG. 45.

Reference 16 represents an initial PA starter for starting the initial PA by writing the initial PA for all of the sequences in an execution PA table 45 and starting PA in the RAM 40 on the basis of information in the initial PA table 31. Reference numeral 21 represents a PA starter for writing the completed PA in a completed PA 42, and the PA to be started next in an execution PA table 45 and a completed PA43, making a reference to the operation completed PA41 and an execution PA table 45 in a RAM region 40 and the starting condition table 32 in the ROM region. Reference numeral 22 represents a PA forcibly-completed unit for writing the PA to be forcibly completed in a forcibly completed PA 44, and the PA to be started next in an execution PA table 45 and a starting PA43, making reference to the completed PA42, starting PA43 and the execution PA table 45 in the RAM region 40 and the forcibly completed condition table 33 in the ROM region.

Reference numeral 23 represents a unit for inputting/ outputting a control information signal to and from the outer peripheral equipment 60 by operating the I/O port 50, this unit comprising a completed signal input unit 24, a forcibly input signal output unit 25, and a starting signal output unit 26. Reference numeral 24 represents a completed signal input unit (see FIG. 56) capable of detecting the completed signal supplied from the outer peripheral equipment and to be written in the I/O port 50 and writing the PA corresponding to the signal supplied from the I/O port 50 in the operation completed PA 41 on the basis of information from the execution PA table 45 and I/O map table 34. Reference numeral 25 represents a forcibly completed signal output unit (see FIG. 57) for making the I/O port 50 which corresponds to the PA transmit on the basis of information in the forcibly completed PA 44 and the I/O map table 34. Reference numeral 26 represents a starting signal output unit for transmitting, on the basis of information in the starting PA43 and the I/O map table 34, a starting signal from the I/O port 50 which corresponds to the PA. The components 20 to 26 are aided by a computer (of course it includes a computing portion, memories for processing, a control memory for storing the processing procedure represented by the flow chart to be described later, and an interface to supply and receive information), these components being so structured as to be capable of accessing, without exceptions, the ROM region 30 and the RAM region 40 as illustrated.

Reference numeral 50 represents the I/O port for controlling an interface between the peripheral equipment group 60 and the signal I/O unit 23 for the purpose of controlling the peripheral equipment group 60. Reference numeral 60 represents a peripheral equipment group to be controlled by control information supplied through the I/O port 50, this peripheral equipment group 60 comprising a plurality of devices.

[Description of the RAM region (FIG. 52)]

FIGS. 52A and 52B are views which illustrate the structure of the execution PA table 45 in the RAM region 40. This execution PA table 45 stores the operation states of all of the devices which are being executed, which are required for confirming the starting condition and the forced completion for the operations of these devices. As shown in FIG. 52A, the execution PA table stores name of the PA to be executed in correspondence with each of the sequences. The contents of the execution PA table 45 immediately after the execution of the initial PA shown in FIG. 14 has been started are shown in FIG. 52B. In this state, the thermal sensor is in the state S1, the cooler is in C1, and the timer is in T1 immediately after the initial PA has been started.

Reference numeral 41 represents the operation completed PA in which name of the PA whose completion has been confirmed is stored. Reference numeral 42 represents the completed PA in which the completed PA is stored, making reference to the above-described execution PA table 45. Reference numeral 43 represents the starting PA in which the name of the PA, the execution of which is started, is stored with reference to the execution PA table 45. Reference numeral 44 represents a forcibly completed PA the execution of which is forcibly completed in response to a command from the PA forcibly completed unit 22. Reference numeral 46 represents a working memory in which a variety of data is temporarily stored and a stack area is provided therein.

[Description of the processing operation (FIG. 47)]

Figure 47:
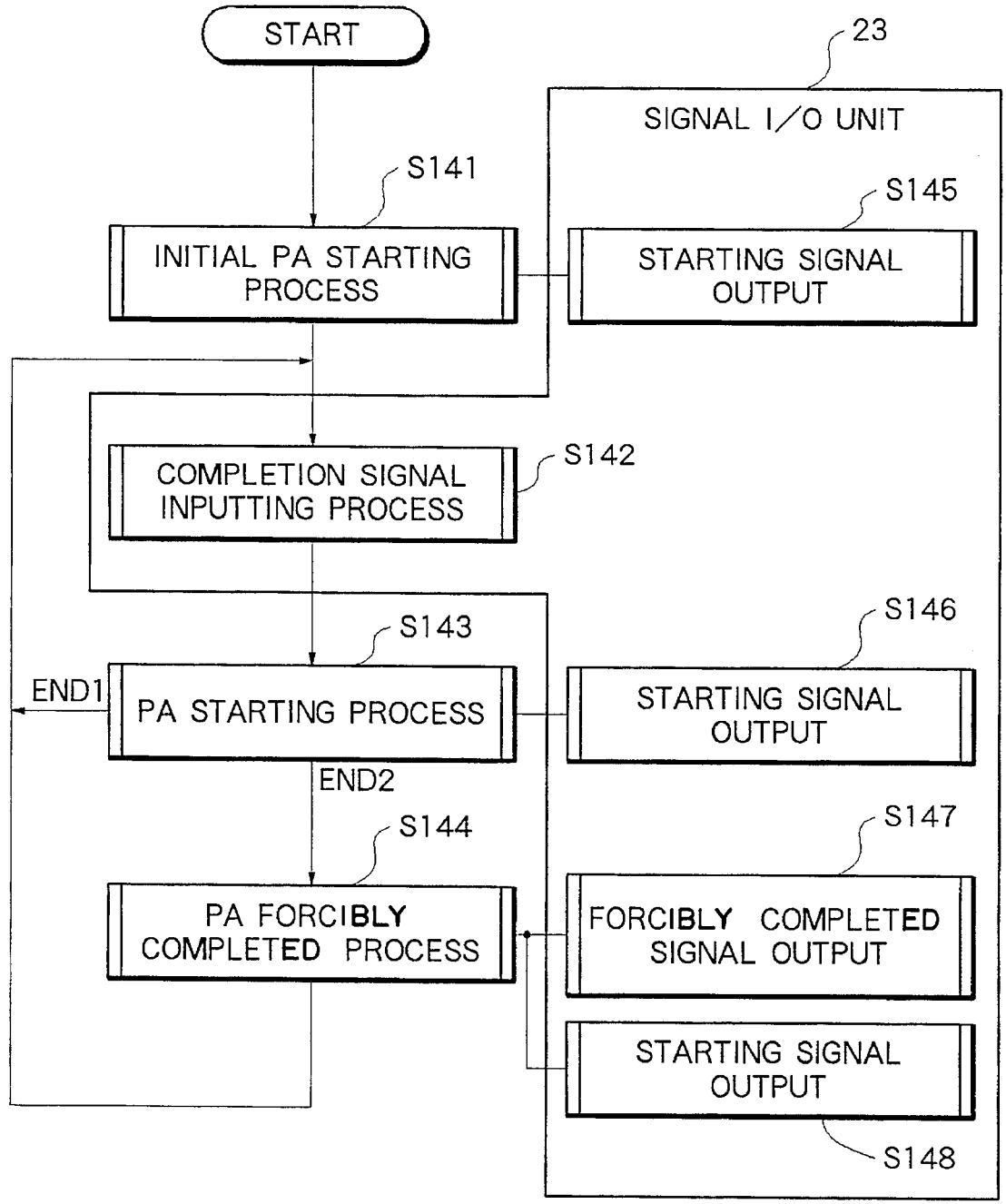
FIG. 47 is a flow chart which illustrates the flow of the operation of the system according to a third embodiment.
Figure 49A:
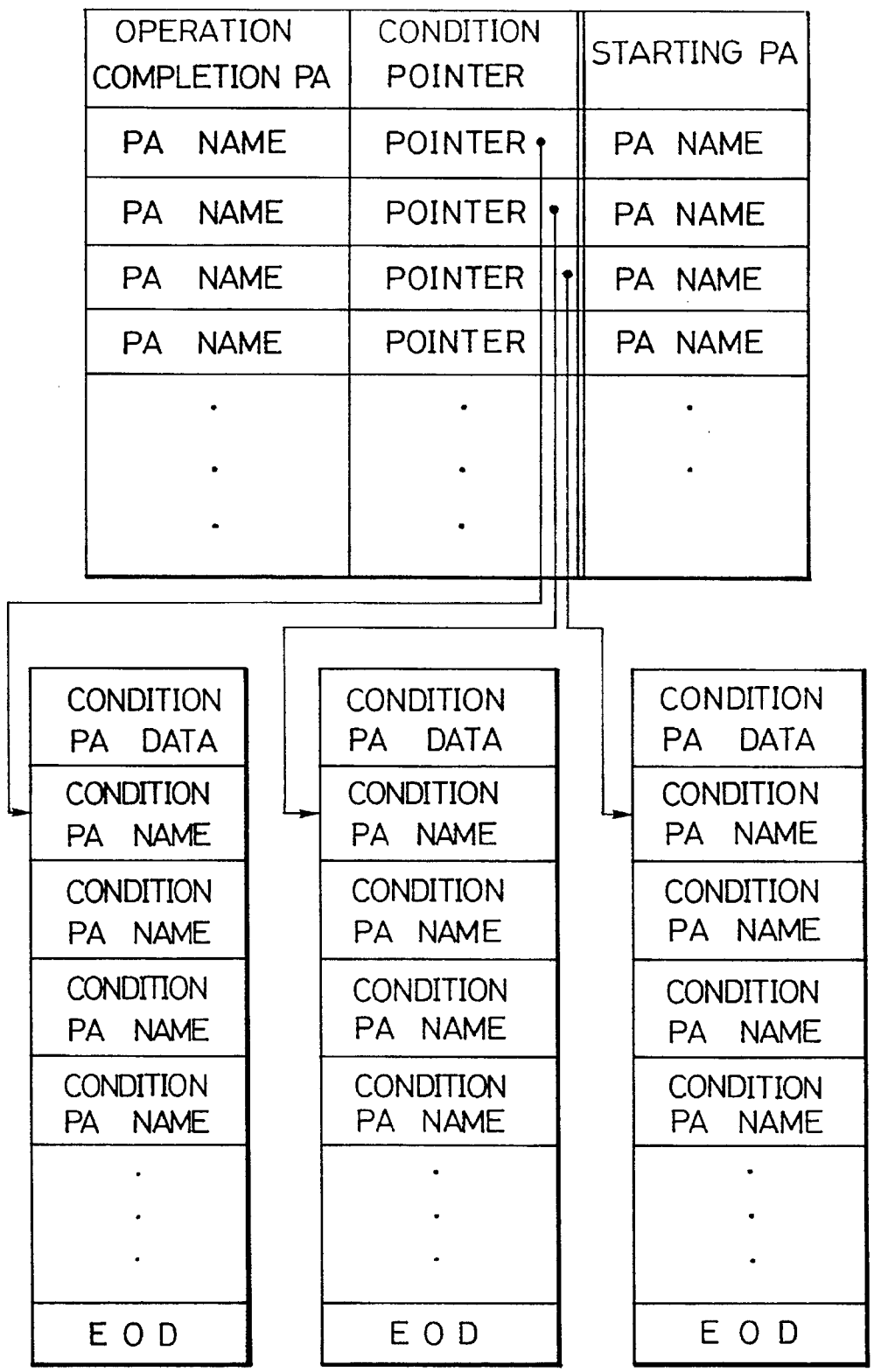

FIG. 47 is a flow chart which illustrates the processing procedure according to this embodiment, where it is assumed that each of the tables in the ROM region 30 has been previously processed before starting of this process.

In step S141, the initial PA starter 16 writes the initial PA to be first started in the entire sequence in the execution PA table 45 and the starting PA 43 on the basis of information in the initial PA table 31 so that the operation is started. This processing will be described later with reference to FIG. 53. In this step S141, a starting signal output processing routine in step S145 is called so that the starting PA is started.

Then, in step S142, the completed signal from the I/O port 50 is detected on the basis of information from the execution PA table 45 and the I/O map table 34, and processing for inputting the completed signal occurs and the PA which corresponds to this completed signal is stored in the operation completed PA 41. The detailed description of this processing will be provided later with reference to a flow chart shown in FIG. 56. In step S143, the processing of starting the PA is performed by writing the PA to be next started in the execution PA table 45 and the starting PA on the basis of information from the operation completed PA 41, the starting condition table 32, and the execution PA table 45. The description of this processing will be provided later with reference to a flow chart shown in FIG. 54.

In the PA starting processing in step S143, when the next PA is not started (END 1), the flow returns to the completed signal input processing in step S142 in which the above-described processes are repeated. When the next PA is started (END 2), the flow advances to step S144 in which the forcibly completed processing is executed and in which the PA to be forcibly completed is written in the forcibly completed PA44 and the PA to be started next is written in the execution PA table 45 and the starting PA 43 on the basis of information in the completed PA42, the staring PA 43, the forcibly completed condition table 33, and the execution PA table 33. This processing will be described later with reference to a flow chart shown in FIG. 55.

[Description of initial PA starting processing (FIG. 53)]

Figure 53:
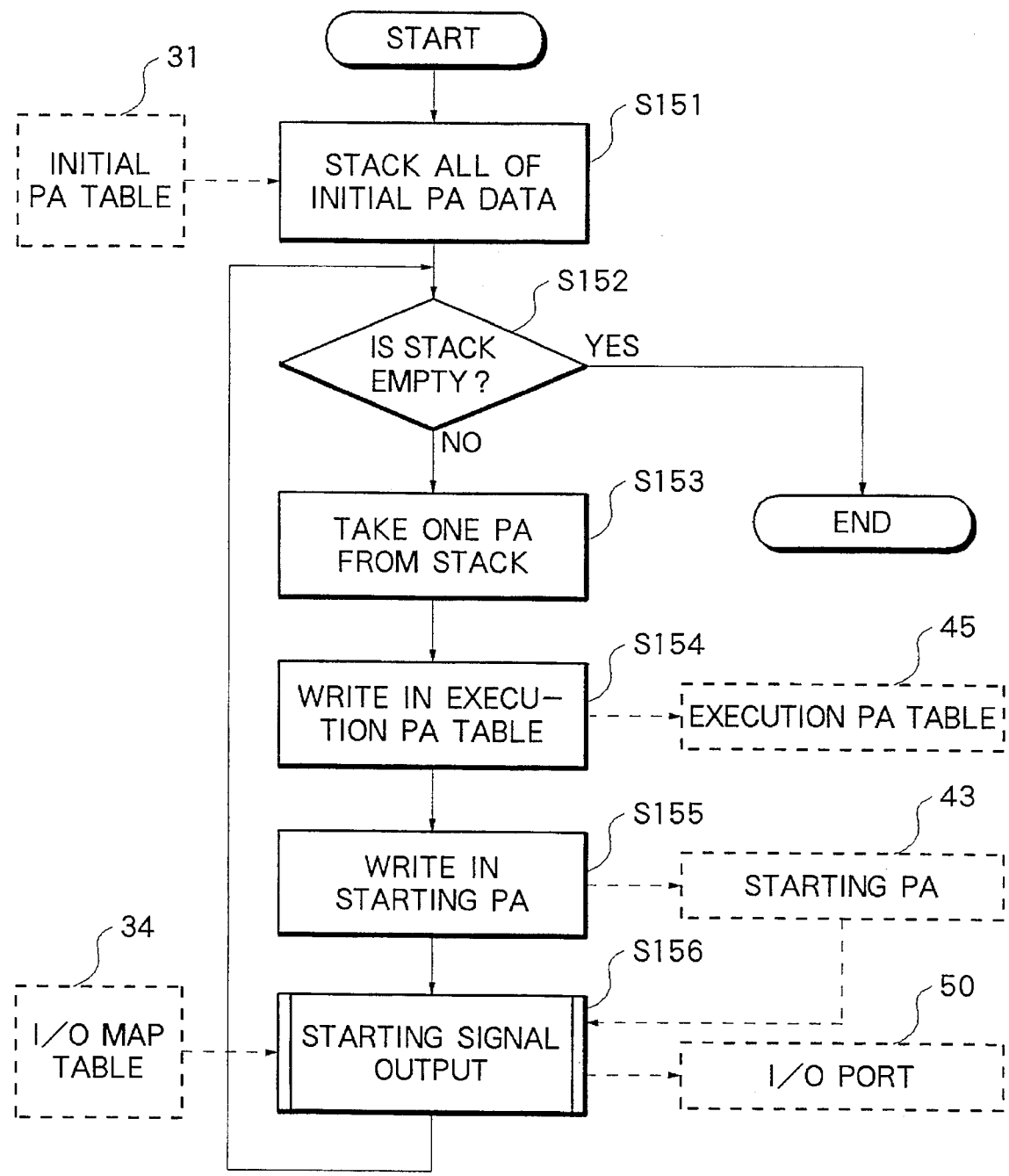
FIG. 53 is a flow chart which illustrates the initial PA starting operation according to the third embodiment.

FIG. 53 is a flow chart which illustrates in detail the initial starting PA processing in step S141 shown in FIG. 47. This processing is conducted in the initial PA starting portion 16.

First, in step S151, all of the initial starting PA data is read from the initial PA table 31, and the thus-read data is stored in the stack in the working memory 46. In step S152, it is determined whether or not the stack area is empty. If it is not empty, the flow advances to step S153 in which a PA data item is taken out from the stack. In steps S154 and S155, the thus-taken out PA is written in the execution PA table 45 and the starting PA 43. In step S156, the starting signal output processing is executed so that the execution of the PA which has been written in step S155 is started. As described above, the processings from steps S152 to S156 are repeated until the PA in the stack is exhausted so that the starting processing is thus conducted.

[Description of the completed signal input processing (FIG. 56)]

Figure 56:
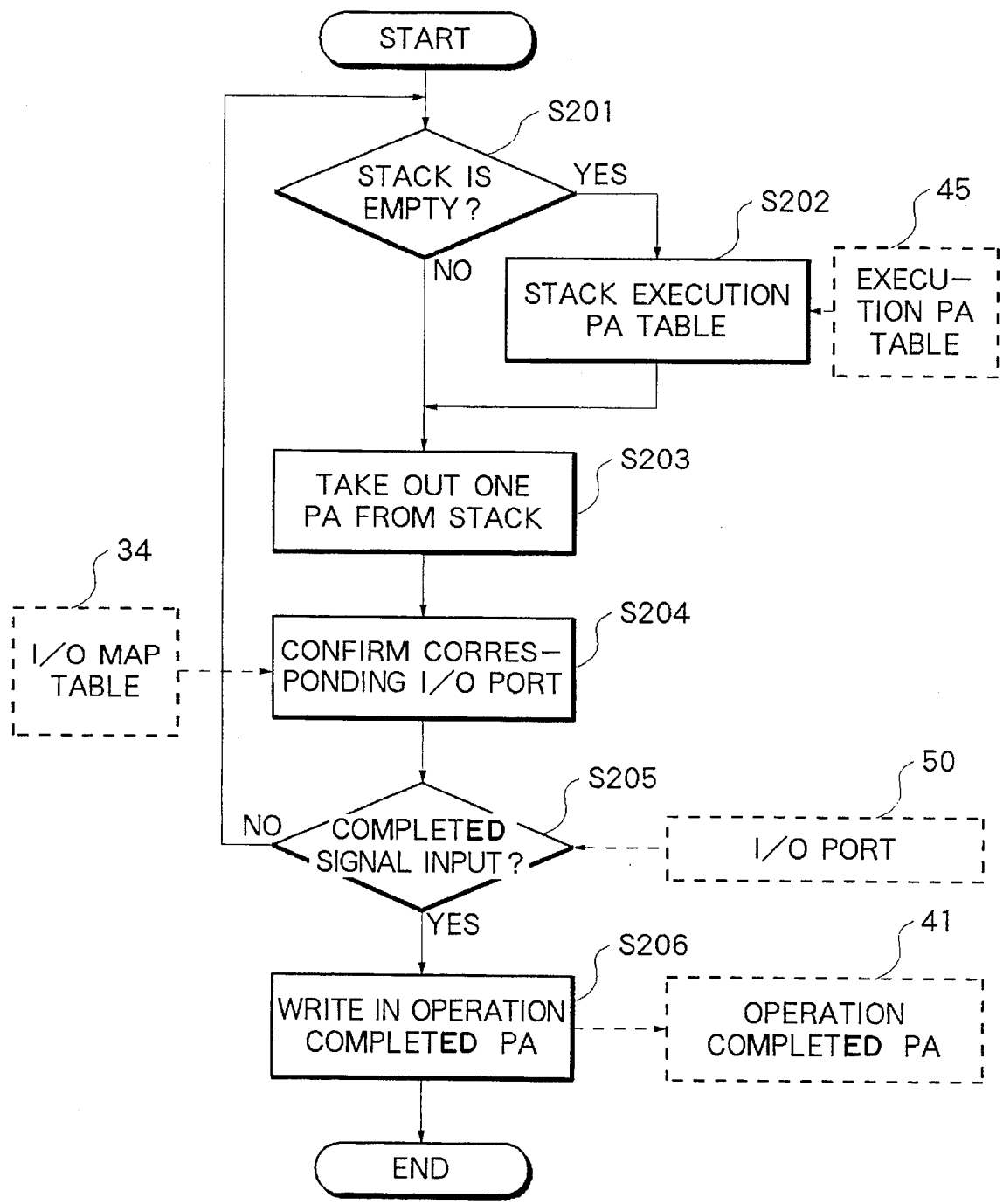
FIG. 56 is a flow chart which illustrates the input processing of the stop signal according to the third embodiment.

FIG. 56 is a flow chart which illustrates the processing for inputting the completed signal from the peripheral equipment 60 shown in FIG. 47. This processing is arranged to be conducted in the completed signal inputting portion 24. In this processing, the completed signal from the peripheral equipment 60 and to be written in the I/O port 50 is detected, and the PA which corresponds to this completed signal is written in the operation completed PA41 on the basis of the execution PA table 45 and the I/O map table 34. Then, this processing will be described in detail.

In step S201, it is determined whether or not the stack area is empty. If it is empty, the flow advances to step S202 in which all of PAs in the execution PA table 45 is stored in the stack. In step S203, a single PA is taken out from the stack. In step S204, the I/O port which corresponds to the thus-taken out PA is examined on the basis of the I/O map table 34. In step S205, it is determined whether or not the completed signal has been input from the I/O port which corresponds to the PA. If the completed signal has not been input, the flow returns to step S201, in which the above-described processes are repeated. If the completed signal from the I/O port is confirmed in step S205, the flow advances to step S206 in which the PA taken out in step S203 is stored in the operation completed PA41, and the processing is thus completed.

[Description of PA starting process (FIG. 54)]

FIG. 54 is a flow chart which illustrates the PA starting processing in step S143 shown in FIG. 47, this processing being executed in the PA starter 21. This process is arranged such that the completed PA is stored in the completed PA43, the PA to be next started is stored in the execution PA table 45 and the starting PA43 so as to execute the PA on the basis of information in the operation completed PA41, the staring condition table 32, and the execution PA table 45.

First, in step S161, the operation completed PA41 is read. In step S162, all of the operation completed PAs in the starting condition table 32 whose name is the same as that of the thus-read PA is stored in the stack 1. Then, the flow advances to step S163 in which if the stack 1 is empty, the processing is completed here (END 1). On the other hand, if it is not empty, the flow advances to step S164 in which one record is taken out from the stack 1. Then, in step S165, condition PA data (see FIG. 49) pointed to by the condition pointer of the thus-taken out record is read until EOD data is read out, and all of the thus-read PA name is stored in the stack 2.

In step S166, it is determined whether or not the stack 2 is empty. If it is empty, the flow advances to step S169 in which the PA name of the operation completed PA item (see FIG. 49) of the thus-taken out is written in the completed PA42. Then, in step S170, the PA name of the starting PA item in the starting condition table taken out in step S164 is written in the execution PA table 45. In step S171, it is also written in the starting PA43. Then, in step S172, the starting signal output processing is executed, and thus the processing is executed (END 2).

On the other hand, in step S166, if the stack 2 is not empty, the flow advances to step S167 in which one condition PA name is taken out from the stack 2, and it is determined whether or not the thus-taken out PA is present in the execution PA table 45. If it is not present in the execution PA table, the flow returns to step S163 in which the above-described processing is repeated. In step S168, if PA is present, the flow returns to step S166 in which the above-described processing is repeated. However, END 1 and END 2 shown in FIG. 54 and expressing the completed processing are arranged to correspond to the PA starting processing in step S143 shown in FIG. 47.

[Description of the PA forcibly completed process (FIG. 55)]

FIG. 55 is a flow chart which illustrates the PA forcibly completed processing to be executed in the PA forcibly completed unit 22. In this processing, the transition of a certain device to the next operation is examined, and the PA to be forcibly completed is, on the basis of this forcibly completing condition, stored in the forcibly completed PA44 and the PA to be started next is stored in the execution PA table 45 and the starting PA43.

In step S181 and step S182, the completed PA42 and the starting PA43 are read. In step S183, all of the records whose completed PA item and the starting PA item (see FIG. 50) in the forcibly completed condition table 33 and which is the same as the thus-read PA, is stored in the stack 1. Then, in step S184, the stack 1 is examined. If the stack 1 is empty, the processing is completed here. On the other hand, if a fact that the stack 1 is not empty is detected in step S184, the flow advances to step S185 in which one record is taken out from the stack 1. Then, in step S186, all of condition PA data pointed to by the condition pointer item of the thus-taken out record is read until the EOD is read out so as to be stored in the stack 2.

In step S187, it is determined whether or not the stack 2 is empty. If it is empty, the flow advances to step S190 in which the PA name of the forcibly completed PA of the thus-taken out record is written in the forcibly completed PA44. In step S191, the PA name of the next starting PA item of the record taken out in step S191 is written in the execution PA table 45. In step S192, its PA name is written in the starting PA 43. In step S193, the forcibly signal output process is executed. Then, in step S194, the start signal output processing is executed, and the flow returns to step S194.

On the other hand, in step S187, if the stack 2 is not empty, the flow advances to step S188 in which one condition PA name is taken out from the stack 2. In step S189, it is determined whether or not the thus-taken out PA is present in the execution PA table 45. If it is not present, the flow returns to step S184 in which the above-described processing is repeated. However, if the PA is present, the flow returns to step S187 in which the above-described processes are repeated.

[Description of the forcibly signal output processing (FIG. 57)]

Figure 57:
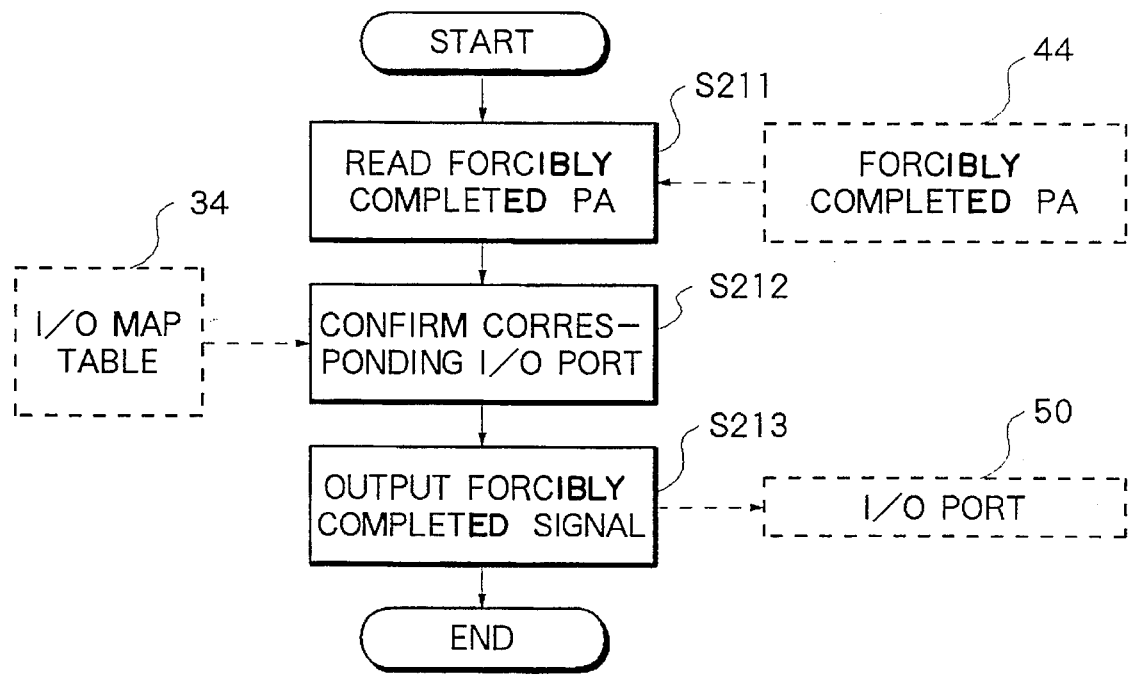
FIG. 57 is a flow chart which illustrates the processing for transmitting the forced stopping signal according to the third embodiment.

FIG. 57 is a flow chart which illustrates the forcibly signal output processing to be executed in the forcibly signal output unit 25. This processing is arranged to output, on the basis of the forcibly completed PA44 and the I/O map table 34, the forcibly completed signal from the I/O port 50 which corresponds to this PA to the peripheral equipment 60. In step S212, the I/O port which corresponds to the read PA is confirmed, and in step S213, the forcibly completed signal is output to the corresponding peripheral equipment 60.

[Description of the starting signal output processing (FIG. 58)]

Figure 58:
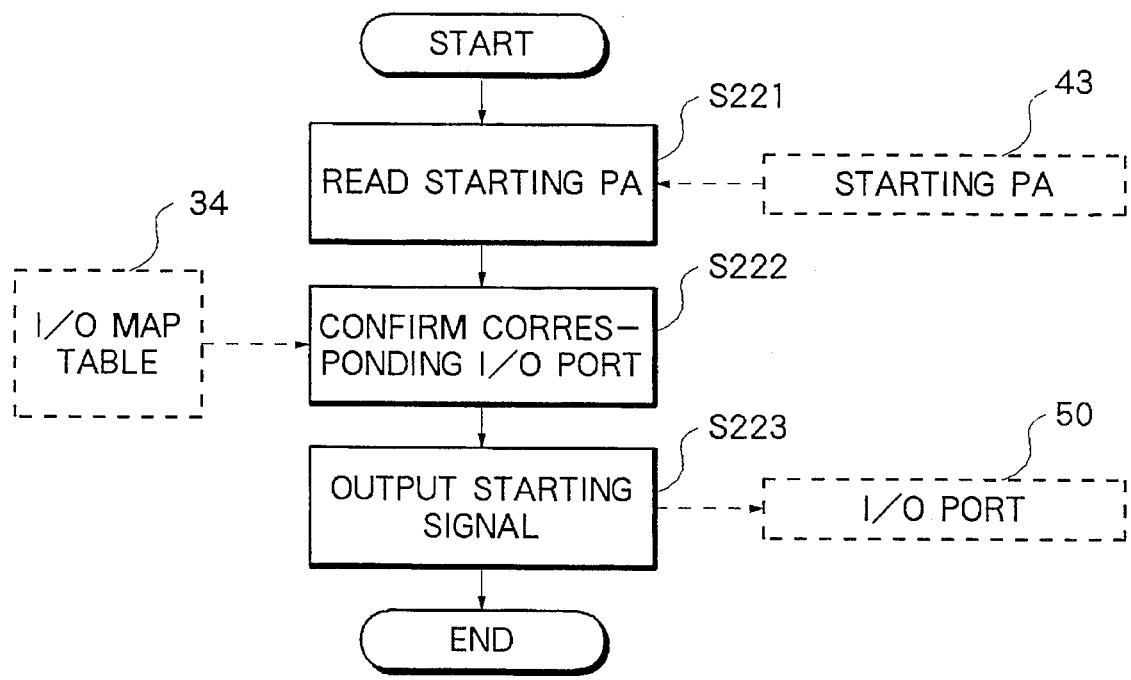
FIG. 58 is a flow chart which illustrates the processing for transmitting the starting signal according to the third embodiment.

FIG. 58 is flow chart which illustrates the starting signal output processing to be executed in the starting signal output unit 26, in which the starting signal is output from this PA to the peripheral equipment 60 through the I/O port 50 on the basis of information in the starting PA43 and I/O map table 34.

In step S221, the starting PA 43 is read, and in step S222, the corresponding I/O port 50 is confirmed with reference to the I/O map table 34 on the basis of the thus read PA. Then, in step S223, the starting signal is output from the I/O port 50 to the corresponding peripheral equipment 60.

As described above and according to this embodiment, since the operation of the subject system can be determined by converting information about the specifications of the same, the system can be operated simply by correctly describing the specifications.

Furthermore, since the amount of the software manufacturing process on the basis of the specifications for the system can be reduced, the manufacturing process and the manufacturing cost required to manufacture the system can be significantly reduced.

In addition, since the controlling operation can be changed simply by changing the specifications for the system, the maintenance capability of the system can be improved and a change in the functions can be readily performed.

[Description of a fourth embodiment]

Referring to block diagrams shown in FIGS. 14 and 59, a fourth embodiment of the present invention will be described. The components shown in FIG. 59 which are commonly employed in FIG. 45 are given the same reference numerals, and the description for the same are omitted here.

[Description of the structure of the system (FIG. 59)]

Figure 59:
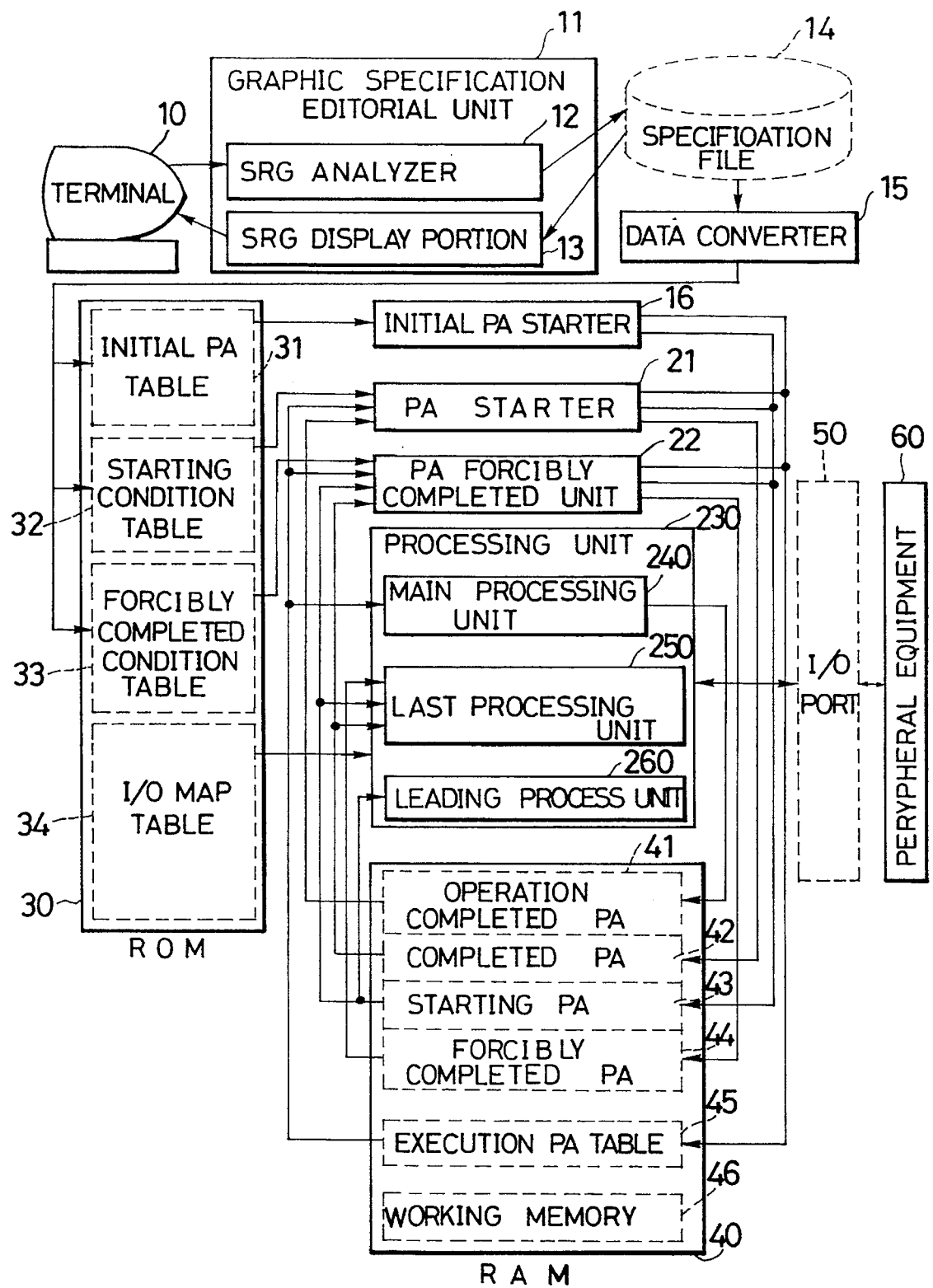
FIG. 59 is a flow chart which illustrates the schematic structure of a fourth embodiment.

FIG. 59 is a schematic structural view which illustrates an example of a system according to a fourth embodiment. A description will be provided about the portions which are different from those in FIG. 45.

Reference numeral 230 is a processing unit for controlling the PA operation in each of the devices. The processing unit 230 includes operation portions to be described later. That is, reference numeral 240 represents a major processing unit for successively executing the main processing of each of the devices on the basis of information in the execution PA table 45 and storing the PA whose main processing has been completed in the operation completed PA41. Reference numeral 250 represents a next processing unit for executing a next processing only a single time at the start of the operation of each of the devices on the basis of information in the completed PA42 or the forcibly completed PA44. Reference numeral 260 represents a preceding processing unit for executing a preceding processing only a single time at the start of the operation of each of the devices on the basis of information in the starting PA43 and the I/O map table 34. The above-described components are aided by a computer (of course it includes a computing unit, memories for processing, a control memory for storing processing procedures or the like and expressed by a flow chart to be described later, and an interface for supplying and receiving information). The above-described components are structured in such a manner that accessing the ROM region 30 or the RAM region 40 can be conducted as shown in FIG. 59.

[Description of the process performed in the processing unit (FIG. 67)]

Figure 67A:
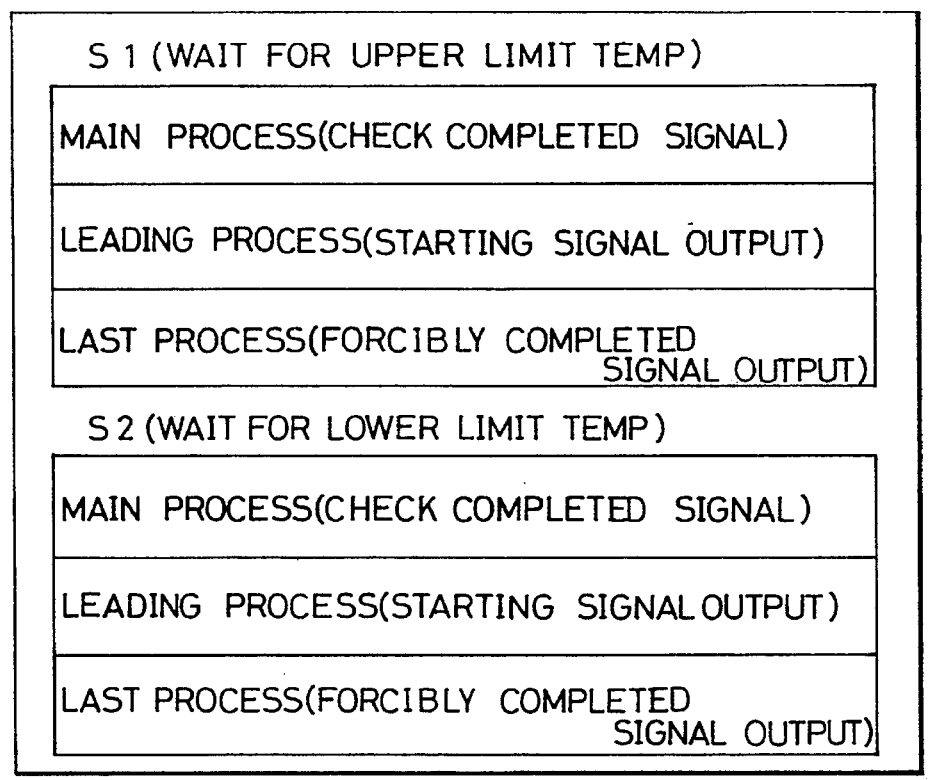
FIGS. 67A to 67C are views which illustrate the schematic examples of the processing procedure of each of the devices of the system shown in FIG. 59.
Figure 67B:
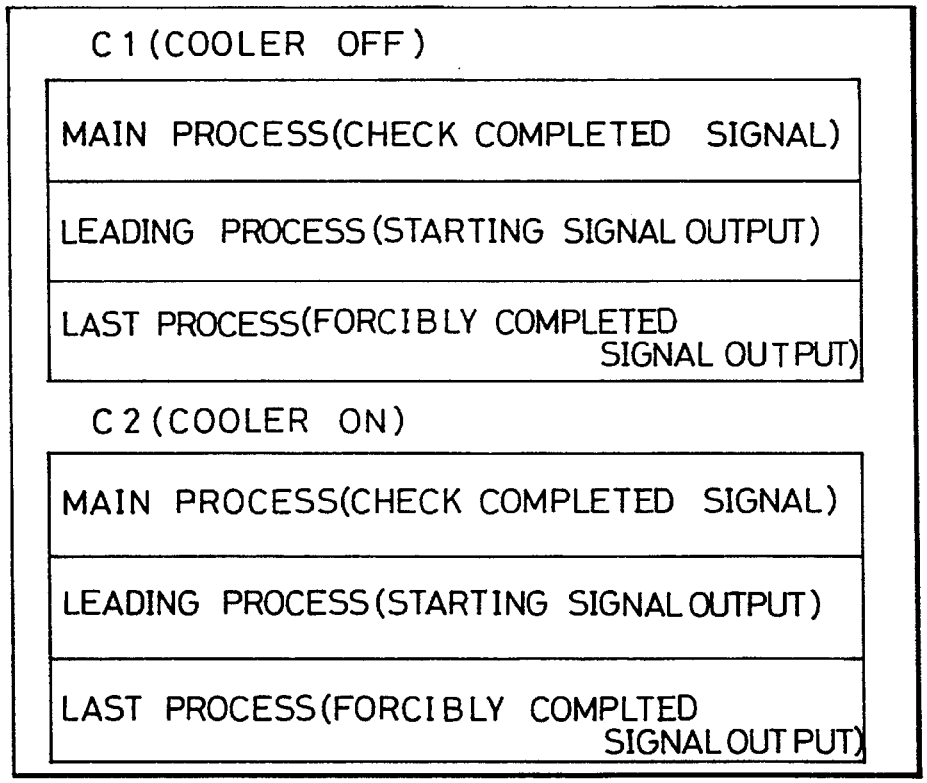
Figure 67C:
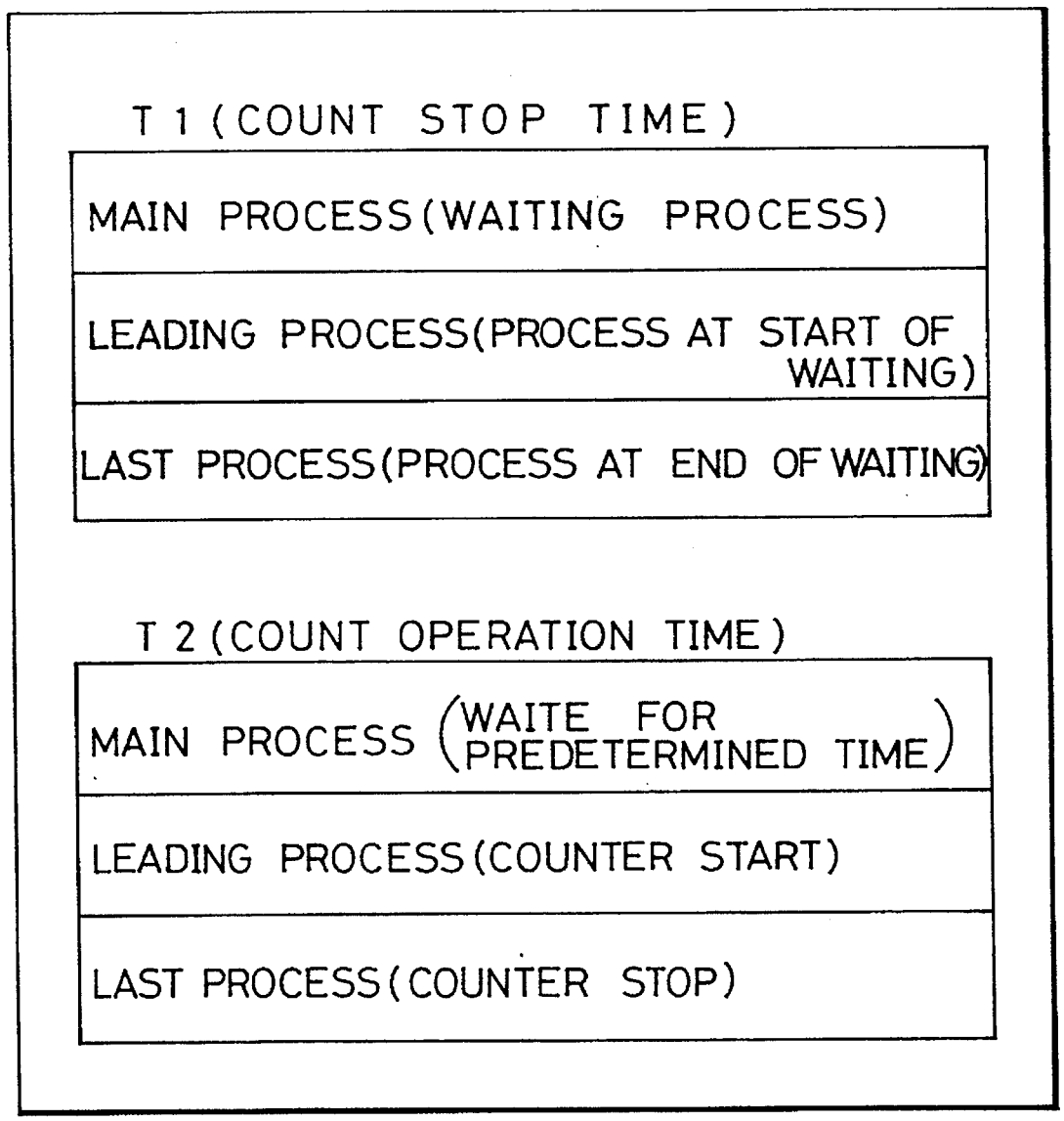

FIGS. 67A to 67C are views which illustrate an example of the processing procedures performed in the processing unit 230 in the system shown in FIG. 14A.

FIG. 67A is a view which illustrates the state of operation of the thermal sensor (a device 1) and which comprises a processing operation (a main processing) to be repeated to the upper-limit temperature waiting mode (S1) and the lower-limit temperature waiting mode (S2) respectively, a processing operation (a leading processing) to be executed a single time at the start of the operation, and a processing operation (a last processing) to be executed a single time at the completed of this operation. Similarly, FIG. 67B is a view which illustrates a state of the cooler (a device 2), and FIG. 67C is a view which illustrates a state of the operation of the software timer (a device 3).

[Description of the process operation (FIG. 60)]

Figure 60:
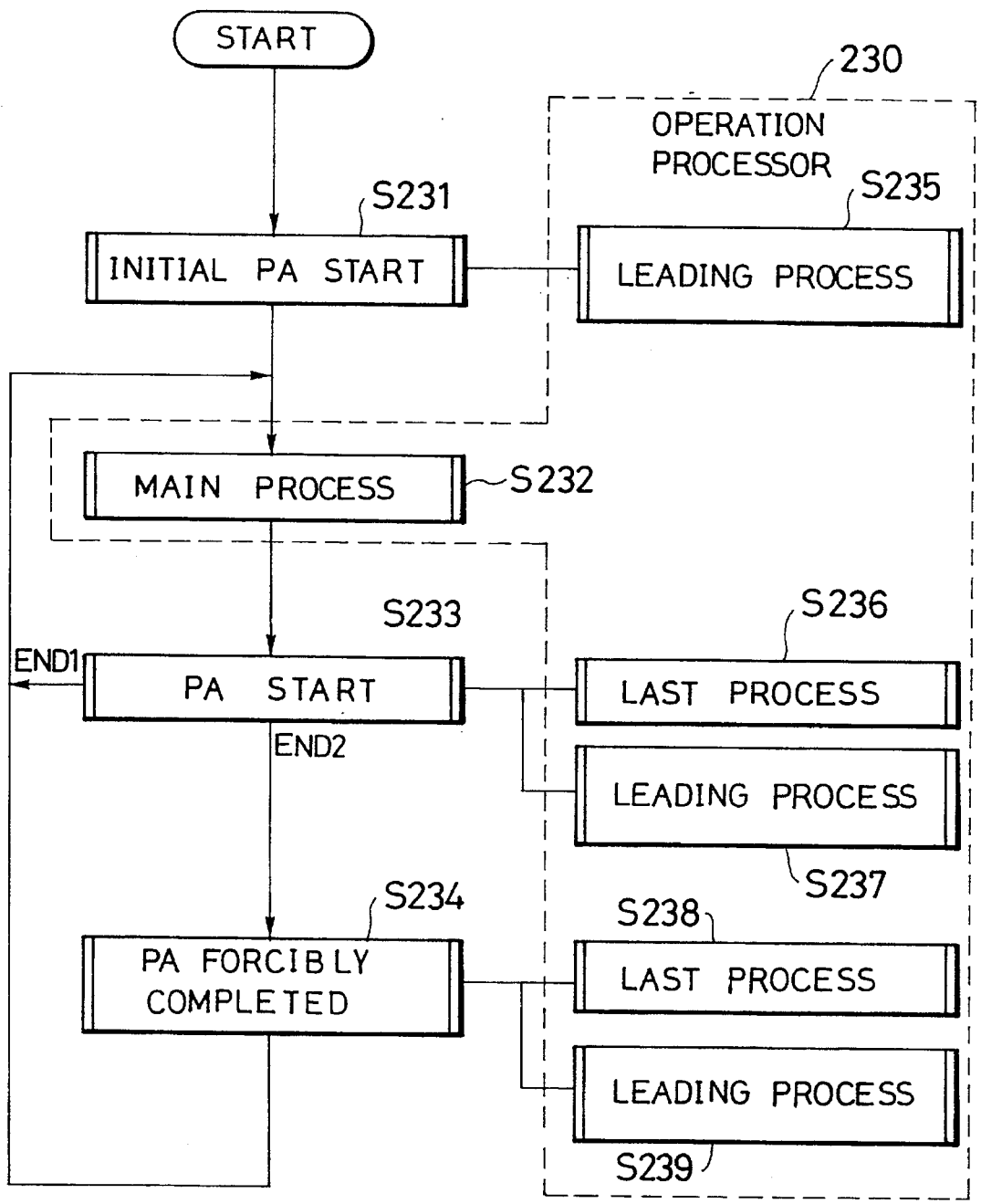
FIG. 60 is a flow chart which illustrates the flow of the operation in the system according to the fourth embodiment.

FIG. 60 is a flow chart which illustrates the processing procedure according to this embodiment. It is assumed that each of the tables of the ROM region 30 has been previously processed prior to start of this processing.

First, in step S231, the initial PA starter 16 starts the operation by writing the initial PA to be started first in all of the sequences in the execution PA table 45 and the starting PA43 on the basis of information in the initial PA table 31. This processing will be described later with reference to FIG. 61. In step S232, the main processings of the devices are successively executed on the basis of information in the execution PA table 45 and the PA name whose main processing has been completed is written in the operation completed PA 41. The detailed description of this processing operation will be provided later with reference to a flow chart shown in FIG. 64. In step S233, the completed PA is written in the completed PA 42, and the PA to be started next is written in the execution PA table 45 and the starting PA43 on the basis of information in the operation completed PA41, the starting condition table 32, and the execution PA table 45, so that the PA starting processing is conducted. This processing will be described later with reference to a flow chart shown in FIG. 62.

In the PA starting processing in step S233, if the next PA is not started (END 1), the flow returns to the main processing operation in step S232 in which the above-described processes are repeated. If the next PA is started (END 2), the flow advances to step S234 in which the forcibly completed processing is conducted, which is arranged such that the PA to be forcibly completed is written in the forcibly completed PA44 and the PA to be started next is written in the execution PA table 45 and the starting PA43 on the basis of information in the completed PA42, the starting PA43, the forcibly completed condition table 33, and the execution PA table 33. This processing operation will be described later with reference to a flow chart shown in FIG. 63. According to this step S234, the operations of the last processing and that of the leading processing are called.

[Description of the initial PA start processing (FIG. 61)]

Figure 61:
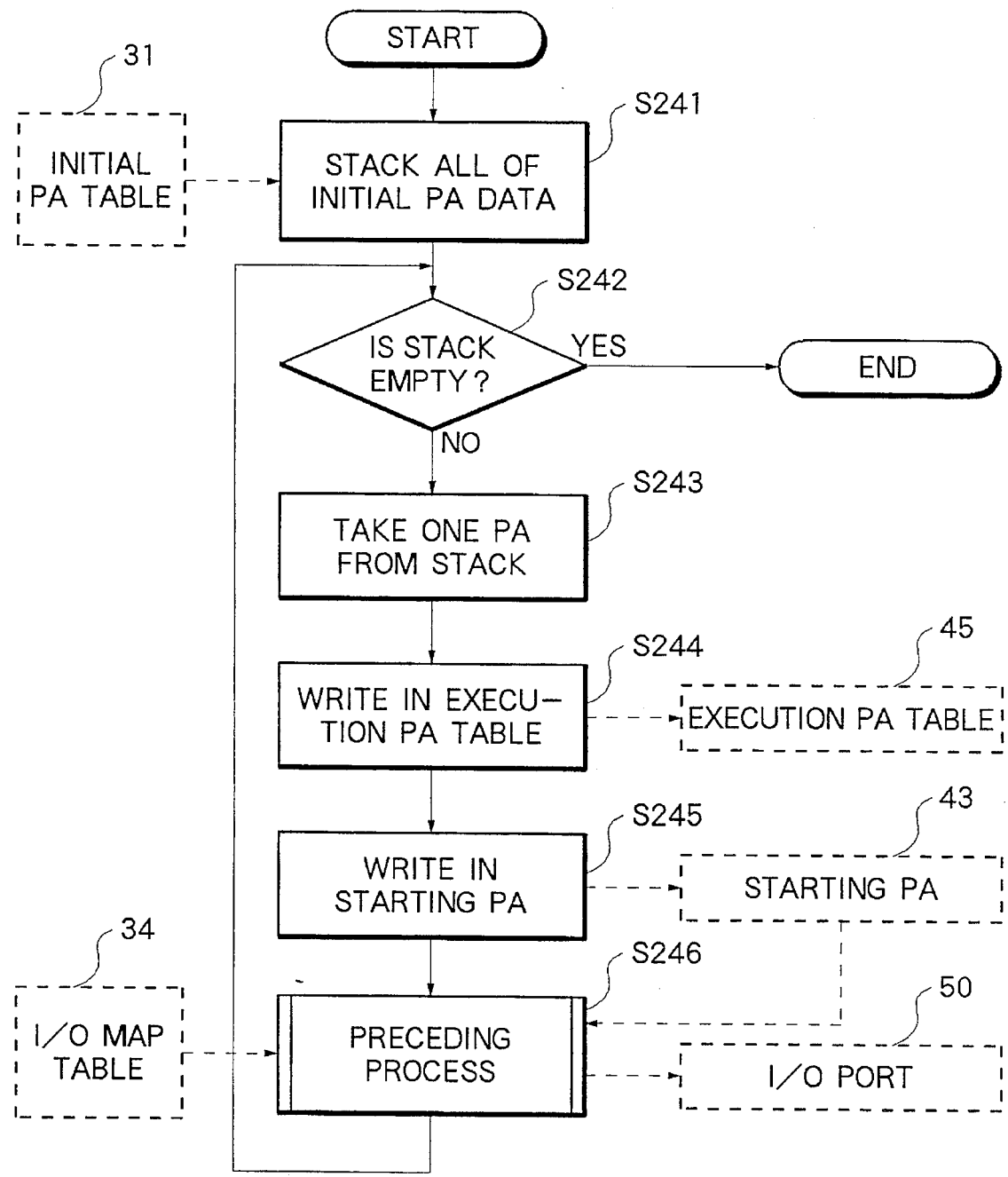
FIG. 61 is a flow chart which illustrate the initial PA starting operation according to the fourth embodiment.
Figure 66:
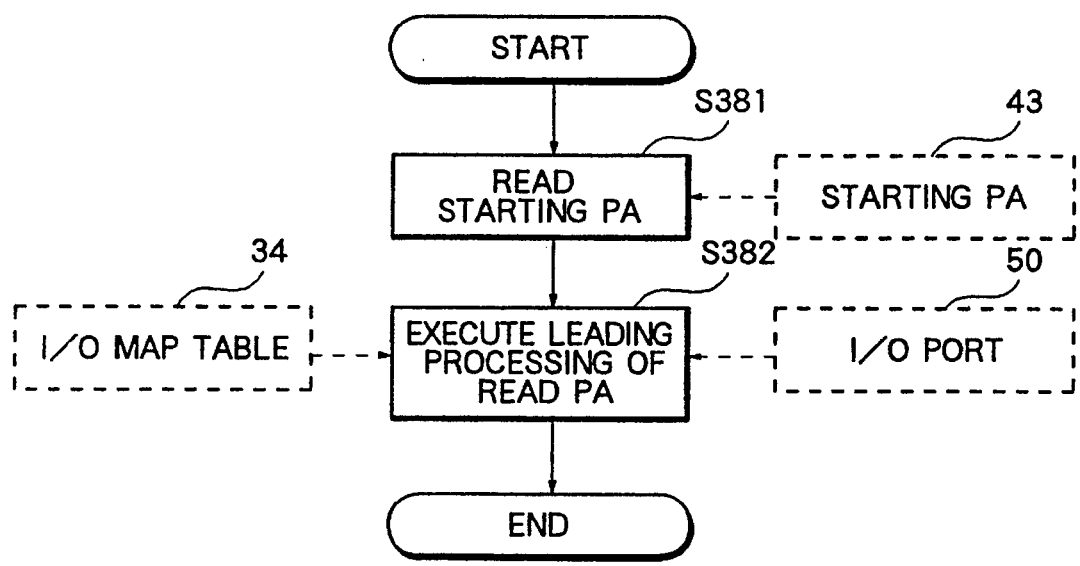
FIG. 66 is a flow chart which illustrates the leading processing operation according to the fourth embodiment.

FIG. 61 is a flow chart which illustrates in detail the processing in the initial starting PA processing in step S231 shown in FIG. 60. This processing is conducted in the initial PA starter 16. In comparison to the flow chart shown in FIG. 58, steps S241 to S245 correspond to steps S151 to S155 shown in FIG. 53. Therefore, a description of the above processes are omitted here. In step S246, the leading processing shown in the flow chart shown in FIG. 66 is conducted so that the execution of the written PA is conducted. Thus, the processings in steps S242 to S246 are repeated until the PAs stored in the stack are exhausted.

[Description of the main processing operation (FIG. 64)]

Figure 64:
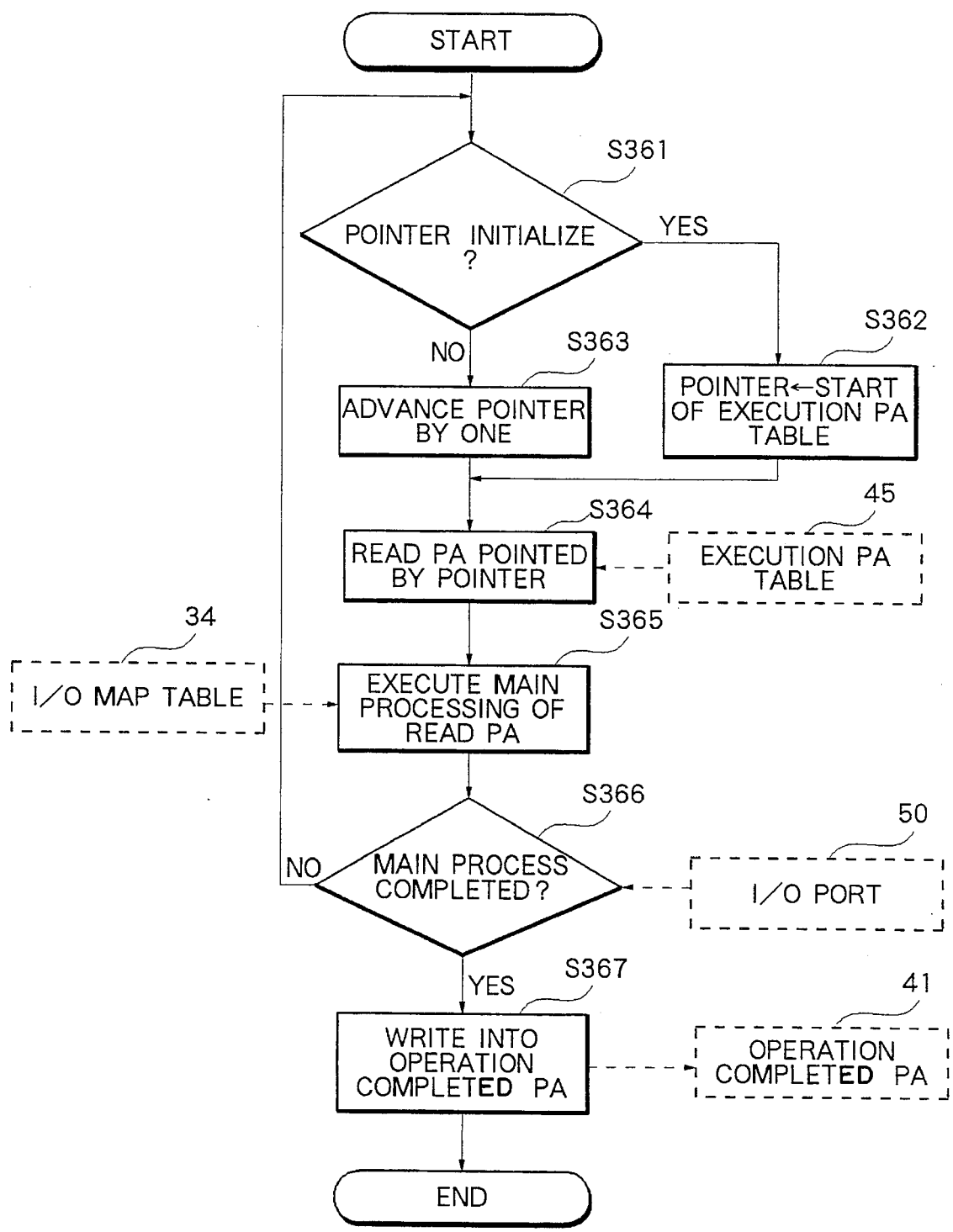
FIG. 64 is a flow chart which illustrates the main processing operation according to the fourth embodiment.

FIG. 64 is a flow chart which illustrates the main processing operation in step S232 shown in FIG. 60. This processing is conducted in the main processing unit 240. This processing is arranged such that the main processings of the devices (PA) are successively conducted, and the PA whose main processing has been completed is written in the operation completed PA41 on the basis of information in the execution PA table 45. Furthermore, on the basis of information in the I/O map table 34, the completed signal from the peripheral equipment 60 and to be written in the I/O port 50 is detected, and the PA which corresponds to the completed signal is written in the operation completed PA41 on the basis of information in the I/O map table 34.

In step S361, it is determined whether or not the initialization of the pointer is necessary. If it is not necessary, the flow advances to step S363 in which the pointer is raised by one point. If the initialization is necessary, the flow advances to step S362 in which the pointer is moved to the front portion of the execution PA table 45. In step S364, the PA pointed to by the pointer is read out from the execution PA table 45. In step S365, the processing of the PA is conducted. In this state, the peripheral equipment 60 can be, if necessary, controlled through the I/O port 50 with reference to the PA therein.

In step S366, it is determined whether or not the main processing (the completed signal from the I/O port 50 is included) has been completed. If it has not been completed, the flow returns to step S361. If it has been completed, the flow advances to step S367. In step S367, the PA which has been thus-read is written in the operation completed PA41, and thus the processing is completed. If a fact that the processing has been completed is determined in step S366, the value pointed by the pointer is arranged to be retained until the main processing is again conducted in the main processing unit 24.

[Description of the PA starting processing (FIG. 62)]

FIG. 62 is a flow chart which illustrates the PA starting processing shown in step S233. This processing is conducted in the PA starting unit 21. This processing is arranged such that the completed PA is stored in the completed PA 42, and the PA to be started next in the execution PA table 45 and the starting PA43 on the basis of information in the operation completed PA41, the starting condition table 32, and the execution PA table 45.

Since steps S321 to S331 shown in FIG. 62 are the same as step S161 to S171 shown in FIG. 54, a description of these steps is omitted here.

Figure 65:
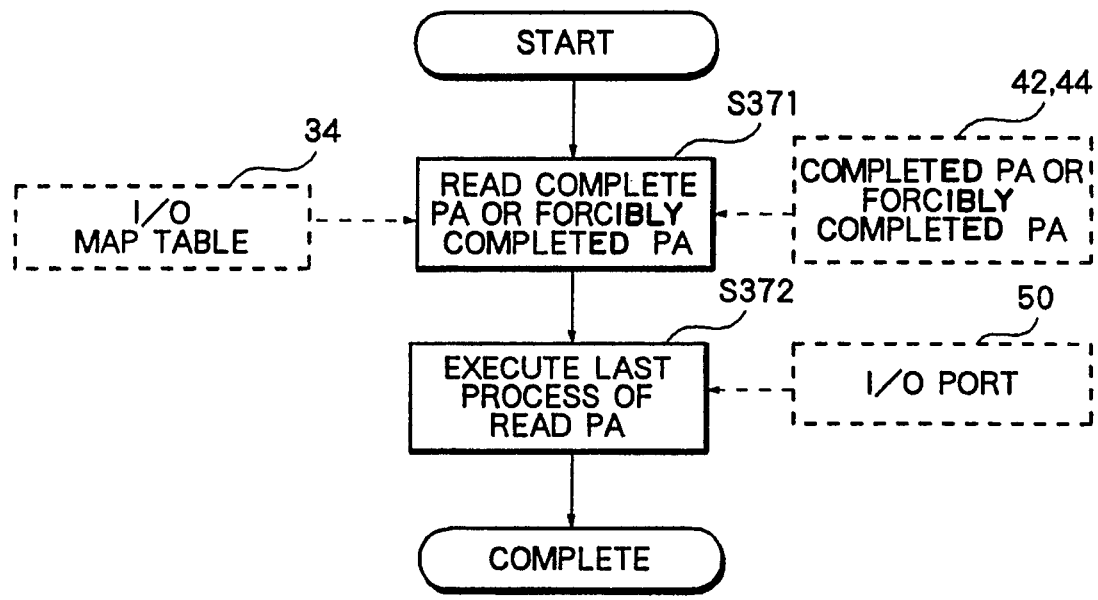
FIG. 65 is a flow chart which illustrates the last processing operation according to the fourth embodiment.

In step S332, the last processing operation shown in the flow chart shown in FIG. 65 is executed. In step S333, the leading processing shown in FIG. 66 is executed, and thus the processing is completed (END 2).

[Description of PA forcibly completed process (FIG. 63)]

FIG. 63 is a flow chart which illustrates the PA forcibly completed processing to be executed in the PA forcibly completed unit 22 and shown in step S234 in the flow chart shown in FIG. 60. This processing is arranged such that a transition of a certain device to the next operation is examined, and, on the basis of the forcibly completed condition for the above transition the PA to be forcibly completed is stored in the forcibly completed PA44 and the PA to be started next is stored in the execution PA table 45 and the starting PA43. Since steps S341 to S352 in this processing flow chart correspond to steps S181 to S192 in the flow chart shown in FIG. 55, a description about these steps is omitted here.

In step S353, the last processing operation shown in FIG. 65 is conducted, and in step S354, the leading processing operation shown in FIG. 66 is conducted, and the flow returns to step S344.

[Description of the last processing operation (FIG. 65)]

FIG. 65 is a flow chart which illustrates the last processing operation to be executed in the last processing unit 250. This processing is arranged such that the transition of a certain device to the next operation is examined, and, on the basis of the forcibly completed condition for this, the PA to be forcibly completed is stored in the forcibly completed PA44 and the PA to be started next is stored in the execution PA table 45 and the starting PA43. In this processing flow chart, since steps S341 to S352 correspond to steps S181 to steps S192 in the flow chart shown in FIG. 55, a description of these steps is omitted here.

In step S353, the last processing operation shown in FIG. 65 is executed, and in step S354, the leading processing operation shown in FIG. 66 is executed, and the flow returns to step S345.

[Description of the last processing operation (FIG. 65)]

FIG. 65 is a flow chart which illustrates the last processing operation to be executed in the last processing operation portion 250. This processing is arranged such that the last processing operation is conducted solely at the completed time of the operation of each of the devices on the basis of information in the completed PA42 or the forcibly completed PA44. According to this processing, the peripheral equipment 60 can be forcibly completed through the I/O port 50 which corresponds to the PA for this on the basis of information in the forcibly completed PA44 and the I/O map table 34.

In step S371, either the completed PA42 or the forcibly completed PA44 is read. In step S372, the last processing for the read PA is conducted. At this time, data in the I/O map table 34 is referred to, and the last processing for the peripheral equipment 60 which corresponds to this PA can be conducted.

[Description of the leading processing (FIG. 66)]

FIG. 66 is a flow chart which illustrates the leading processing operation to be executed in the leading processing unit 260. According to this flow chart, the leading processing is to be conducted solely at the start of operation of each of the devices on the basis of information in the starting PA43 in the RAM region 40 and the I/O map table 34.

In step S381, the starting PA43 in the RAM region 40 is read, and in step S382, the leading processing of a PA which corresponds to the read PA is conducted. At this time, the leading processing for the peripheral equipment 60 can be conducted by outputting a starting signal from the I/O port 50 to the peripheral equipment 60.

As described above, and according to this embodiment, the processing operation of a sole device and software can be standardized, and, on the thus-standardized system specifications, the software can be efficiently processed.

Furthermore, since the devices or modules thus processed by the notation method above can be used again as a portion of the component of the other system, the production yield of the system can be improved and the product quality can be improved.

In addition, when software is processed, the synchronization between the devices or the basic operation can be clarified. Therefore, debugging or modification of the software can be readily conducted.

As many apparently widely different embodiments of the present invention can be made without departing from the spirit and the scope of thereof, it is to be understood that the invention is not limited to the specific embodiments thereof except as defined in the appended claims.

What is claimed is:

1. A system operation predicting apparatus capable of predicting the operation of a system in which a plurality of individual processing elements are operated in parallel, said system operation predicting apparatus comprising:

input means for inputting element information about all operating states generated in each of the processing elements, all transitions occurring between the operating states, and restrictions on the transitions imposed by operating states or transitions in other processing elements in a graphic language;

element information storage means for storing the element information inputted by said input means;

present system state storage means for storing a combination of present states in each of the processing elements;

next system state candidate generating means for generating all combinations of a next state in at least one of the processing elements and the present state in the other processing elements on the basis of the present system state and information on the transitions stored in said element information storage means, as next system state candidates;

determination means for determining, for each next system state candidate, whether a system transition between the present system state and the next system state candidate is permitted with respect to the transition in the processing element contained in the system transition on the basis of information on restrictions stored in said element information storage means;

system state information storage means for storing the system transition determined to be permitted and the next system state corresponding thereto;

control means for updating the present system state stored in said present system state storage means by the next system state and controlling said next system state candidate generating means to generate a new next system state candidate on the basis of the updated present system state; and preparing means for preparing a states diagram illustrating the system states and the transitions stored in said system state information storage means.

2. A system operation predicting apparatus according to claim 1, wherein the restrictions on the transitions comprise a restriction according to a state or a transition in one of the other processing elements required for the execution of the transitions.

3. A system operation predicting apparatus according to claim 1, wherein the restrictions on the transitions comprise transitions in the other processing elements forcing the execution of the transitions.

4. A system operation predicting apparatus capable of predicting the operation of a system in which a plurality of individual processing elements are operated in parallel, said system operation predicting apparatus comprising:

input means for inputting element information about all operating states generated in each of the processing elements, all transitions occurring between the operating states, and restrictions on the transitions imposed by operating states or transitions in other processing elements in a graphic language;

element information storage means for storing the information inputted by said input means;

present system state storage means for storing a combination of present states in each of the processing elements;

next system state candidate generating means for generating all combinations of a next state in at least one of the processing elements and the present state in the other processing elements on the basis of the present system state and information on the transitions stored in said element information storage means, as next system state candidates;

determination means for determining, for each next system state candidate, whether a system transition between the present system state and the next system state candidate is permitted with respect to the transition in the processing element contained in the system transition on the basis of information on restrictions stored in said element information storage means;

system state information storage means for storing the system transition determined to be permitted and the next system state corresponding thereto;

control means for updating the present system state stored in said present system state storage means by the next system state and controlling said next system state candidate generating means to generate a new next system state candidate on the basis of the updated present system state;

graphic information originating means for originating graphic information indicating coordinates for the system states and the transitions stored in said system state information storage means; and chart originating means for originating and outputting a tree structure chart on the basis of the graphic information.

5. A system operation predicting apparatus according to claim 4, wherein the restrictions on the transitions comprise a restriction according to a state or a transition in one of the other processing elements required for the execution of the transitions.

6. A system operation prediction apparatus according to claim 4, wherein the restrictions on the transitions comprise transitions in the other processing elements forcing the execution of the transitions.

7. A system operation predicting apparatus capable of predicting the operation of a system in which a plurality of individual processing elements are operated in parallel, said system operation predicting apparatus comprising:

input means for inputting element information about all operating states generated in each of the processing elements, all transitions occurring between the operating states, and restrictions on the transitions imposed by operating states or transitions in other processing elements in a graphic language;

element information storage means for storing the information inputted by said input means;

present system state storage means for storing a combination of present states in each of the processing elements;

next system state candidate generating means for generating all combinations of a next state in at least one of the processing elements and the present state in the other processing elements on the basis of the present system state and information on the transitions stored in said element information storage means, as next system state candidates;

determination means for determining, for each next system state candidate, whether a system transition between the present system state and the next system state candidate is permitted with respect to the transition in the processing element contained in the system transition on the basis of information on restrictions stored in said element information storage means;

system state information storage means for storing the system transition determined to be permitted and the next system state corresponding thereto;

control means for updating the present system state stored in said present system state storage means by the next system state and controlling said next system state candidate generating means to generate a new next system state candidate on the basis of the updated present system state;

composing means for composing all combinations of the operating states generated in each of the processing elements on the basis of the information stored in said storage means; and discriminating means for discriminating whether each of the combinations composed by said composing means is effective in the system on the basis of system states stored in said system state information storage means.

8. A system operation predicting apparatus according to claim 7, wherein the restrictions on the transitions comprise a restriction according to a state or a transition in one of the other processing elements required for the execution of the transitions.

9. A system operation predicting apparatus according to claim 7, wherein the restrictions on the transitions comprise transitions in the other processing elements forcing the executing of the transitions.

10. A system operation predicting apparatus capable of predicting the operation of a system in which a plurality of individual processing elements are operated in parallel, said system operation predicting apparatus comprising:

input means for inputting element information about all operating states generated in each of the processing elements, all transitions occurring between the operating states, and restrictions on the transitions imposed by operating states or transitions in other processing elements in a graphic language;

element information storage means for storing the element information inputted by said input means;

present system state storage means for storing a combination of present states in each of the processing elements;

next system state candidate generating means for generating all combinations of a next state in at least one of the processing elements and the present state in the other processing elements on the basis of the present system state and information on the transitions stored in said element information storage means, as next system state candidates;

determination means for determining, for each next system state candidate, whether a system transition between the present system state and the next system state candidate is permitted with respect to the transition in the processing element contained in the system transition on the basis of information on restrictions stored in said element information storage means;

system state information storage means for storing the system transition determined to be permitted and the next system state corresponding thereto;

control means for updating the present system state stored in said present system state storage means by the next system state and controlling said next system state candidate generating means to generate a new next system state candidate on the basis of the updated present system state;

designating means for designating one of the operating states;

discriminating means for discriminating the combinations containing the operating states designated by said designating means among the system states stored in said system state information storage means; and preparing means for preparing a states diagram illustrating the combinations discriminated by said discriminating means and the transitions stored in said system state information storage means.

11. A system operation predicting apparatus according to claim 10, wherein the restrictions on the transitions comprise a restriction according to a state or a transition in one of the other processing elements required for the execution of the transitions.

12. A system operation predicting apparatus according to claim 10, wherein the restrictions on the transitions comprise transitions in the other processing elements forcing the executing of the transitions.

13. A system operation predicting apparatus capable of predicting the operation of a system in which a plurality of individual processing elements are operated in parallel, said system operation predicting apparatus comprising:

input means for inputting element information about all operating states generated in each of the processing elements, all transitions occurring between the operating states, and restrictions on the transitions imposed by operating states or transitions in other processing elements in a graphic language;

element information storage means for storing the element information inputted by said input means;

present system state storage means for storing a combination of present states in each of the processing elements;

next system state candidate generating means for generating all combinations of a next state in at least one of the processing elements and the present state in the other processing elements on the basis of the present system state and information on the transitions stored in said element information storage means, as next system state candidates;

determination means for determining, for each next system state candidate, whether a system transition between the present system state and the next system state candidate is permitted with respect to the transition in the processing element contained in the system transition on the basis of information on restrictions stored in said element information storage means;

system state information storage means for storing the system transition determined to be permitted and the next system state corresponding thereto;

control means for updating the present system state stored in said present system state storage means by the next system state and controlling said next system state candidate generating means to generate a new next system state candidate on the basis of the updated present system state; and discriminating means for discriminating a combination producing a deadlock from the system state stored in said system state information storage means.

14. A system operation predicting apparatus according to claim 13, wherein said discriminating means is arranged to determine a certain combination producing a deadlock when none of the operating states of the combination satisfy conditions required for the operating states of the combination to effect a transition to other operating states.

15. A system operation predicting apparatus according to claim 13 further comprising originating means for originating and displaying a tree structure chart which illustrates a flow of the combinations on the basis of the information stored in said storage means, on the tree structure chart, the combination producing a deadlock being distinguishably displayed with respect to the other combinations.

16. A system operation predicting apparatus according to claim 13, wherein the restrictions on the transitions comprise a restriction according to a state or a transition in one of the other processing elements required for the execution of the transitions.

17. A system operation predicting apparatus according to claim 13, wherein the restrictions on the transitions comprises transitions in the other processing elements forcing the executing of the transitions.

18. A system operation predicting method of predicting the operation of a system in which a plurality of individual processing elements are operated in parallel, said system operation predicting method comprising the steps of:

inputting element information about all operating states generated in each of the processing elements, all transitions occurring between the operation states, and restrictions on the transitions imposed by operating states or transitions in other processing elements in a graphic language;

storing the element information;

storing a combination of present states in each of the processing elements;

generating all combinations of a next state in at least one of the processing elements and the present state in the other processing elements on the basis of the present system state and the element information on the transitions, as next system state candidates;

determining, for each next system state candidate, whether a system transition between the present system state and then next system state candidate is permitted with respect to the transition in the processing element contained in the system transition on the basis of the element information on restrictions;

storing the system transition determined to be permitted and the next system state corresponding thereto;

updating the stored present system state by the next system state and generating a new next system state candidate on the basis of the updated present system state; and preparing a states diagram illustrating the system states and the transitions.

19. A system operation predicting method of predicting the operation of a system in which a plurality of individual processing elements are operated in parallel, said system operation predicting method comprising the steps of:

inputting element information about all operating states, generated in each of the processing elements, all transitions occurring between the operating states, and restrictions on the transitions imposed by operating states or transitions in other processing elements in a graphic language;

storing the element information;

storing a combination of present states in each of the processing elements;

generating all combinations of a next state in at least one of the processing elements and the present state in the other processing elements on the basis of the present system state and the elements information on the transitions, as next system state candidates;

determining, for each next system state candidate, whether a system transition between the present system state and then next system state candidate is permitted with respect to the transition in the processing element contained in the system transition on the basis of the element information on restrictions;

storing the system transition determined to be permitted and the next system state corresponding thereto;

updating the stored present system state by the next system state and generating a new next system state candidate on the basis of the updated present system state;

originating graphic information indicating coordinates for the system state and transitions; and originating and outputting a tree structure chart on the basis of the graphic information.

20. A system operation predicting method of predicting the operation of a system in which a plurality of individual processing elements are operated in parallel, said system operation predicting method comprising the steps of:

inputting element information about all operating states generated in each of the processing elements, all transitions occurring between the operating states, and restrictions on the transitions imposed by operating states or transitions in other processing elements in a graphic language;

storing the element information;

storing a combination of present states in each of the processing elements;

generating all combinations of a next state in at least one of the processing elements and the present state in the other processing elements on the basis of the present system state and the element information on the transitions, as next system state candidates;

determining, for each next system state candidate, whether a system transition between the present system state and then next system state candidate is permitted with respect to the transition in the processing element contained in the system transition on the basis of the element information on restrictions;

storing the system transition determined to be permitted and the next system state corresponding thereto;

updating the stored present system state by the next system state and generating a new next system state candidate on the basis of the updated present system state;

composing all combinations of operating states generated in each of the processing elements on the basis of the stored element information; and discriminating whether each of the combinations composed is effective in the system on the basis of the stored system states.

21. A system operation predicting method of predicting the operation of a system in which a plurality of individual processing elements are operated in parallel, said system operation predicting method comprising the steps of:

inputting element information about all operating states generated in each of the processing elements, all transitions occurring between the operating states, and restrictions on the transitions imposed by operating states or transitions in other processing elements;

storing the element information;

storing a combination of present states in each of the processing elements;

generating all combinations of a next state in at least one of the processing elements and the present state in the other processing elements on the basis of the present system state and the element information on the transitions, as next system state candidates;

determining, for each next system state candidate, whether a system transition between the present system state and then next system state candidate is permitted with respect to the transition in the processing element contained in the system transition on the basis of the element information on restrictions;

storing the system transition determined to be permitted and the next system state corresponding thereto;

updating the stored present system state by the next system state and generating a new next system state candidate on the basis of the updated present system state;

designating one of the operating states;

discriminating the combinations containing the designated operating states among the stored system states; and preparing a states diagram illustrating combinations distinguished from other combinations and the transitions.

22. A system operation predicting method of predicting the operation of a system in which a plurality of individual processing elements are operated in parallel, said system operation predicting method comprising the steps of:

inputting element information about all operating states generated in each of the processing elements, all transitions occurring between the operating states, and restrictions on the transitions imposed by operating states or transitions in other processing elements in a graphic language;

storing the element information;

storing a combination of present states in each of the processing elements;

generating all combinations of a next state in at least one of the processing elements and the present state in the other processing elements on the basis of the present system state and the element information on the transitions, as next system state candidates;

determining, for each next system state candidate, whether a system transition between the present system state and then next system state candidate is permitted with respect to the transition in the processing element contained in the system transition on the basis of the element information on restrictions;

storing the system transition determined to be permitted and the next system state corresponding thereto;

updating the stored present system state by the next system state and generating a new next system state candidate on the basis of the updated present system state; and discriminating a combination producing a deadlock from the stored system state.

* * * * *

UNITED STATES PATENT AND TRADEMARK OFFICE
CERTIFICATE OF CORRECTION

PATENT NO. : 5,584,019
DATED : December 10, 1996
INVENTOR(S) : KAZUSHIGE KIKUCHI, ET AL.

It is certified that error appears in the above-indentified patent and that said Letters Patent is hereby corrected as shown below:

ON THE COVER PAGE

[56] References Cited:

U.S. PATENT DOCUMENTS

"4,914,567   3/1990   Lipkis et al." should read
--4,914,567  4/1990   Lipkis et al.--.

IN THE DRAWINGS:

SHEET 47, FIGURE 41A

"ROINTS" should read --POINTS--.

SHEET 51, FIGURE 43B

"ENPTY" should read --EMPTY--.

SHEET 54, FIGURE 45

"CONDITITION" should read --CONDITION--.
"PERYPHERAL" should read --PERIPHERAL--.

SHEET 55, FIGURE 46

"PERYPHERAL" should read --PERIPHERAL--.

UNITED STATES PATENT AND TRADEMARK OFFICE
CERTIFICATE OF CORRECTION

PATENT NO. : 5,584,019

DATED : December 10, 1996

INVENTOR(S) : KAZUSHIGE KIKUCHI, ET AL.

It is certified that error appears in the above-indentified patent and that said Letters Patent is hereby corrected as shown below:

SHEET 59, FIGURE 49B

"UNCONDITIONARY" (all occurrences) should read --UNCONDITIONAL--.

SHEET 69, FIGURE 59

"SPECIFIOATION" should read --SPECIFICATION--.

SHEET 75, FIGURE 63B

"EXECUTIN" should read --EXECUTION--.

SHEET 79, FIGURE 67C

"WAITE" should read --WAIT--.

COLUMN 4:

Line 30, "plural" should read --plurality--.
Line 49, "FIG. 20A" should read --FIGS. 20A--.
Line 55, "FIGS. 21C" should read --FIG. 21C--.
Line 59, "FIG. 23A" should read --FIGS. 23A--.
Line 64, "illustrate" should read --illustrates--.

UNITED STATES PATENT AND TRADEMARK OFFICE
CERTIFICATE OF CORRECTION

PATENT NO. : 5,584,019

DATED : December 10, 1996

INVENTOR(S) : KAZUSHIGE KIKUCHI, ET AL.

Figure 41A:
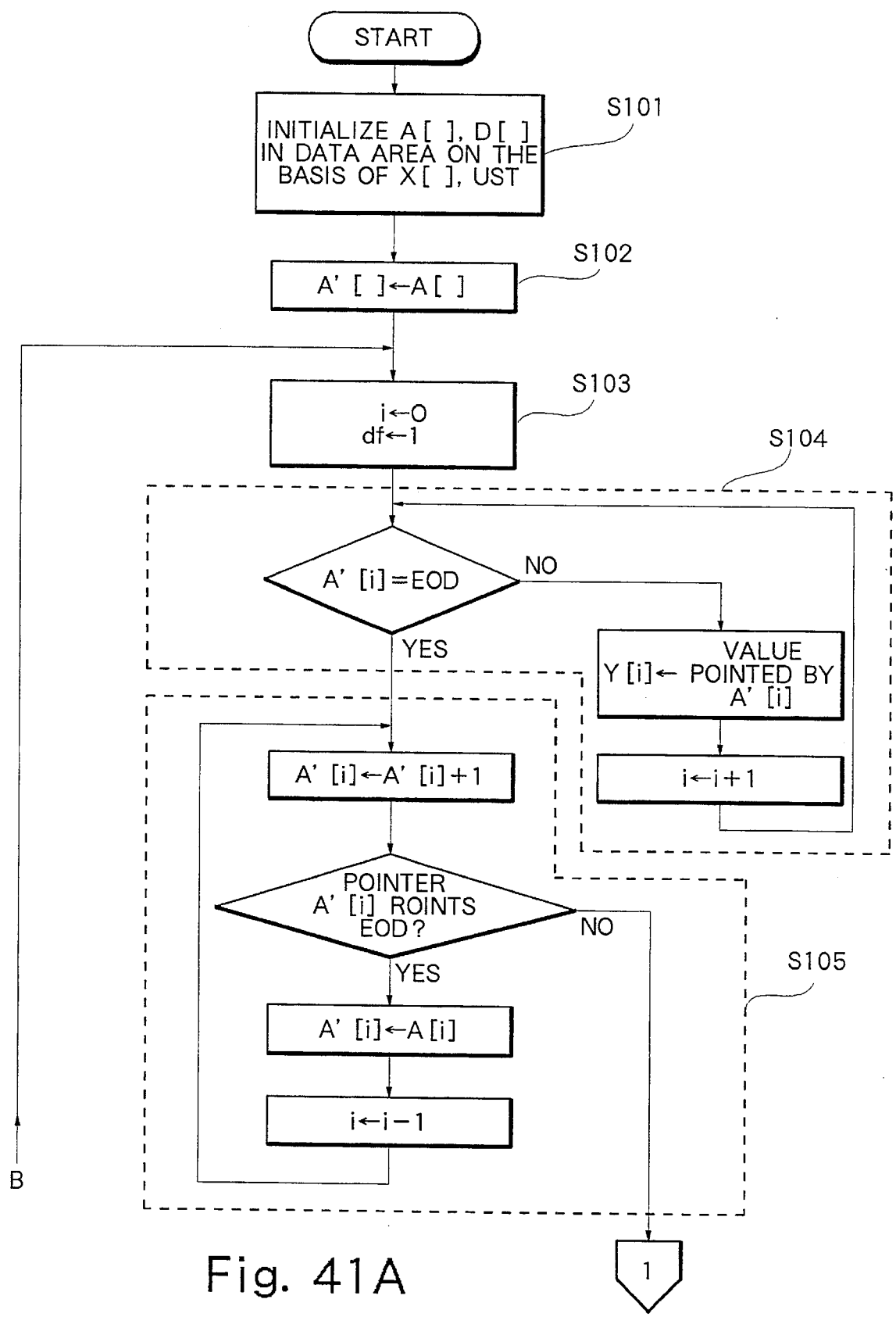
FIG. 41A and 41B a flow chart which illustrates the detailed operation of the process A shown in FIG. 34.
Figure 41B:
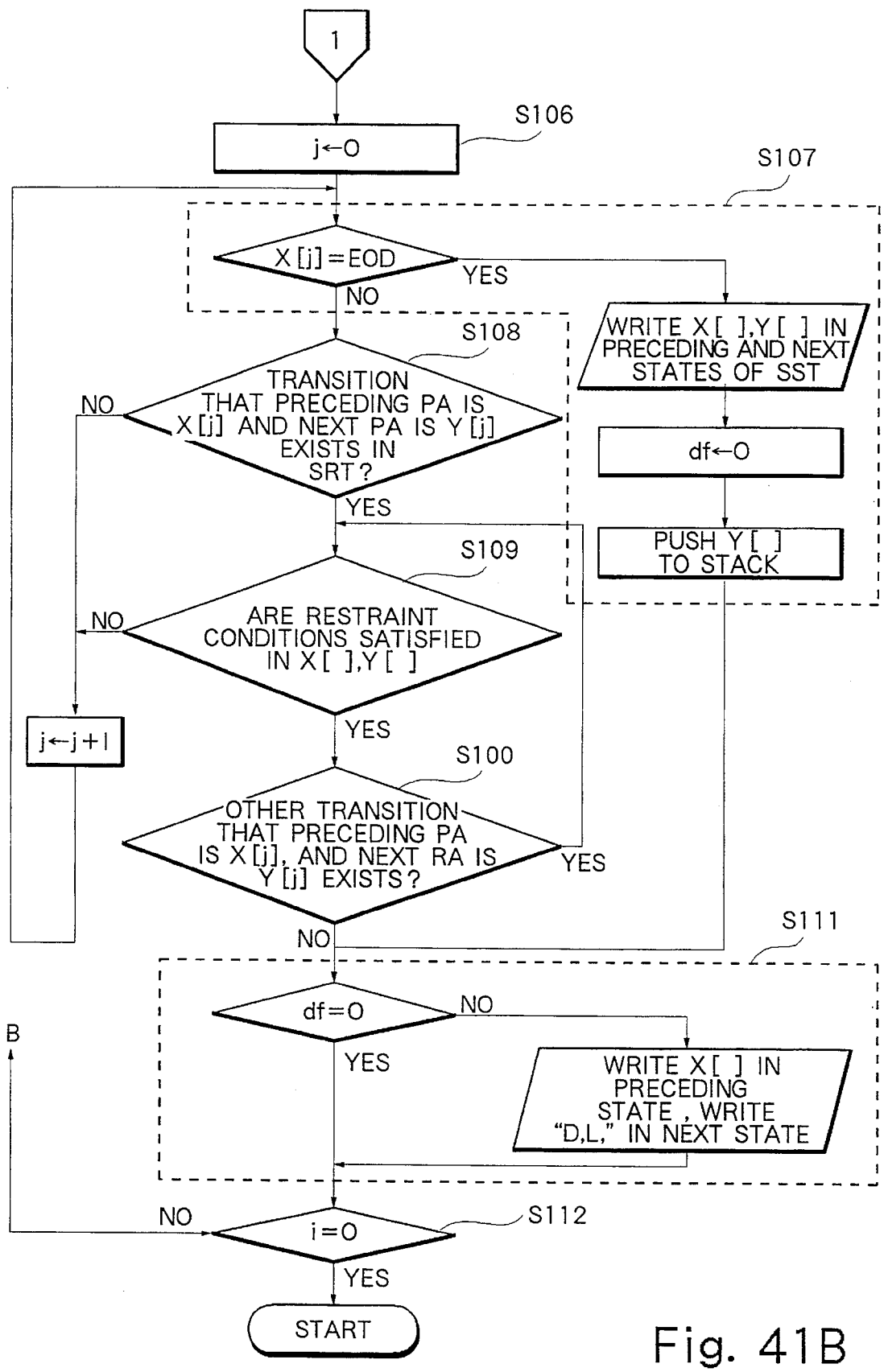
Figure 54A:
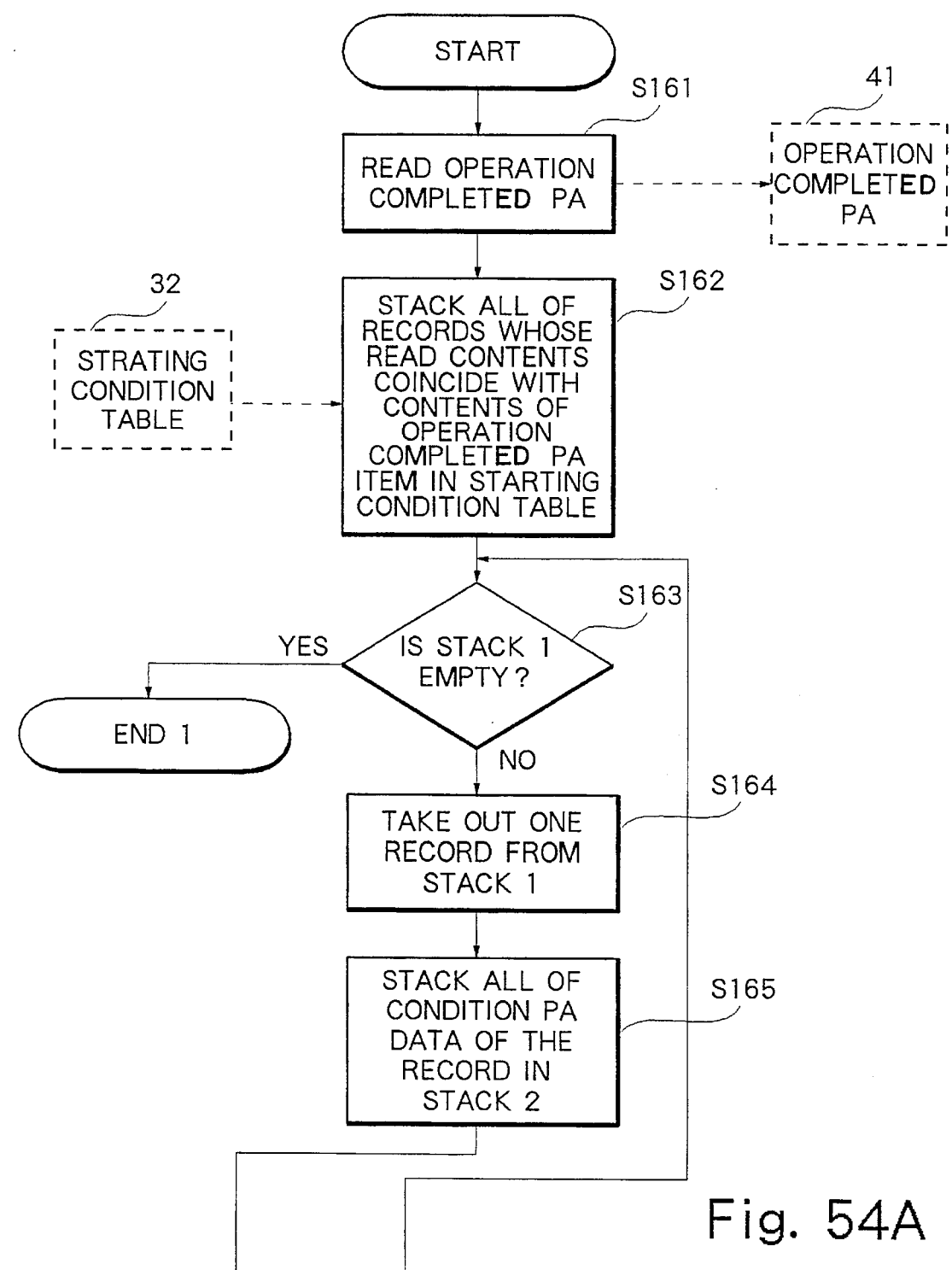
FIG. 54A and 55B are a flow chart which illustrates the PA starting processing according to the third embodiment.
Figure 54B:
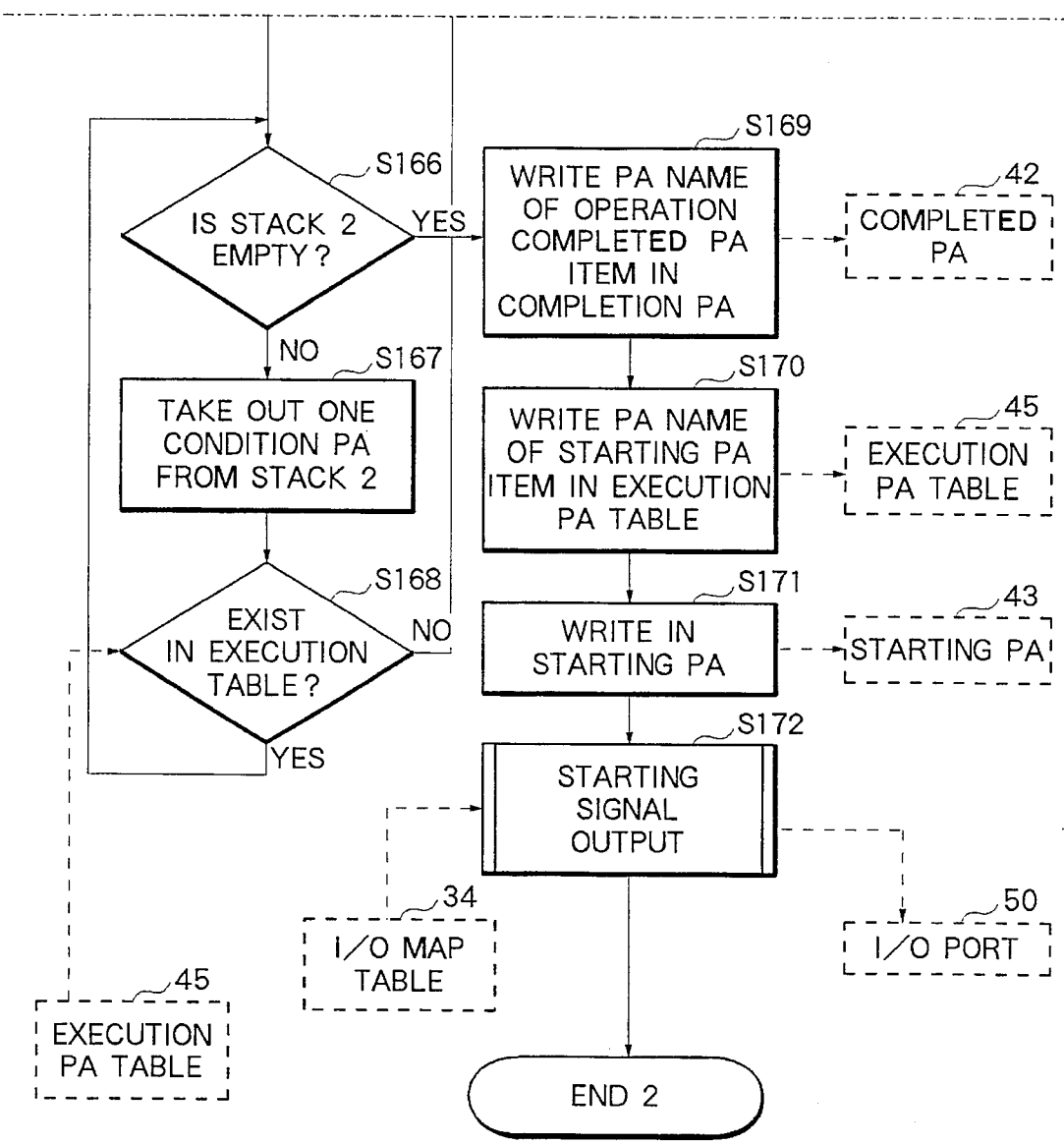
Figure 55A:
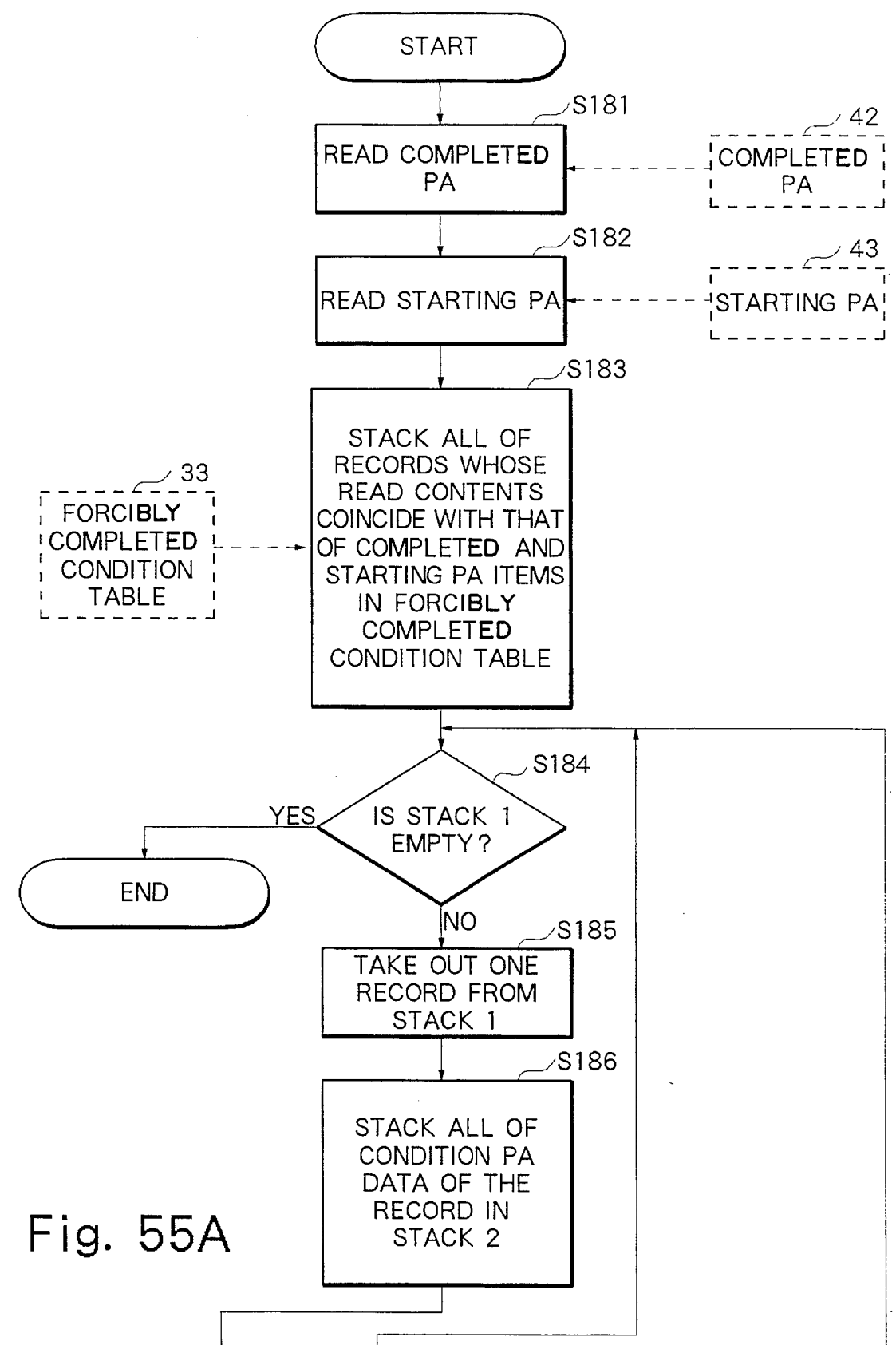
Figure 55B:
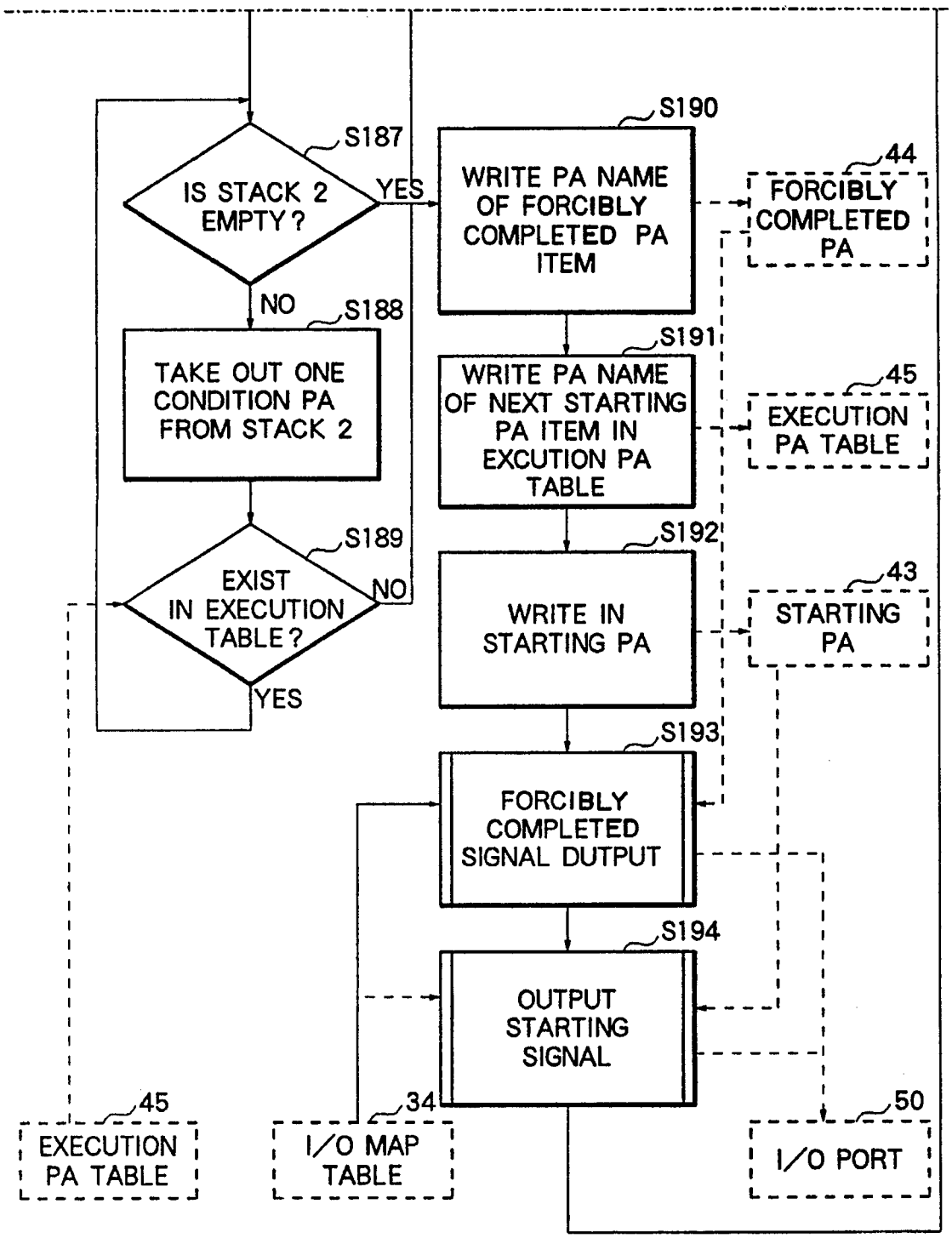

It is certified that error appears in the above-indentified patent and that said Letters Patent is hereby corrected as shown below:

COLUMN 5:

Line 6, "illustrates" should read --illustrate--.
    Line 30, "FIG. 40 and 40B a view which illustrates" should read --FIGS. 40A and 40B are views which illustrate--.
    Line 32, "FIG. 41A and 41B a flow chart which illustrates" should read --FIGS. 41A and 41B are flow charts which illustrate--.
    Line 56, "FIG. 51A and 51B a view which illustrates" should read --FIGS. 51A and 51B are views which illustrate--.
    Line 58, "FIG. 52A and 52B a view which illustrates" should read --FIGS. 52A and 52B are views which illustrate--.
    Line 62, "FIG. 54A and 55B are a flow chart which illustrates" should read --FIGS. 54A and 54B are flow charts which illustrate--.
    Line 65, "FIG. 55A and FIG. 55B are a flow chart which illustrates" should read --FIGS. 55A and 55B are flow charts which illustrate--.

Figure 62A:
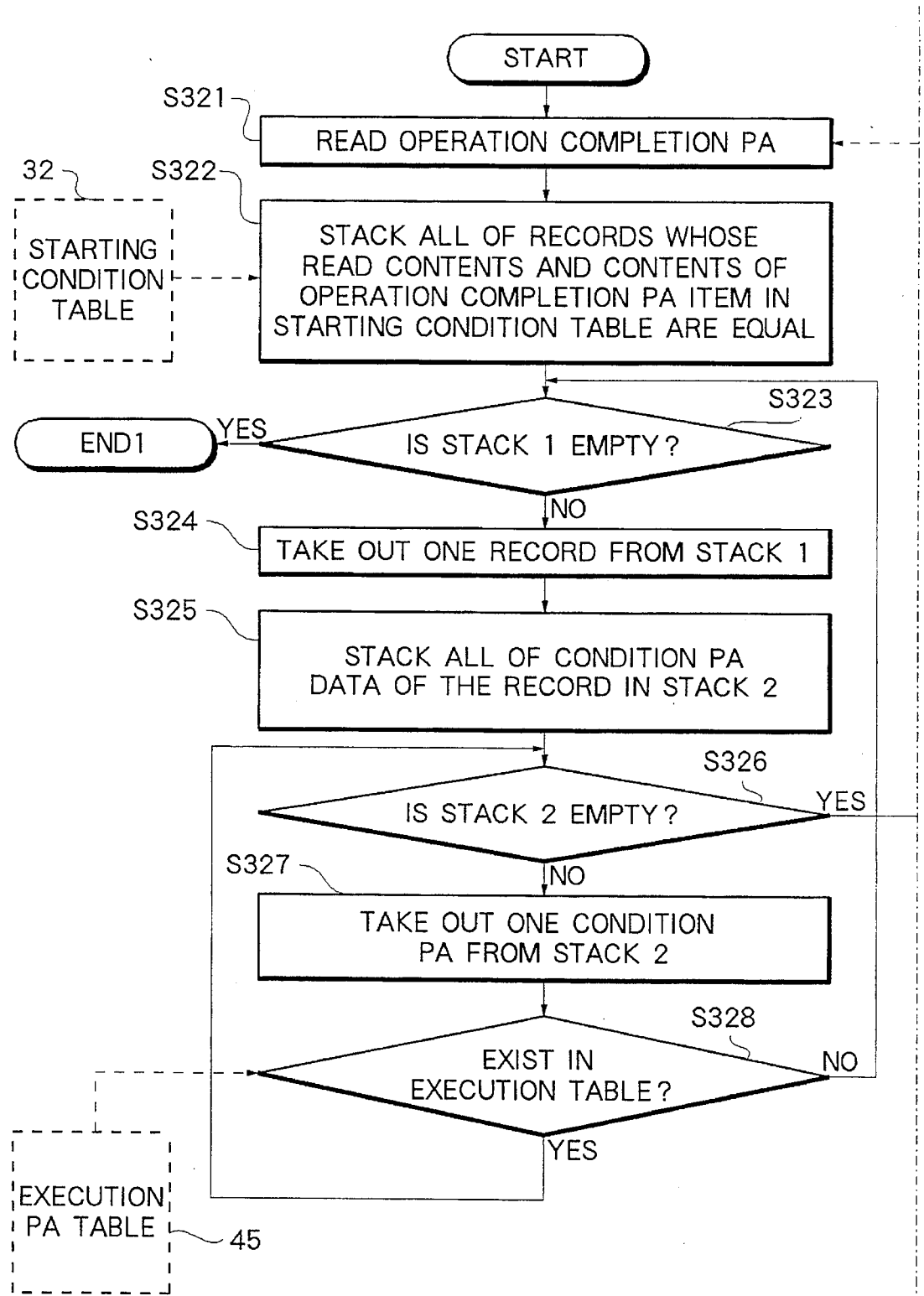
FIG. 62A and 62B are a flow chart which illustrates the PA starting processing according to the fourth embodiment.
Figure 62B:
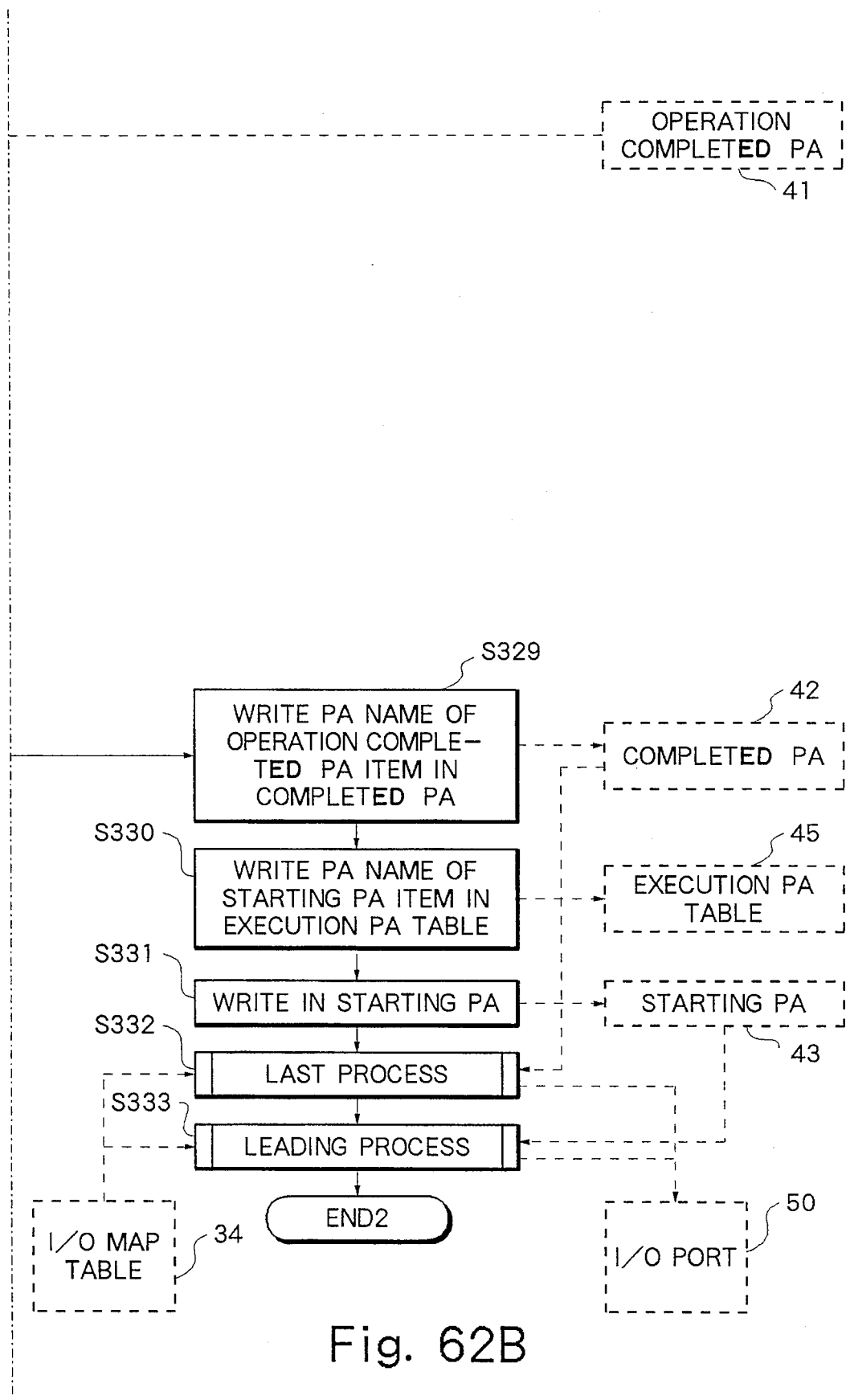
Figure 63A:
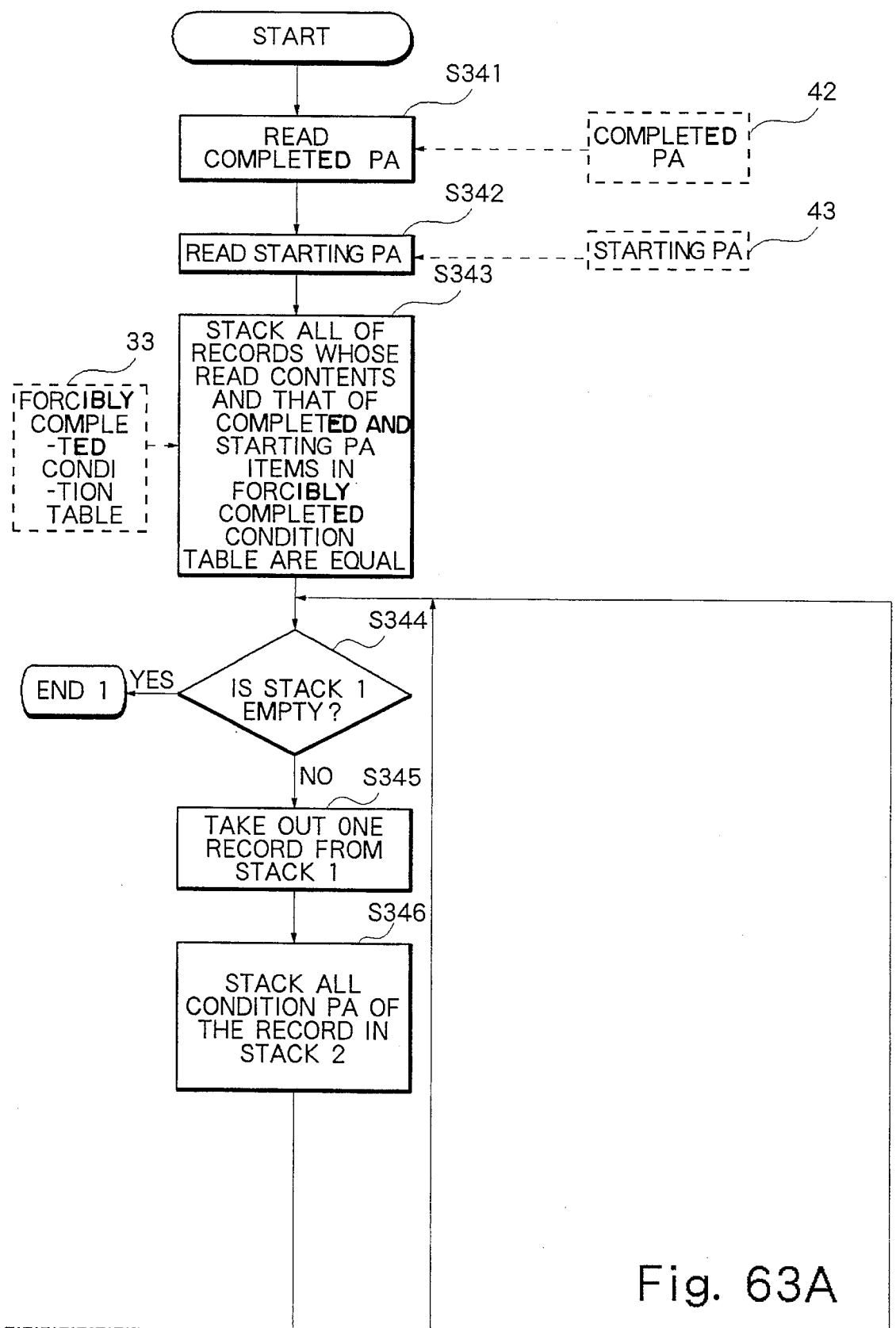
FIG. 63A and 63B are a flow chart which illustrate the PA forced stopping processing according to the fourth embodiment.
Figure 63B:
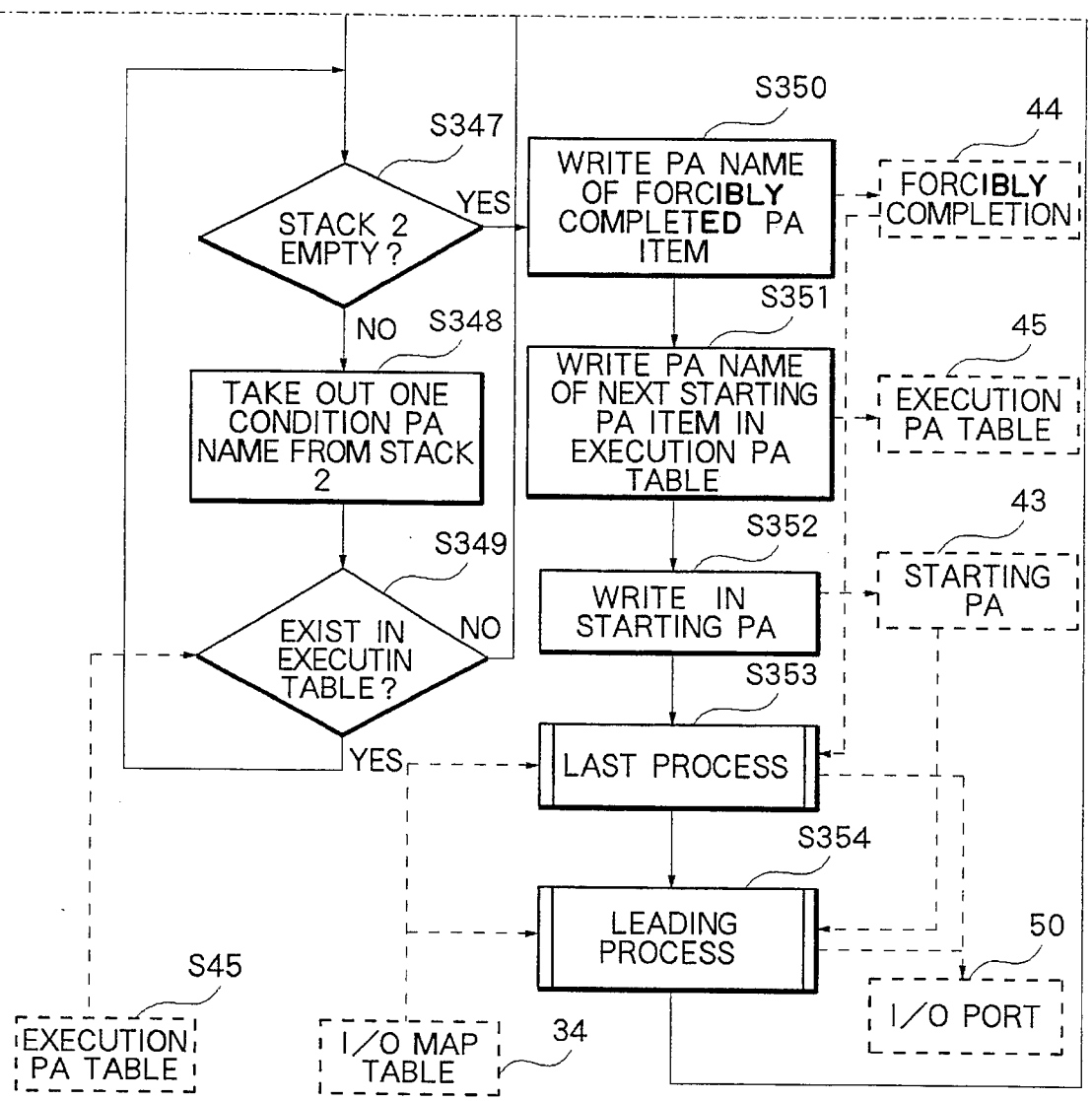

COLUMN 6:

Line 16, "FIG. 62A and 62B are a flow chart which illustrates" should read --FIGS. 62A and 62B are flow charts which illustrate--.
    Line 18, "FIG. 63A and 63B are a flow chart which illustrate" should read --FIGS. 63A and 63B are flow charts which illustrate--.
    Line 37, "in detail described" should read --described in detail--.
    Line 50, "make" should read --makes--.

UNITED STATES PATENT AND TRADEMARK OFFICE
CERTIFICATE OF CORRECTION

PATENT NO. : 5,584,019

DATED : December 10, 1996

INVENTOR(S) : KAZUSHIGE KIKUCHI, ET AL.

It is certified that error appears in the above-indentified patent and that said Letters Patent is hereby corrected as shown below:

COLUMN 7:

Line 3, "ereinafter)" should read --hereinafter)--.
    Line 40, "file 310" should read --file 1310.

COLUMN 8:

Line 33, "to" should be deleted.

COLUMN 9:

Line 40, "is" should read --are--.
    Line 54, "generates" should read --generate--.

COLUMN 10:

Line 4, "origins" should read --origin-; and "these" should read --this--.
    Line 9, "into" should read --from--.

COLUMN 12:

Line 9, "has" should read --have been--.
    Line 34, "are" should read --is--.

UNITED STATES PATENT AND TRADEMARK OFFICE
CERTIFICATE OF CORRECTION

PATENT NO. : 5,584,019

DATED : December 10, 1996

INVENTOR(S) : KAZUSHIGE KIKUCHI, ET AL.

It is certified that error appears in the above-indentified patent and that said Letters Patent is hereby corrected as shown below:

COLUMN 13:

Line 35, "is" should read --are--.
Line 67, "is" should read --are--.

COLUMN 16:

Line 27, "counting" should read --counted--.

COLUMN 17:

Line 44, "n" should read --in--.

COLUMN 19:

Line 49, "is" should read --are--.

COLUMN 20:

Line 23, "step Sill." should read --step S111.--.
Line 38, "step S10B," should read --step S105,--.

UNITED STATES PATENT AND TRADEMARK OFFICE
CERTIFICATE OF CORRECTION

PATENT NO. : 5,584,019

DATED : December 10, 1996

INVENTOR(S) : KAZUSHIGE KIKUCHI, ET AL.

It is certified that error appears in the above-indentified patent and that said Letters Patent is hereby corrected as shown below:

COLUMN 21:

Line 13, "has" should read --have--.

COLUMN 22:

Line 39, "as" should be deleted.
Line 45, "are" should read --is--.
Line 50, "notations as follows." should read --notations.--.

COLUMN 24:

Line 9, "51]" should read --51)]--.

COLUMN 36:

Line 51, "claim 13" should read --claim 13,--.
Line 64, "prises" should read --prise--.

UNITED STATES PATENT AND TRADEMARK OFFICE
CERTIFICATE OF CORRECTION

PATENT NO. : 5,584,019

DATED : December 10, 1996

INVENTOR(S) : KAZUSHIGE KIKUCHI, ET AL.

It is certified that error appears in the above-indentified patent and that said Letters Patent is hereby corrected as shown below:

COLUMN 37:

Line 49, "elements" should read --element--.

Signed and Sealed this

Twenty-second Day of July, 1997

Attest:

BRUCE LEHMAN

Attesting Officer

Commissioner of Patents and Trademarks